United States Patent
Kohno et al.

[11] Patent Number: 6,101,043
[45] Date of Patent: Aug. 8, 2000

[54] ZOOM LENS SYSTEM

[75] Inventors: Tetsuo Kohno, Toyonaka; Masashi Isono, Sakai, both of Japan

[73] Assignee: Minolta Co., Ltd., Osaka, Japan

[21] Appl. No.: 09/257,169

[22] Filed: Feb. 24, 1999

[30] Foreign Application Priority Data

| Feb. 26, 1998 | [JP] | Japan | 10-044812 |
| Feb. 26, 1998 | [JP] | Japan | 10-044816 |
| Feb. 26, 1998 | [JP] | Japan | 10-045097 |
| Feb. 26, 1998 | [JP] | Japan | 10-045133 |

[51] Int. Cl.$^7$ .................................................. G02B 15/14
[52] U.S. Cl. ................................... 359/687; 359/686
[58] Field of Search ................... 359/681, 682, 359/686, 687

[56] References Cited

U.S. PATENT DOCUMENTS

| 4,113,355 | 9/1978 | Tsuji et al. | 350/184 |
| 4,691,513 | 9/1987 | Takahashi | 350/427 |
| 4,818,083 | 4/1989 | Mihara | 350/427 |
| 4,859,042 | 8/1989 | Tanaka | 350/423 |
| 4,952,039 | 8/1990 | Ito | 350/428 |
| 5,100,223 | 3/1992 | Ono et al. | 359/683 |
| 5,528,423 | 6/1996 | Arimoto et al. | 359/687 |
| 5,546,231 | 8/1996 | Sato | 359/687 |

*Primary Examiner*—Georgia Epps
*Assistant Examiner*—Michael A Lucas
*Attorney, Agent, or Firm*—Sidley & Austin

[57] ABSTRACT

A zoom lens system has, from the object side, a first lens unit having a positive optical power, a second lens unit having a negative optical power, a third lens unit having a positive optical power, and a fourth lens unit having a positive optical power. The first, second, and fourth lens units are moved during zooming. The third lens unit is fixed during zooming. The following conditions are fulfilled:

$$-5.0 < M1\ Y{max} < -1.0$$

$$-1.0 < M4\ M2 < -0.1$$

where M1 represents the displacement amount of the first lens unit from the shortest focal length condition to the longest focal length condition; M2 represents the displacement amount of the second lens unit from the shortest focal length condition to the longest focal length condition; M4 represents the displacement amount of the fourth lens unit from the shortest focal length condition to the longest focal length condition; and Ymax represents the maximum image height.

20 Claims, 28 Drawing Sheets

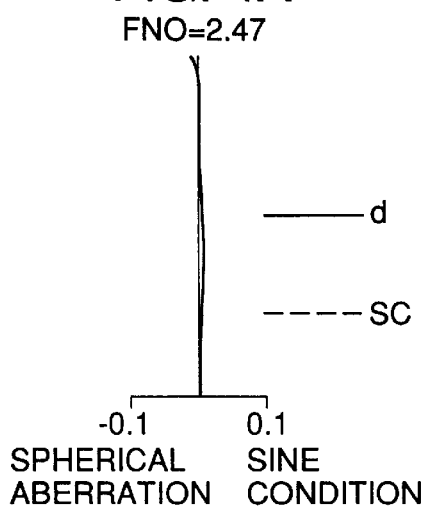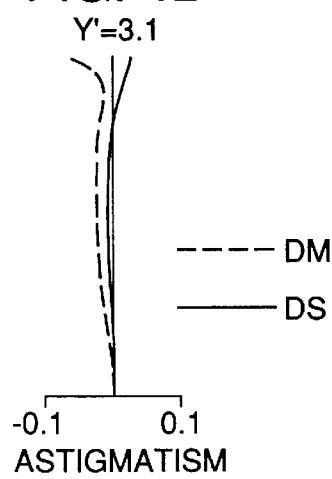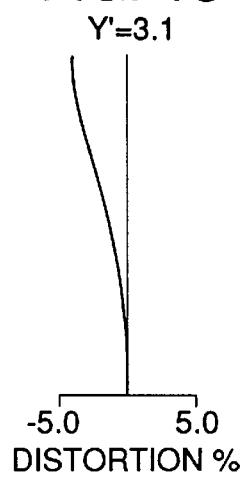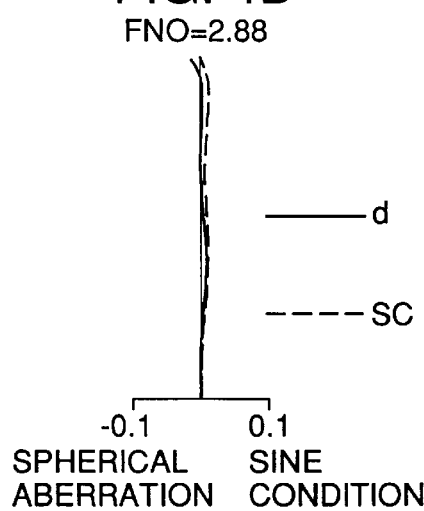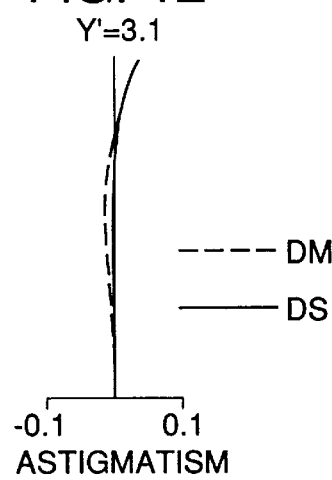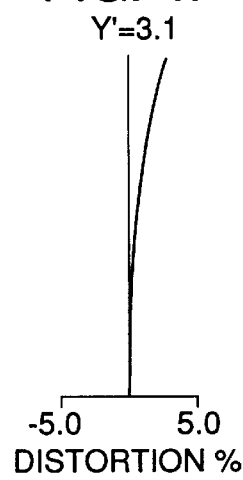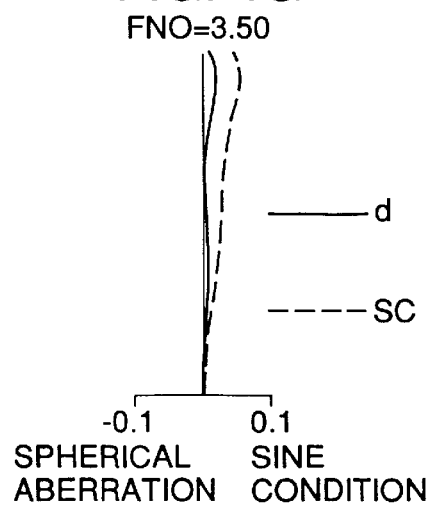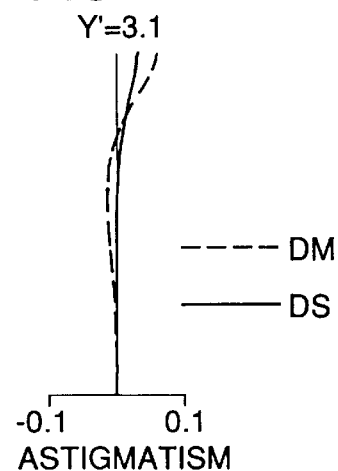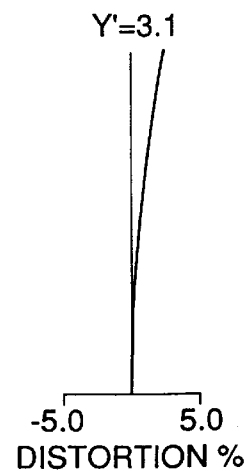

FNO=3.80
— d
---- SC
-0.1   0.1
SPHERICAL   SINE
ABERRATION  CONDITION

Y'=3.1
---- DM
— DS
-0.1   0.1
ASTIGMATISM

Y'=3.1
-5.0   5.0
DISTORTION %

FNO=3.95
— d
---- SC
-0.1   0.1
SPHERICAL   SINE
ABERRATION  CONDITION

Y'=3.1
---- DM
— DS
-0.1   0.1
ASTIGMATISM

Y'=3.1
-5.0   5.0
DISTORTION %

FNO=4.10
— d
---- SC
-0.1   0.1
SPHERICAL   SINE
ABERRATION  CONDITION

Y'=3.1
---- DM
— DS
-0.1   0.1
ASTIGMATISM

Y'=3.1
-5.0   5.0
DISTORTION %

FNO=2.20
— d
---- SC
-0.1  0.1
SPHERICAL  SINE
ABERRATION  CONDITION

Y'=3.1
---- DM
— DS
-0.1  0.1
ASTIGMATISM

Y'=3.1
-5.0  5.0
DISTORTION %

FNO=2.70
— d
---- SC
-0.1  0.1
SPHERICAL  SINE
ABERRATION  CONDITION

Y'=3.1
---- DM
— DS
-0.1  0.1
ASTIGMATISM

Y'=3.1
-5.0  5.0
DISTORTION %

FNO=4.10
— d
---- SC
-0.1  0.1
SPHERICAL  SINE
ABERRATION  CONDITION

Y'=3.1
---- DM
— DS
-0.1  0.1
ASTIGMATISM

Y'=3.1
-5.0  5.0
DISTORTION %

FNO=2.90

-0.1    0.1
SPHERICAL   SINE
ABERRATION   CONDITION

— d
---- SC

Y'=3.1

-0.1    0.1
ASTIGMATISM

---- DM
— DS

Y'=3.1

-5.0    5.0
DISTORTION %

FNO=3.38

-0.1    0.1
SPHERICAL   SINE
ABERRATION   CONDITION

— d
---- SC

Y'=3.1

-0.1    0.1
ASTIGMATISM

---- DM
— DS

Y'=3.1

-5.0    5.0
DISTORTION %

FNO=4.10

-0.1    0.1
SPHERICAL   SINE
ABERRATION   CONDITION

— d
---- SC

Y'=3.1

-0.1    0.1
ASTIGMATISM

---- DM
— DS

Y'=3.1

-5.0    5.0
DISTORTION %

EFFECTIVE FNO=2.90

— d
---- SC

-0.1   0.1
SPHERICAL   SINE
ABERRATION   CONDITION

Y'=3.1

---- DM
— DS

-0.1   0.1
ASTIGMATISM

Y'=3.1

-5.0   5.0
DISTORTION %

EFFECTIVE FNO=3.38

— d
---- SC

-0.1   0.1
SPHERICAL   SINE
ABERRATION   CONDITION

Y'=3.1

---- DM
— DS

-0.1   0.1
ASTIGMATISM

Y'=3.1

-5.0   5.0
DISTORTION %

EFFECTIVE FNO=4.10

— d
---- SC

-0.1   0.1
SPHERICAL   SINE
ABERRATION   CONDITION

Y'=3.1

---- DM
— DS

-0.1   0.1
ASTIGMATISM

Y'=3.1

-5.0   5.0
DISTORTION %

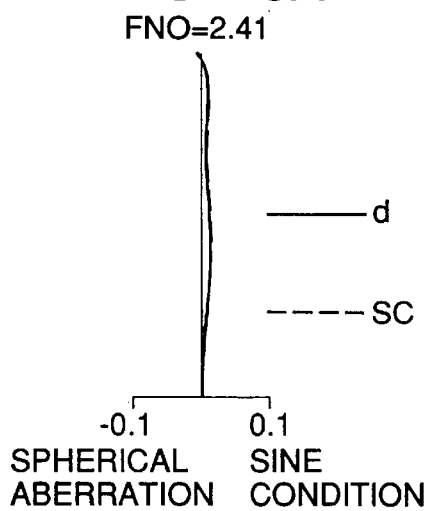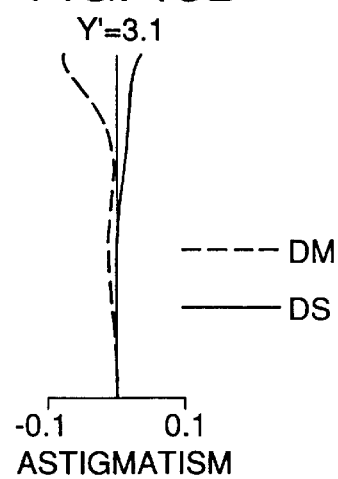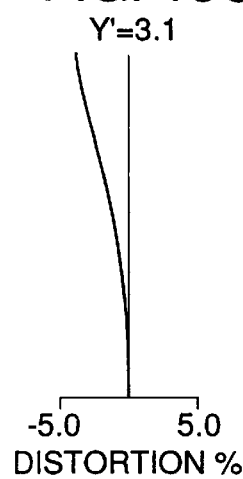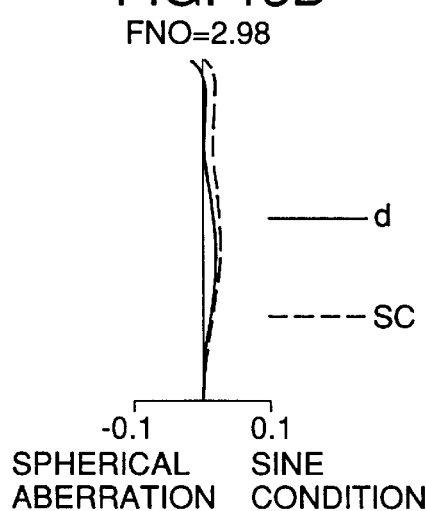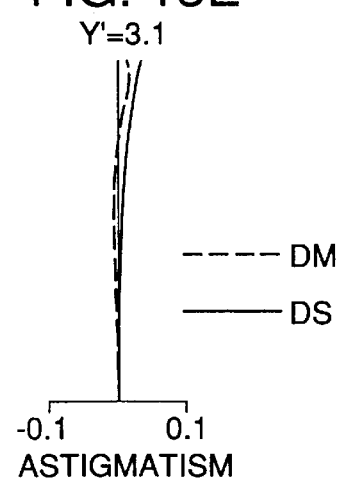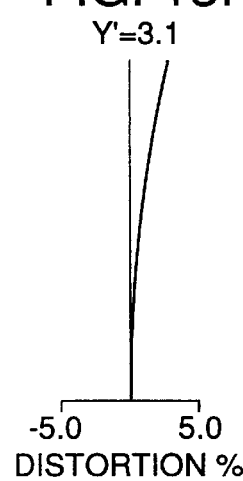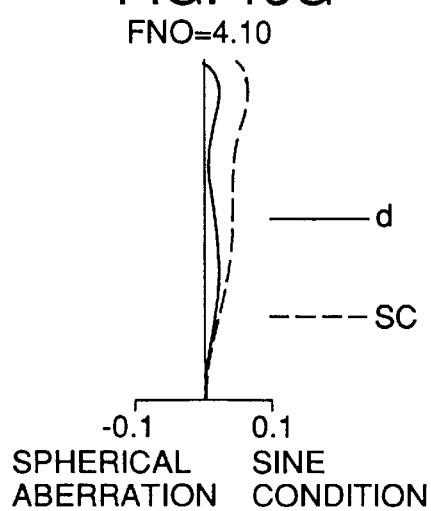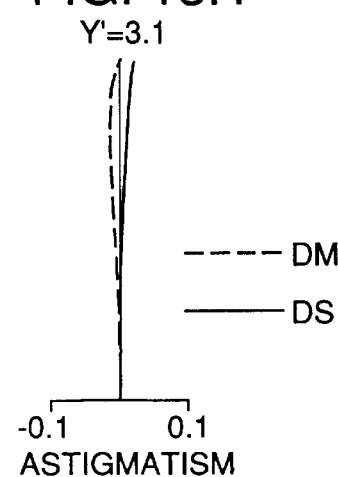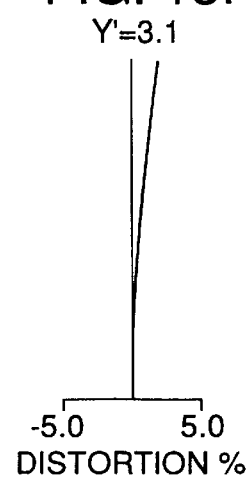

EFFECTIVE FNO=2.41

—— d
---- SC

-0.1    0.1
SPHERICAL   SINE
ABERRATION  CONDITION

Y'=3.1

---- DM
—— DS

-0.1    0.1
ASTIGMATISM

Y'=3.1

-5.0    5.0
DISTORTION %

EFFECTIVE FNO=2.98

—— d
---- SC

-0.1    0.1
SPHERICAL   SINE
ABERRATION  CONDITION

Y'=3.1

---- DM
—— DS

-0.1    0.1
ASTIGMATISM

Y'=3.1

-5.0    5.0
DISTORTION %

EFFECTIVE FNO=4.09

—— d
---- SC

-0.1    0.1
SPHERICAL   SINE
ABERRATION  CONDITION

Y'=3.1

---- DM
—— DS

-0.1    0.1
ASTIGMATISM

Y'=3.1

-5.0    5.0
DISTORTION %

FNO=3.75

-0.1　0.1
SPHERICAL　SINE
ABERRATION　CONDITION

— d
---- SC

Y'=3.1

-0.1　0.1
ASTIGMATISM

---- DM
— DS

Y'=3.1

-5.0　5.0
DISTORTION %

FNO=3.90

-0.1　0.1
SPHERICAL　SINE
ABERRATION　CONDITION

— d
---- SC

Y'=3.1

-0.1　0.1
ASTIGMATISM

---- DM
— DS

Y'=3.1

-5.0　5.0
DISTORTION %

FNO=4.10

-0.1　0.1
SPHERICAL　SINE
ABERRATION　CONDITION

— d
---- SC

Y'=3.1

-0.1　0.1
ASTIGMATISM

---- DM
— DS

Y'=3.1

-5.0　5.0
DISTORTION %

FIG. 16A
EFFECTIVE FNO=3.75

—— d
---- SC

-0.1   0.1
SPHERICAL   SINE
ABERRATION  CONDITION

-0.1   0.1
ASTIGMATISM

FIG. 16C
Y'=3.1

-5.0   5.0
DISTORTION %

FIG. 16D
EFFECTIVE FNO=3.90

—— d
---- SC

-0.1   0.1
SPHERICAL   SINE
ABERRATION  CONDITION

-0.1   0.1
ASTIGMATISM

FIG. 16F
Y'=3.1

-5.0   5.0
DISTORTION %

FIG. 16G
EFFECTIVE FNO=4.10

—— d
---- SC

-0.1   0.1
SPHERICAL   SINE
ABERRATION  CONDITION

-0.1   0.1
ASTIGMATISM

FIG. 16I
Y'=3.1

-5.0   5.0
DISTORTION %

FIG. 17A
FNO=2.10
FIG. 17B
Y'=3.1
FIG. 17C
Y'=3.1
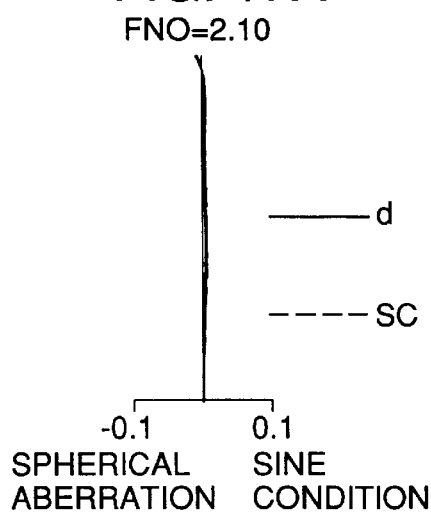
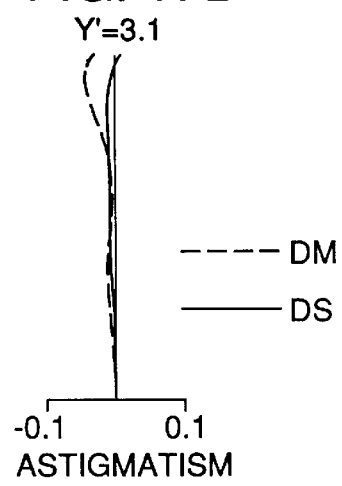
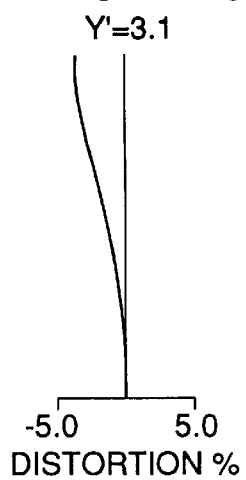
-0.1  0.1
SPHERICAL ABERRATION  SINE CONDITION
-0.1  0.1
ASTIGMATISM
-5.0  5.0
DISTORTION %
FIG. 17D
FNO=2.44
FIG. 17E
Y'=3.1
FIG. 17F
Y'=3.1
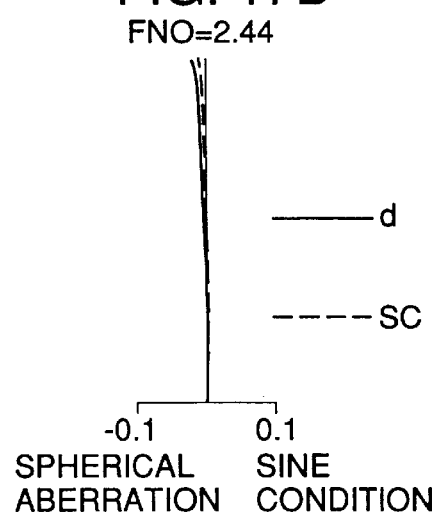
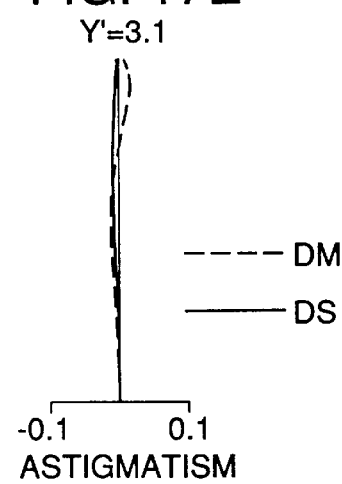
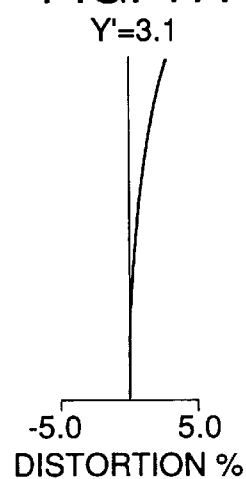
-0.1  0.1
SPHERICAL ABERRATION  SINE CONDITION
-0.1  0.1
ASTIGMATISM
-5.0  5.0
DISTORTION %
FIG. 17G
FNO=2.88
FIG. 17H
Y'=3.1
FIG. 17I
Y'=3.1
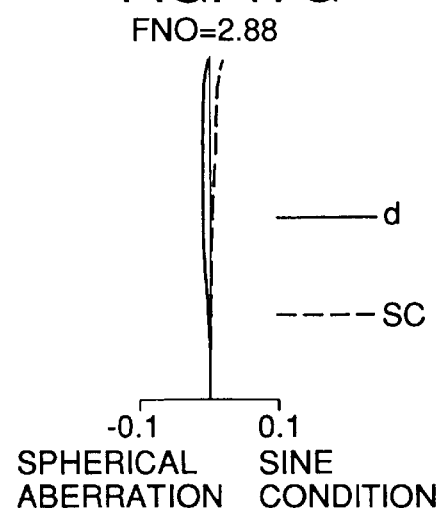
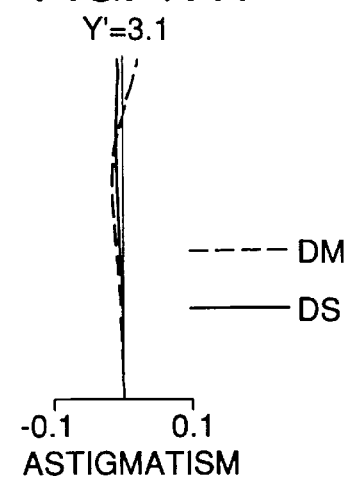
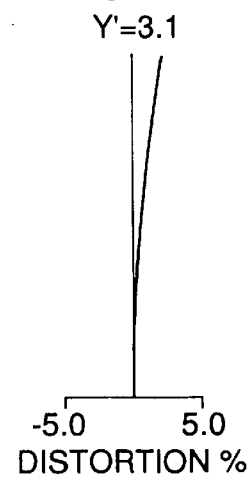
-0.1  0.1
SPHERICAL ABERRATION  SINE CONDITION
-0.1  0.1
ASTIGMATISM
-5.0  5.0
DISTORTION %

EFFECTIVE FNO=2.10

—— d
---- SC

-0.1   0.1
SPHERICAL   SINE
ABERRATION  CONDITION

Y'=3.1

---- DM
—— DS

-0.1   0.1
ASTIGMATISM

Y'=3.1

-5.0   5.0
DISTORTION %

EFFECTIVE FNO=2.44

—— d
---- SC

-0.1   0.1
SPHERICAL   SINE
ABERRATION  CONDITION

Y'=3.1

---- DM
—— DS

-0.1   0.1
ASTIGMATISM

Y'=3.1

-5.0   5.0
DISTORTION %

EFFECTIVE FNO=2.88

—— d
---- SC

-0.1   0.1
SPHERICAL   SINE
ABERRATION  CONDITION

Y'=3.1

---- DM
—— DS

-0.1   0.1
ASTIGMATISM

Y'=3.1

-5.0   5.0
DISTORTION %

FNO=2.80

-0.1    0.1
SPHERICAL    SINE
ABERRATION    CONDITION

Y'=3.1

-0.1    0.1
ASTIGMATISM

Y'=3.1

-5.0    5.0
DISTORTION %

FNO=3.60

-0.1    0.1
SPHERICAL    SINE
ABERRATION    CONDITION

Y'=3.1

-0.1    0.1
ASTIGMATISM

Y'=3.1

-5.0    5.0
DISTORTION %

FNO=4.10

-0.1    0.1
SPHERICAL    SINE
ABERRATION    CONDITION

Y'=3.1

-0.1    0.1
ASTIGMATISM

Y'=3.1

-5.0    5.0
DISTORTION %

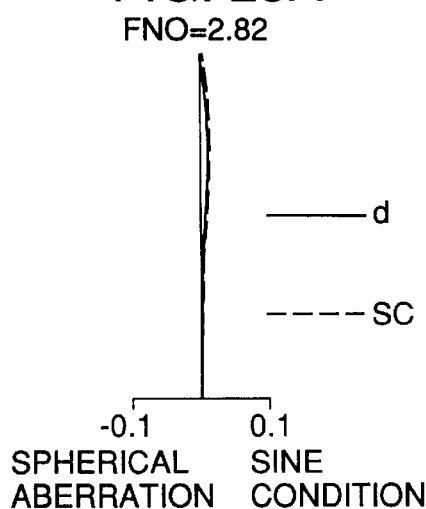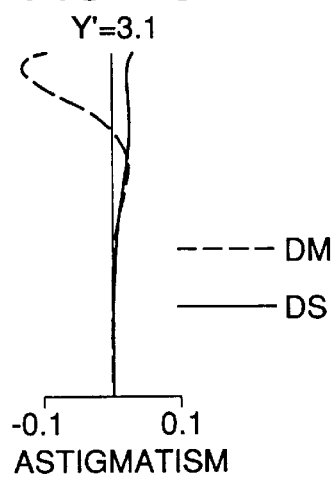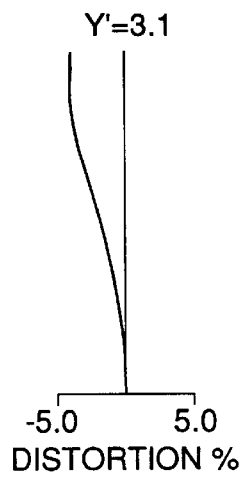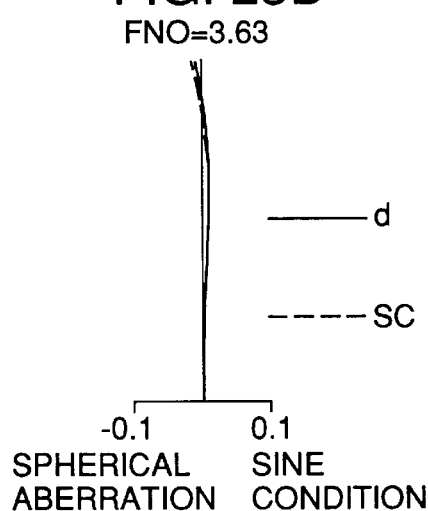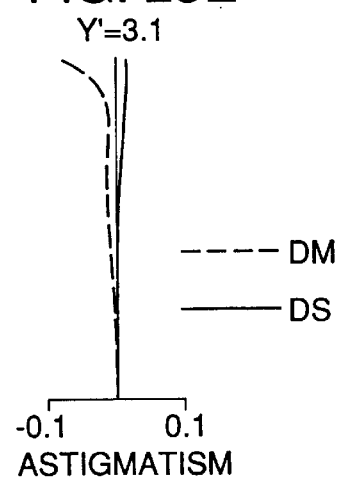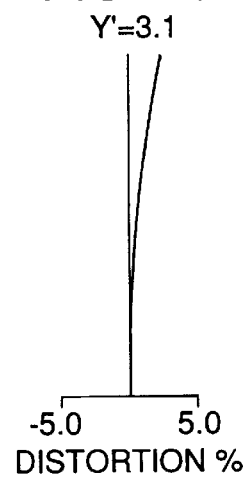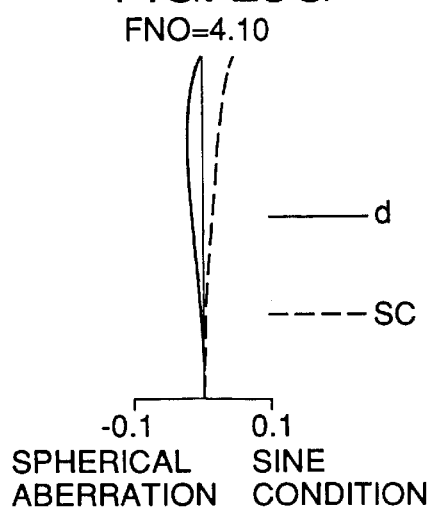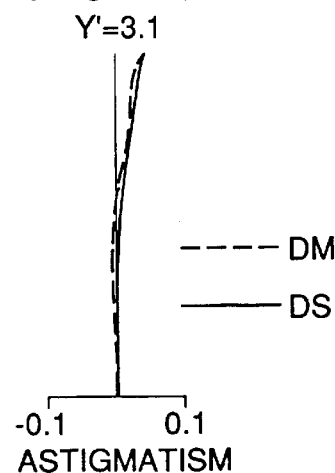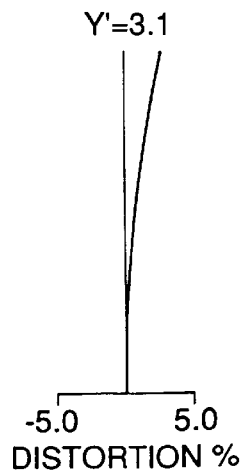

FNO=2.50
-0.1  0.1
SPHERICAL  SINE
ABERRATION  CONDITION
— d
---- SC

Y'=3.1
-0.1  0.1
ASTIGMATISM
---- DM
— DS

Y'=3.1
-5.0  5.0
DISTORTION %

FNO=3.10
-0.1  0.1
SPHERICAL  SINE
ABERRATION  CONDITION
— d
---- SC

Y'=3.1
-0.1  0.1
ASTIGMATISM
---- DM
— DS

Y'=3.1
-5.0  5.0
DISTORTION %

FNO=4.10
-0.1  0.1
SPHERICAL  SINE
ABERRATION  CONDITION
— d
---- SC

Y'=3.1
-0.1  0.1
ASTIGMATISM
---- DM
— DS

Y'=3.1
-5.0  5.0
DISTORTION %

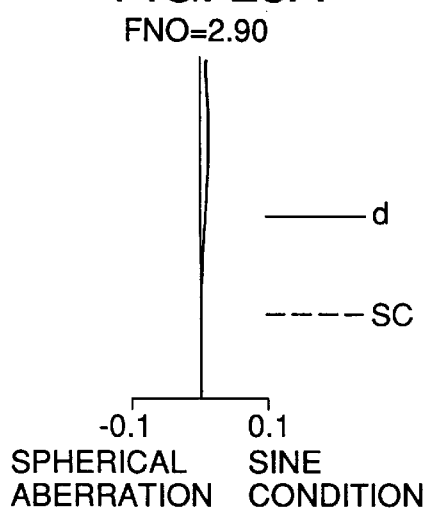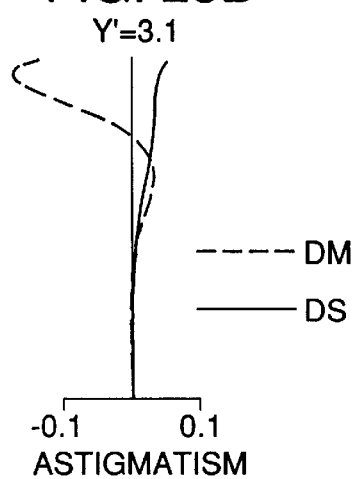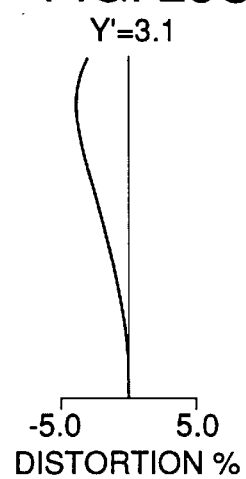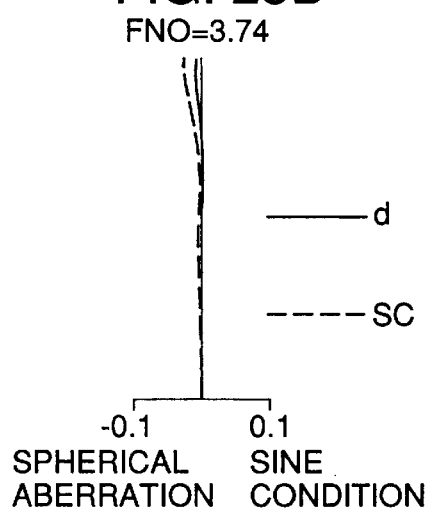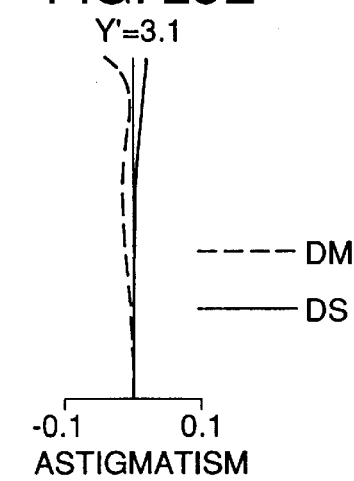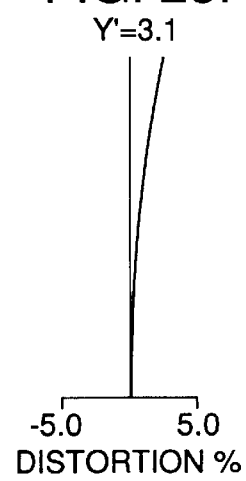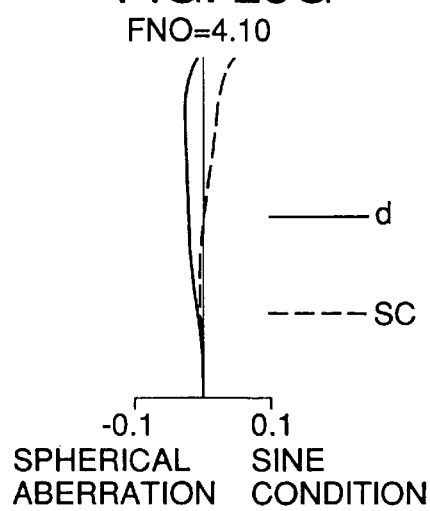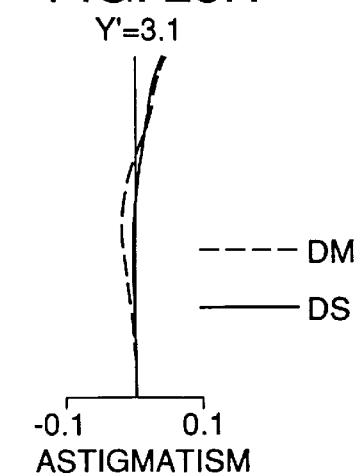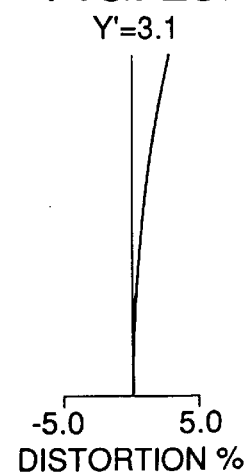

EFFECTIVE FNO=2.90
—— d
---- SC
-0.1   0.1
SPHERICAL  SINE
ABERRATION CONDITION

Y'=3.1
---- DM
—— DS
-0.1   0.1
ASTIGMATISM

Y'=3.1
-5.0   5.0
DISTORTION %

EFFECTIVE FNO=3.73
—— d
---- SC
-0.1   0.1
SPHERICAL  SINE
ABERRATION CONDITION

Y'=3.1
---- DM
—— DS
-0.1   0.1
ASTIGMATISM

Y'=3.1
-5.0   5.0
DISTORTION %

EFFECTIVE FNO=4.10
—— d
---- SC
-0.1   0.1
SPHERICAL  SINE
ABERRATION CONDITION

Y'=3.1
---- DM
—— DS
-0.1   0.1
ASTIGMATISM

Y'=3.1
-5.0   5.0
DISTORTION %

FNO=2.81

—— d
---- SC

-0.1   0.1
SPHERICAL  SINE
ABERRATION CONDITION

Y'=3.1

---- DM
—— DS

-0.1   0.1
ASTIGMATISM

Y'=3.1

-5.0   5.0
DISTORTION %

FNO=3.62

—— d
---- SC

-0.1   0.1
SPHERICAL  SINE
ABERRATION CONDITION

Y'=3.1

---- DM
—— DS

-0.1   0.1
ASTIGMATISM

Y'=3.1

-5.0   5.0
DISTORTION %

FNO=4.10

—— d
---- SC

-0.1   0.1
SPHERICAL  SINE
ABERRATION CONDITION

Y'=3.1

---- DM
—— DS

-0.1   0.1
ASTIGMATISM

Y'=3.1

-5.0   5.0
DISTORTION %

EFFECTIVE FNO=2.81

-0.1   0.1
SPHERICAL   SINE
ABERRATION   CONDITION

— d
---- SC

Y'=3.1

-0.1   0.1
ASTIGMATISM

---- DM
— DS

Y'=3.1

-5.0   5.0
DISTORTION %

EFFECTIVE FNO=3.62

-0.1   0.1
SPHERICAL   SINE
ABERRATION   CONDITION

— d
---- SC

Y'=3.1

-0.1   0.1
ASTIGMATISM

---- DM
— DS

Y'=3.1

-5.0   5.0
DISTORTION %

EFFECTIVE FNO=4.09

-0.1   0.1
SPHERICAL   SINE
ABERRATION   CONDITION

— d
---- SC

Y'=3.1

-0.1   0.1
ASTIGMATISM

---- DM
— DS

Y'=3.1

-5.0   5.0
DISTORTION %

FNO=2.88
— d
---- SC
-0.1  0.1
SPHERICAL  SINE
ABERRATION  CONDITION

Y'=3.1
---- DM
— DS
-0.1  0.1
ASTIGMATISM

Y'=3.1
-5.0  5.0
DISTORTION %

FNO=3.74
— d
---- SC
-0.1  0.1
SPHERICAL  SINE
ABERRATION  CONDITION

Y'=3.1
---- DM
— DS
-0.1  0.1
ASTIGMATISM

Y'=3.1
-5.0  5.0
DISTORTION %

FNO=4.10
— d
---- SC
-0.1  0.1
SPHERICAL  SINE
ABERRATION  CONDITION

Y'=3.1
---- DM
— DS
-0.1  0.1
ASTIGMATISM

Y'=3.1
-5.0  5.0
DISTORTION %

EFFECTIVE FNO=2.88

—— d
---- SC

-0.1   0.1
SPHERICAL  SINE
ABERRATION  CONDITION

Y'=3.1

---- DM
—— DS

-0.1   0.1
ASTIGMATISM

Y'=3.1

-5.0   5.0
DISTORTION %

EFFECTIVE FNO=3.74

—— d
---- SC

-0.1   0.1
SPHERICAL  SINE
ABERRATION  CONDITION

Y'=3.1

---- DM
—— DS

-0.1   0.1
ASTIGMATISM

Y'=3.1

-5.0   5.0
DISTORTION %

EFFECTIVE FNO=4.10

—— d
---- SC

-0.1   0.1
SPHERICAL  SINE
ABERRATION  CONDITION

Y'=3.1

---- DM
—— DS

-0.1   0.1
ASTIGMATISM

Y'=3.1

-5.0   5.0
DISTORTION %

ZOOM LENS SYSTEM

This application is based on application Nos. H10-44812, H10-44816, H10-45097, and H10-45133 filed in Japan, the content of which is hereby incorporated by reference.

BACKGROUND OF THE INVENTION

1. Field of the Invention

The present invention relates to a zoom lens system, and more particularly to a compact and high-zoom-ratio zoom lens system suitable for use in digital still cameras.

2. Description of the Prior Art

In recent years, as personal computers become prevalent, digital still cameras have been coming into wider and wider use that allow easy shooting of images. This trend has created an increasing demand for more compact and more low-cost digital still cameras that offer higher zoom ratios and higher optical performance. This in turn has created an increasing demand for more compact and more low-cost taking optical systems that offer higher zoom ratios and higher optical performance. Moreover, higher and higher image quality has been sought after in digital still cameras. In digital still cameras, image quality depends on the number of pixels that the solid-state imaging device provided therein has. For example, a now typical solid-state imaging device of the so-called VGA class has about 330,000 pixels.

As a taking optical system of the VGA class, it is possible to employ an optical system designed for use in a home-use video camera, because it offers a high zoom ratio at low cost. However, with a VGA class taking optical system, it is impossible to obtain satisfactorily high image quality, because the image quality it offers is far inferior to that obtained with a silver-halide film camera. To obtain satisfactorily high image quality, it is necessary to use at least 1,000,000 pixels, and the greater the number of pixels, the higher optical performance is required in the taking optical system. The problem here is that most taking optical systems that offer image quality as high as would be required to cope with 1,000,000 or more pixels are built as fixed-focal-length lens systems. In other words, to obtain a zoom lens system (in particular, a high-zoom-ratio zoom lens system) satisfying such requirements, there is no alternative but to use an interchangeable lens designed for use with a single-lens reflex camera, or a zoom lens designed for use with a professional-use video camera. However, such zoom lenses are extremely large and expensive. Moreover, in a taking optical system, high optical performance is required not only for an object at infinity but also for an object at a close distance, and therefore the focusing method employed therein greatly affects the overall optical performance.

SUMMARY OF THE INVENTION

An object of the present invention is to provide a compact, low-cost, and high-zoom-ratio zoom lens system that offers high image quality.

To achieve the above object, according to one aspect of the present invention, a zoom lens system is provided with, from the object side, a first lens unit having a positive optical power, a second lens unit having a negative optical power, a third lens unit having a positive optical power, and a fourth lens unit having a positive optical power. The first, second, and fourth lens units are moved during zooming. The third lens unit is kept in a fixed position during zooming. Additionally, this zoom lens system fulfills the conditions below:

$$-5.0 < M1/Y\max < -1.0$$

$$-1.0 < M4/M2 < -0.1$$

where

M1 represents the displacement amount of the first lens unit from the shortest focal length condition (the wide-angle end) to the longest focal length condition (the telephoto end) (the direction pointing to the object side is negative);

M2 represents the displacement amount of the second lens unit from the shortest focal length condition to the longest focal length condition (the direction pointing to the object side is negative);

M4 represents the displacement amount of the fourth lens unit from the shortest focal length condition to the longest focal length condition (the direction pointing to the object side is negative); and Ymax represents the maximum image height (the radius of the effective image on the image plane).

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first, second, and fourth lens units are moved during zooming. The third lens unit is kept in a fixed position during zooming. Additionally, this zoom lens system fulfills the conditions below:

$$-5.0 < M1/Y\max < -1.0$$

$$0.2 < \log(\beta 2T/\beta 2W)/\log(Z) < 0.9$$

where

M1 represents the displacement amount of the first lens unit from the shortest focal length condition to the longest focal length condition (the direction pointing to the object side is negative);

Ymax represents the maximum image height (the radius of the effective image on the image plane);

$\beta 2W$ represents the lateral magnification of the second lens unit in the shortest focal length condition;

$\beta 2T$ represents the lateral magnification of the second lens unit in the longest focal length condition; and Z represents the zoom ratio (which equals fT/fW, where fT represents the focal length of the entire zoom lens system in the longest focal length condition; and fW represents the focal length of the entire zoom lens system in the shortest focal length condition).

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first lens unit is moved monotonically forward to the object side during zooming from the shortest focal length condition to the longest focal length condition. The second lens unit is moved monotonically backward to the image side during zooming from the shortest focal length condition to the longest focal length condition. The third lens unit is kept in a fixed position during zooming. The fourth lens unit is moved monotonically forward to the object side during zooming from the shortest focal length condition to the longest focal length condition. Additionally, the second lens unit has an aspherical surface that fulfills the condition below:

$$0 < (x-x0)/(N'-N) < 0.9$$

where
  x represents the deviation of the aspherical surface in a direction perpendicular to the optical axis direction of the aspherical surface (in millimeters, the direction pointing to the object side is negative);
  x0 represents the deviation of the reference spherical surface in a direction perpendicular to the optical axis direction of the reference spherical surface (in millimeters, the direction pointing to the object side is negative);
  N represents the refractive index of the object-side medium of the aspherical surface for the d-line; and
  N' represents the refractive index of the image-side medium of the aspherical surface for the d-line.

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and fourth lens units are moved monotonically forward to the object side during zooming from the shortest focal length condition to the longest focal length condition. The second lens unit is moved monotonically backward to the image side during zooming from the shortest focal length condition to the longest focal length condition. The third lens unit is kept in a fixed position during zooming. Additionally, the fourth lens unit has an aspherical surface that fulfills the condition below:

$$-0.85 < (x-x0)/(N'-N) < 0$$

where
  x represents the deviation of the aspherical surface in a direction perpendicular to the optical axis direction of the aspherical surface (in millimeters, the direction pointing to the object side is negative);
  x0 represents the deviation of the reference spherical surface in a direction perpendicular to the optical axis direction of the reference spherical surface (in millimeters, the direction pointing to the object side is negative);
  N represents the refractive index of the object-side medium of the aspherical surface for the d-line; and
  N' represents the refractive index of the image-side medium of the aspherical surface for the d-line.

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and fourth lens units are moved during zooming. The second lens unit is moved during zooming and is moved for focusing. The third lens unit is kept in a fixed position during zooming. Additionally, this zoom lens system fulfills the conditions below:

$$0.1 < |\beta 2T| < 1.0$$

$$0.2 < |fW/f2| < 1.5$$

$$-5.0 < M1/Ymax < -1.0$$

where
  α2T represents the lateral magnification of the second lens unit in the longest focal length condition;
  fW represents the focal length of the entire zoom lens system in the shortest focal length condition;
  f2 represents the focal length of the second lens unit;
  M1 represents the displacement amount of the first lens unit from the shortest focal length condition to the longest focal length condition (the direction pointing to the object side is negative); and
  Ymax represents the maximum image height (the radius of the effective image on the image plane).

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and fourth lens units are moved during zooming. The second lens unit is moved during zooming and is moved for focusing. The third lens unit is kept in a fixed position during zooming. Additionally, this zoom lens system fulfills the condition below:

$$0.1 < M4/M1 < 1.0$$

where
  M1 represents the displacement amount of the first lens unit from the shortest focal length condition to the longest focal length condition (the direction pointing to the object side is negative); and
  M4 represents the displacement amount of the fourth lens unit from the shortest focal length condition to the longest focal length condition (the direction pointing to the object side is negative).

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and third lens units are kept in fixed positions during zooming. The second lens unit is moved during zooming. The fourth lens unit is moved forward to the object side during zooming. Additionally, this zoom lens system fulfills the conditions below:

$$2.5 < f1/fW < 8.0$$

$$0.7 \times (\beta 34T/\beta 34W) < \beta 2T/\beta 2W < 2.3 \times (\beta 34T/\beta 34W)$$

where
  f1 represents the focal length of the first lens unit;
  fW represents the focal length of the entire zoom lens system in the shortest focal length condition;
  β34W represents the composite lateral magnification of the third and fourth lens units in the shortest focal length condition;
  β34T represents the composite lateral magnification of the third and fourth lens units in the longest focal length condition;
  β2W represents the lateral magnification of the second lens unit in the shortest focal length condition; and
  β2T represents the lateral magnification of the second lens unit in the longest focal length condition.

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and third lens units are kept in fixed positions during zooming. The second lens unit is moved monotonically backward to the image side during zooming from the shortest focal length condition to the longest focal length condition. The fourth lens unit is moved monotonically forward to the object side during zooming from the shortest focal length condition to the longest focal length condition. Additionally, this zoom lens system fulfills the condition below:

$$2.5 < f1/fW < 8.0$$

where f1 represents the focal length of the first lens unit; and fW represents the focal length of the entire zoom lens system in the shortest focal length condition.

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and third lens units are kept in fixed positions during zooming. The second lens unit is moved during zooming. The fourth lens unit is moved forward to the object side during zooming. Additionally, this zoom lens system fulfills the condition below:

$$0.4 < \log(\beta 2T/\beta 2W)/\log(Z) < 0.75$$

where $\beta 2W$ represents the lateral magnification of the second lens unit in the shortest focal length condition;

$\beta 2T$ represents the lateral magnification of the second lens unit in the longest focal length condition; and Z represents the zoom ratio (which equals fT/fW, where fT represents the focal length of the entire zoom lens system in the longest focal length condition; and fW represents the focal length of the entire zoom lens system in the shortest focal length condition).

According to another aspect of the present invention, a zoom lens system is provided with, from the object side, a first lens unit having a positive optical power, a second lens unit having a negative optical power, a third lens unit having a positive optical power, and a fourth lens unit having a positive optical power. The first and third lens units are kept in fixed positions during zooming. The second lens unit is moved from the object side to the image side during zooming from the shortest focal length condition to the longest focal length condition, and is also moved for focusing. The fourth lens unit is moved forward to the object side during zooming so that the fourth lens unit compensates the movement of the image plane in the optical axis direction caused by moving the second lens unit. Additionally, this zoom lens system fulfills the conditions below:

$$0.5 < |\beta 2T| < 0.98$$

$$3.0 < f1/fW < 9.0$$

where $\beta 2T$ represents the lateral magnification of the second lens unit in the longest focal length condition;

fW represents the focal length of the entire zoom lens system in the shortest focal length condition; and f1 represents the focal length of the first lens unit.

According to still another aspect of the present invention, a zoom lens system is provided with, from the object side, a first lens unit having a positive optical power, a second lens unit having a negative optical power, a third lens unit having a positive optical power, and a fourth lens unit having a positive optical power. The first and third lens units are kept in fixed positions during zooming. The second lens unit is moved monotonically from the object side to the image side during zooming from the shortest focal length condition to the longest focal length condition, and is also moved for focusing. The fourth lens unit is moved monotonically from the image side to the object side during zooming from the shortest focal length condition to the longest focal length condition. Additionally, this zoom lens system fulfills the conditions below:

$$0.15 < M4/M2 < 0.55$$

$$0.4 < \log(\beta 2T/\beta 2W)\log(Z) < 0.75$$

where

M2 represents the displacement amount of the second lens unit from the shortest focal length condition to the longest focal length condition (the direction pointing to the object side is negative);

M4 represents the displacement amount of the fourth lens unit from the shortest focal length condition to the longest focal length condition (the direction pointing to the object side is negative);

$\beta 2W$ represents the lateral magnification of the second lens unit in the shortest focal length condition;

$\beta 2T$ represents the lateral magnification of the second lens unit in the longest focal length condition; and Z represents the zoom ratio (which equals fT/fW, where fT represents the focal length of the entire zoom lens system in the longest focal length condition; and fW represents the focal length of the entire zoom lens system in the shortest focal length condition).

BRIEF DESCRIPTION OF THE DRAWINGS

This and other objects and features of this invention will become clear from the following description, taken in conjunction with the preferred embodiments with reference to the accompanied drawings in which:

FIGS. 4A to 4I are graphic representations of the aberrations observed in the zoom lens system of Example 1;

FIGS. 13A to 13I are graphic representations of the aberrations observed in the infinite-distance shooting condition in Example 5;

FIGS. 16A to 16I are graphic representations of the aberrations observed in the close-distance shooting condition (D=1m) in Example 6;

FIGS. 17A to 17I are graphic representations of the aberrations observed in the infinite-distance shooting condition in Example 7;

FIGS. 23A to 23I are graphic representations of the aberrations observed in the zoom lens system of Example 9;

FIGS. 28A to 28I are graphic representations of the aberrations observed in the infinite-distance shooting condition in Example 11;

DESCRIPTION OF THE PREFERRED EMBODIMENTS

Figure 1:
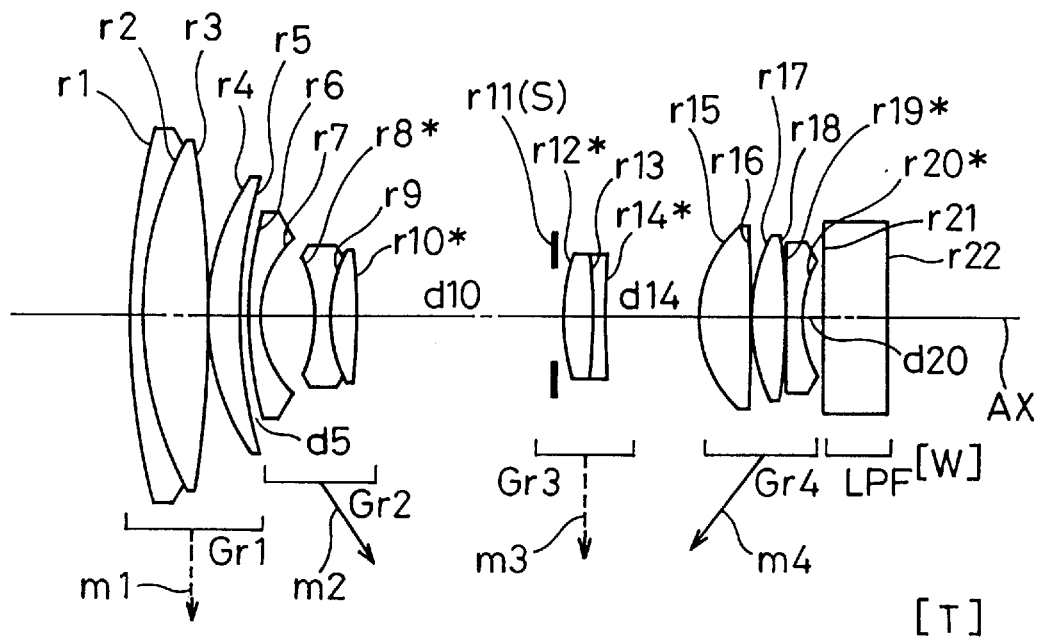
FIG. 1 is a lens arrangement diagram of the zoom lens system of a first embodiment (Example 1) of the present invention.
Figure 2:
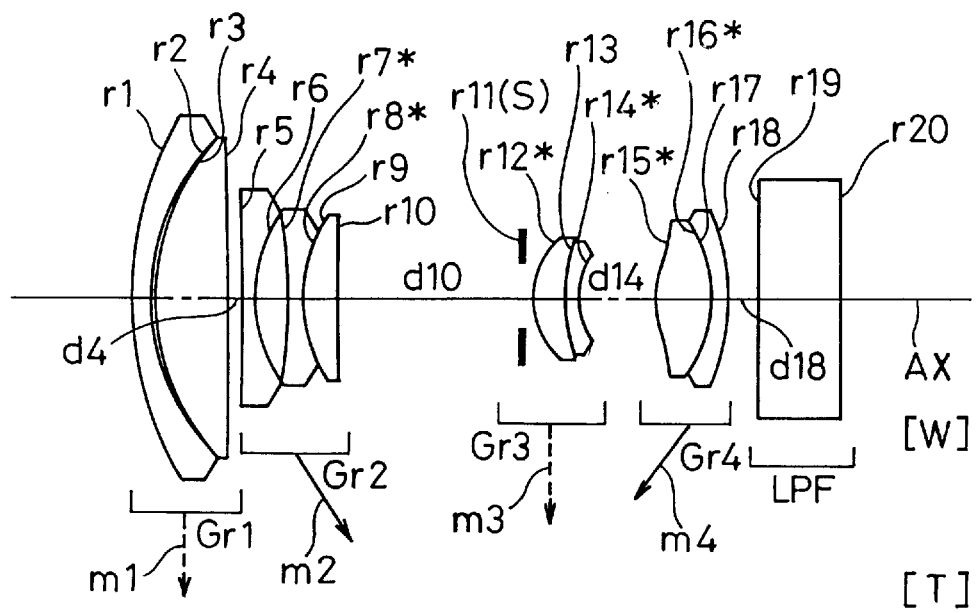
FIG. 2 is a lens arrangement diagram of the zoom lens system of a second embodiment (Example 2) of the present invention.
Figure 3:
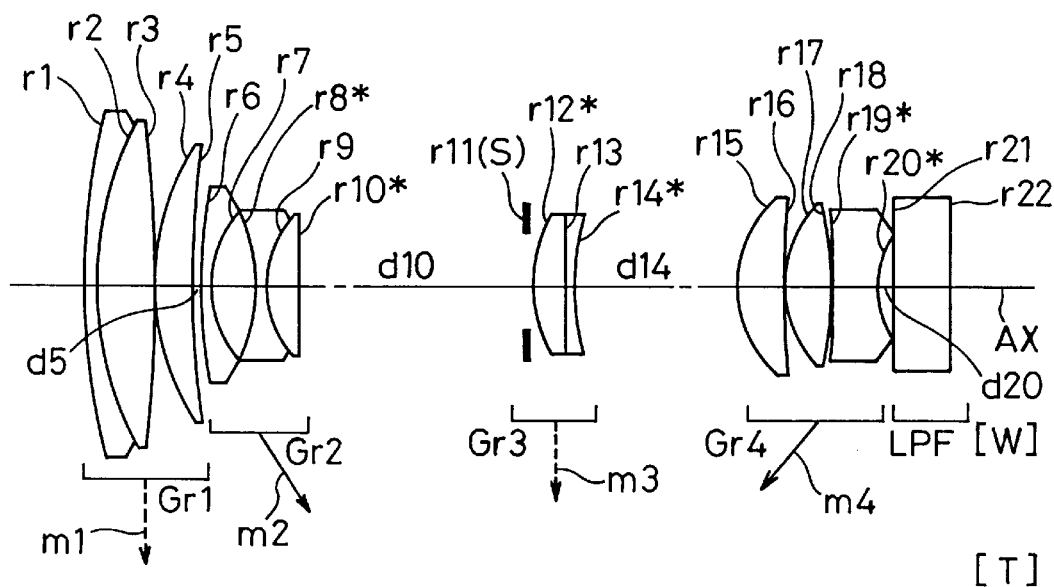
FIG. 3 is a lens arrangement diagram of the zoom lens system of a third embodiment (Example 3) of the present invention.
Figure 7:
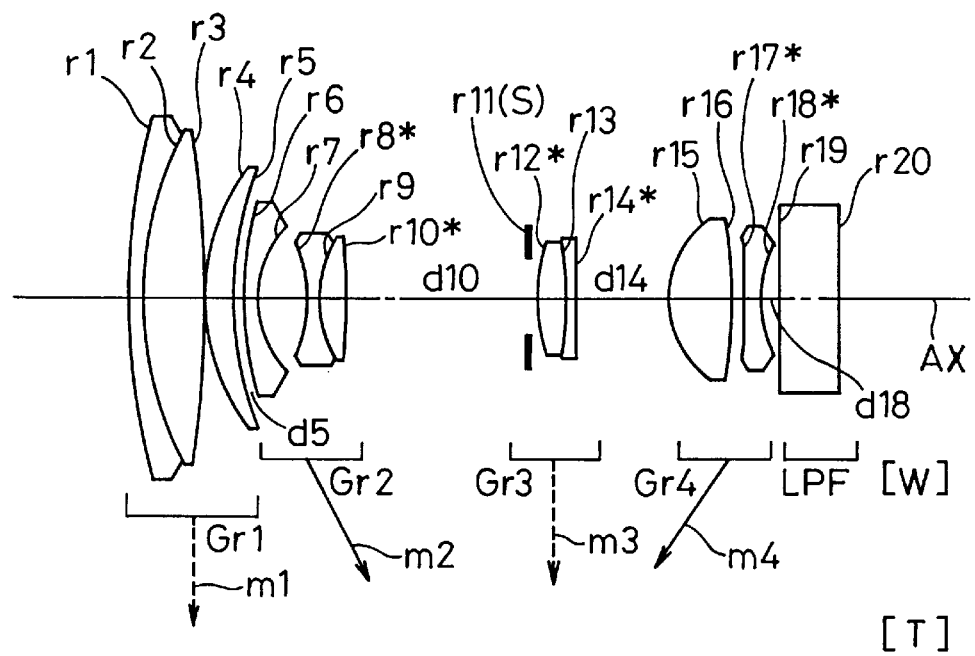
FIG. 7 is a lens arrangement diagram of the zoom lens system of a fourth embodiment (Example 4) of the present invention.
Figure 8:
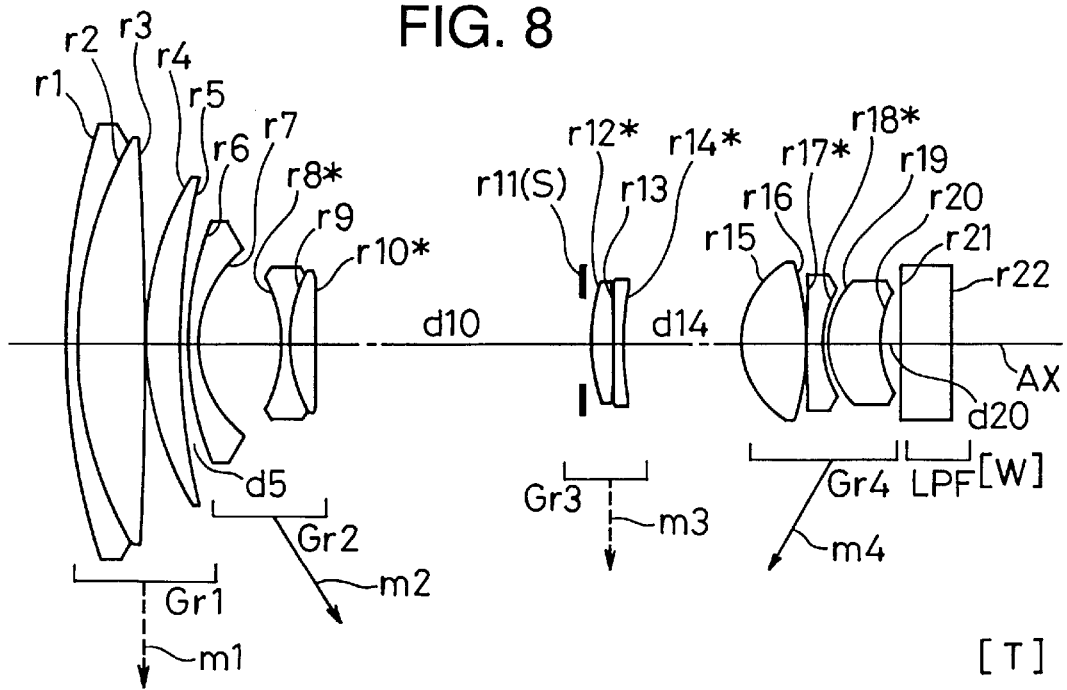
FIG. 8 is a lens arrangement diagram of the zoom lens system of a fifth embodiment (Example 5) of the present invention.
Figure 9:
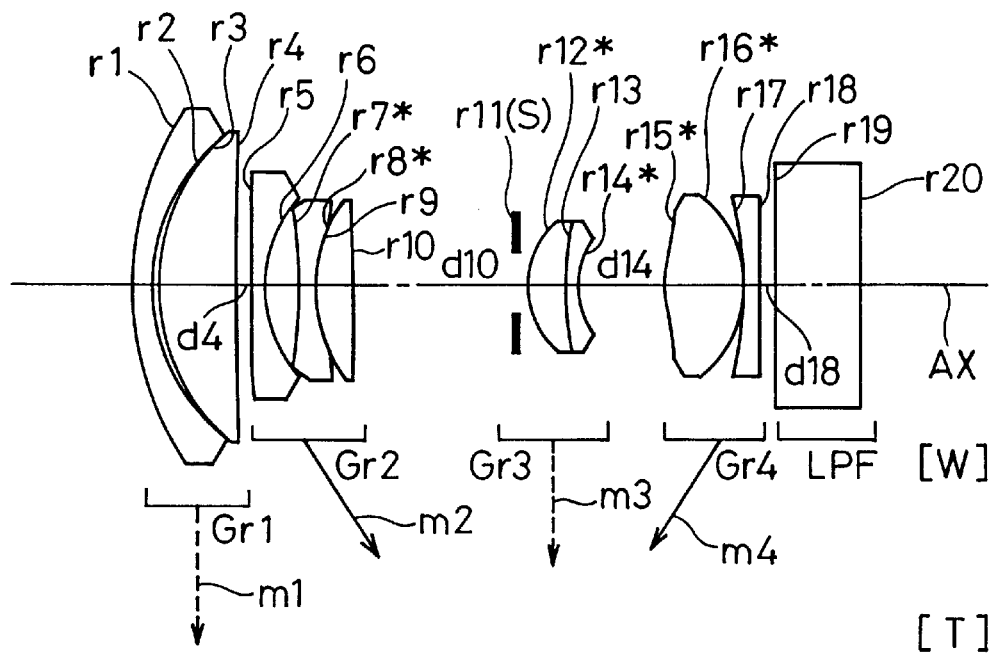
FIG. 9 is a lens arrangement diagram of the zoom lens system of a sixth embodiment (Example 6) of the present invention.
Figure 10:
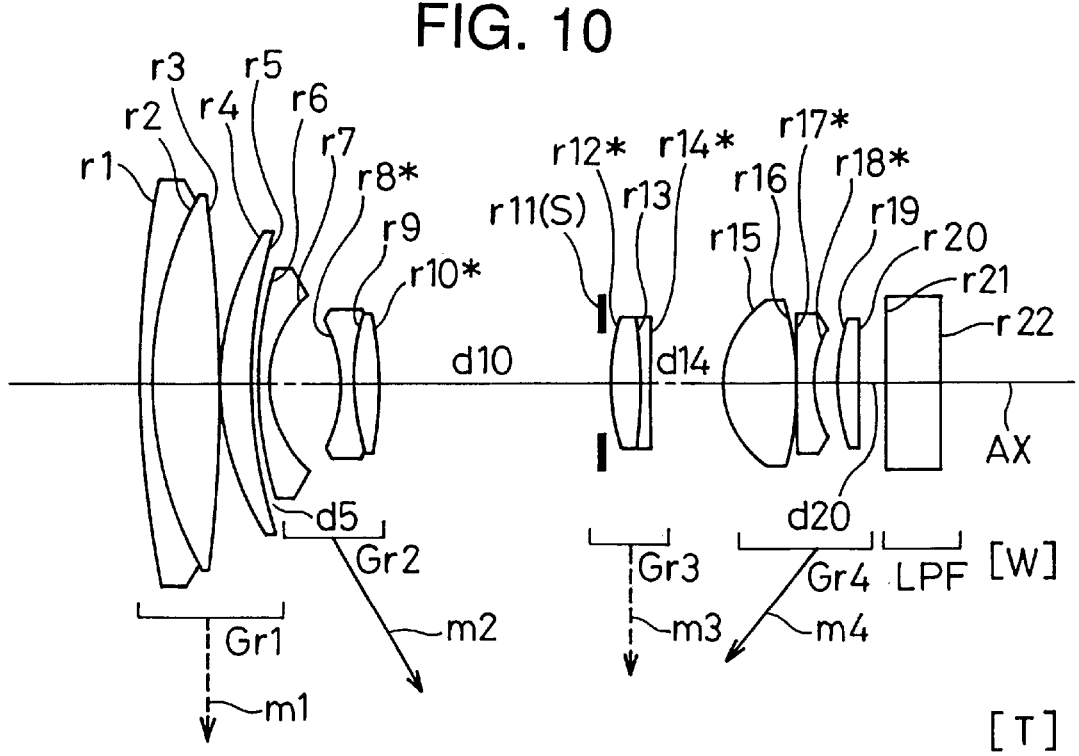
FIG. 10 is a lens arrangement diagram of the zoom lens system of a seventh embodiment (Example 7) of the present invention.
Figure 19:
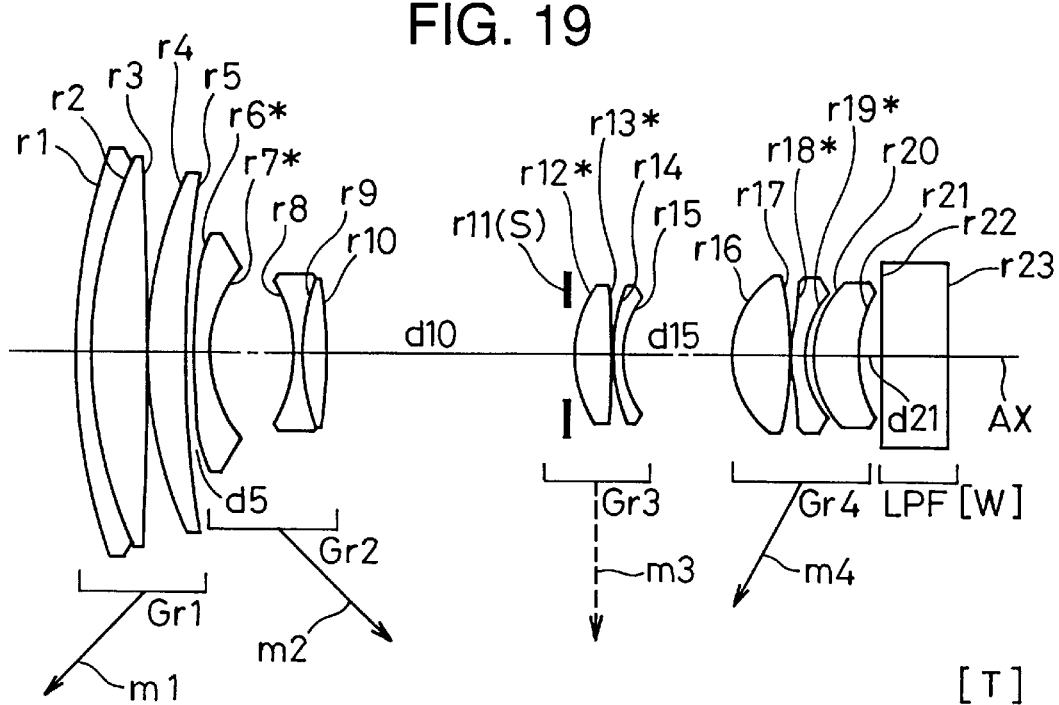
FIG. 19 is a lens arrangement diagram of the zoom lens system of an eighth embodiment (Example 8) of the present invention.
Figure 20:
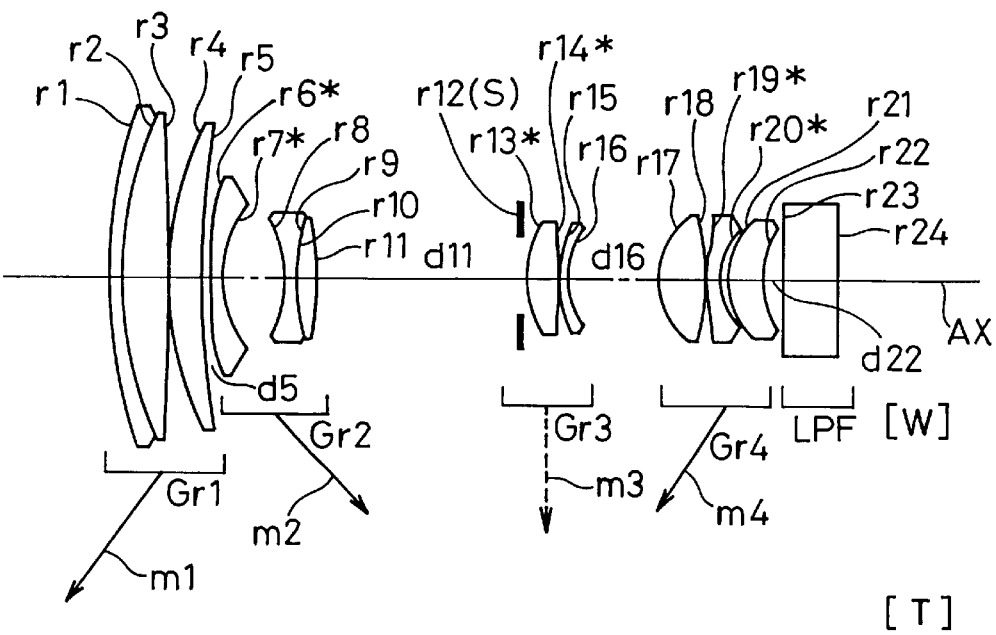
FIG. 20 is a lens arrangement diagram of the zoom lens system of a ninth embodiment (Example 9) of the present invention.
Figure 21:
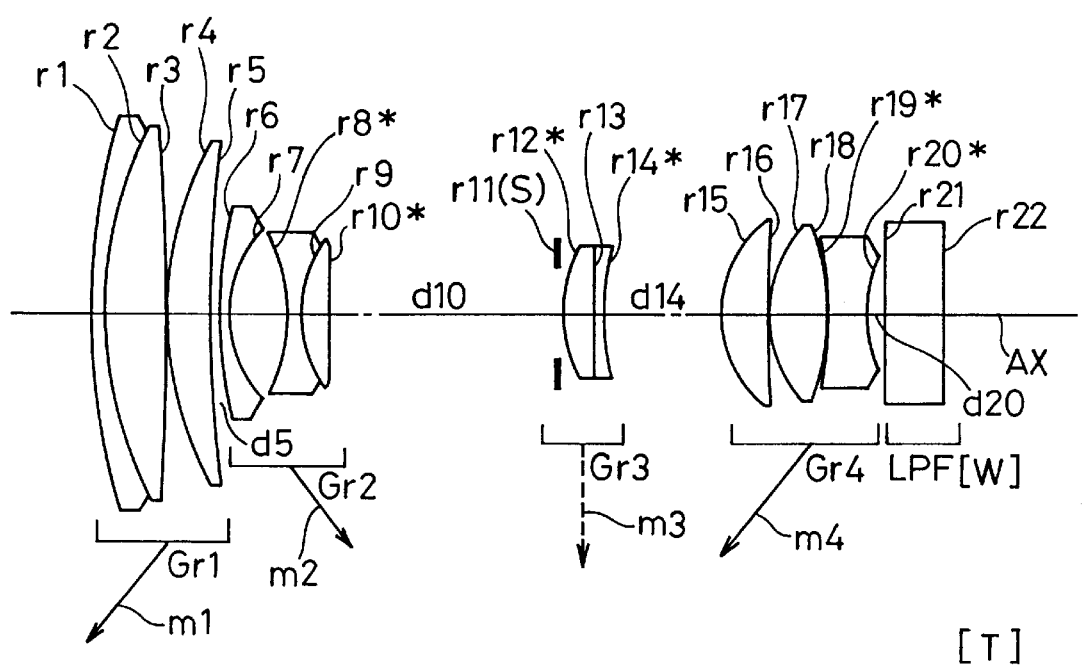
FIG. 21 is a lens arrangement diagram of the zoom lens system of a tenth embodiment (Example 10) of the present invention.
Figure 25:
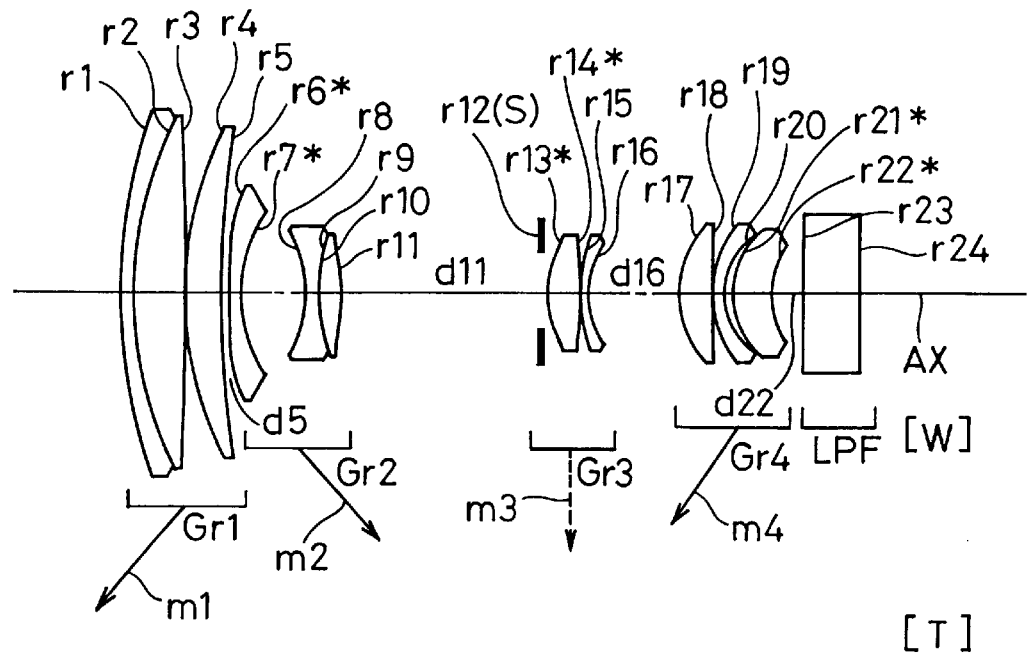
FIG. 25 is a lens arrangement diagram of the zoom lens system of an eleventh embodiment (Example 11) of the present invention.
Figure 26:
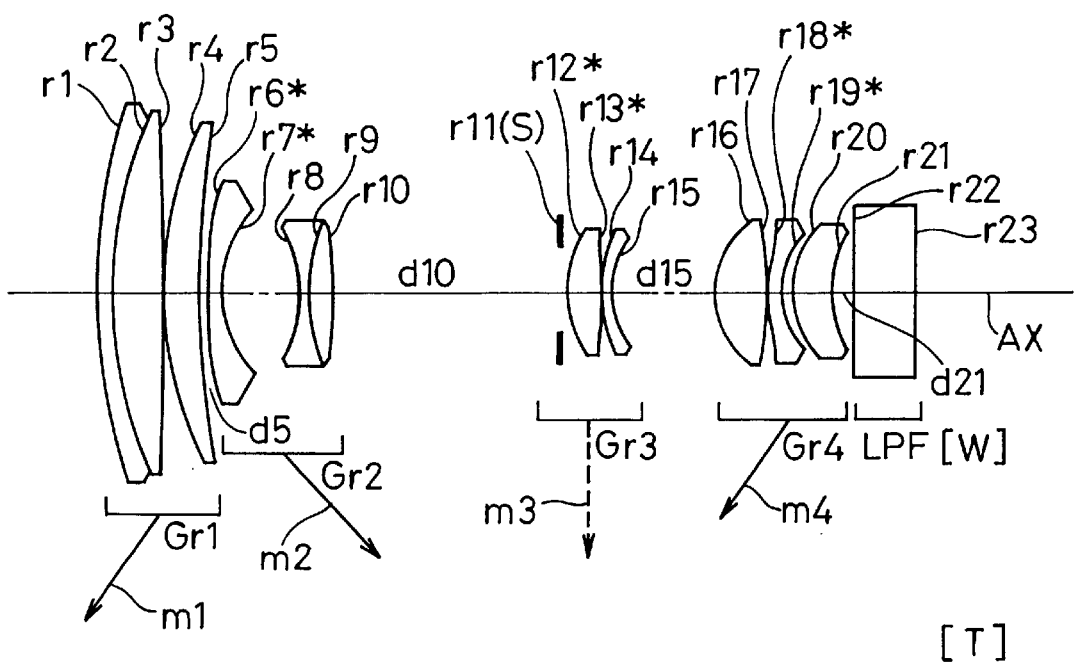
FIG. 26 is a lens arrangement diagram of the zoom lens system of a twelfth embodiment (Example 12) of the present invention.
Figure 27:
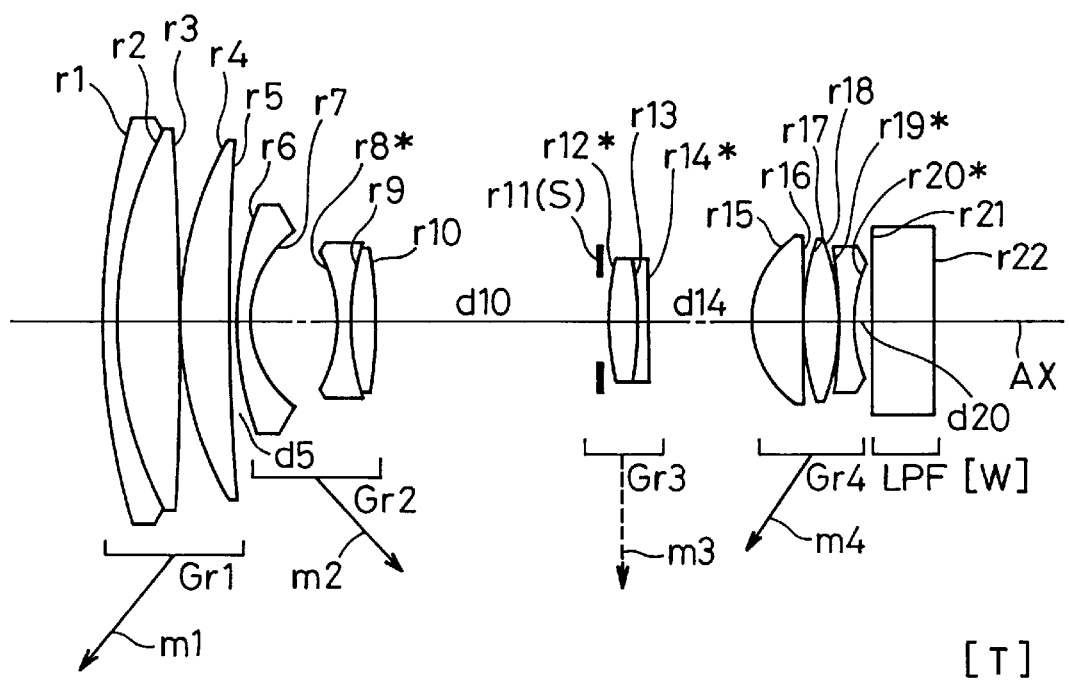
FIG. 27 is a lens arrangement diagram of the zoom lens system of a thirteenth embodiment (Example 13) of the present invention.

Hereinafter, zoom lens systems embodying the present invention will be described with reference to the corresponding drawings. FIGS. 1 to 3, FIGS. 7 to 10, FIGS. 19 to 21, and FIGS. 25 to 27 show the lens arrangement of the zoom lens systems of the first to thirteenth embodiments, respectively, as observed at the wide-angle end [W]. In each lens arrangement diagram, arrow mj (j=1, 2, 3, and 4) schematically indicates the movement of the jth lens unit (Grj) during zooming from the wide-angle end [W] to the telephoto end [T] (note that arrow mj with a broken line indicates that the jth lens unit (Grj) is kept in a fixed position during zooming). Moreover, in each lens arrangement diagram, a surface marked with ri (i=1, 2, 3, . . ) is the ith surface counted from the object (subject) side, and a surface ri marked with an asterisk (*) is an aspherical surface. Furthermore, di (i=1, 2, 3, . . . ) represents the ith axial distance counted from the object side, though only those axial distances between the lens units that vary with zooming are shown.

Note that, in the zoom lens systems of the first to thirteenth embodiments, the lens units are composed solely of refracting lens elements that deflect incoming rays through refraction. However, the lens units may include, for example, diffracting lens elements that deflect incoming rays through diffraction, refracting-diffracting hybrid-type lens elements that deflect incoming rays through the combined effect of refraction and diffraction, or the like. Note also that applications of the zoom lens systems of the first to thirteenth embodiments, although they are designed originally for use in digital still cameras, are not limited to cameras. These zoom lens systems, with their characteristic optical arrangement, can also be used as a zoom lens system or as a part of a zooming optical system (such as the objective unit of an a focal optical system) for use in optical apparatuses other than cameras.

<Embodiments 1 to 3>

The zoom lens systems of the first to third embodiments are each composed of, from the object side, a first lens unit having a positive optical power (Gr1), a second lens unit having a negative optical power (Gr2), a third lens unit having a positive optical power (Gr3), and a fourth lens unit having a positive optical power (Gr4). During zooming from the wide-angle end [W] to the telephoto end [T], the first and third lens units (Gr1 and Gr3) are kept in fixed positions, the second lens unit (Gr2) is moved monotonically from the object side to the image side, and the fourth lens unit (Gr4) is moved monotonically from the image side to the object side. Note that the fourth lens unit (Gr4) has at its image-side end a low-pass filter (LPF) having the shape of a flat plate.

In the zoom lens system of the first embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), and a doublet lens element formed by cementing together a biconvex lens element and a biconcave lens element. The fourth lens unit (Gr4) is composed of a positive meniscus lens element convex to the object side, a biconvex lens element, and a biconcave lens element.

In the zoom lens system of the second embodiment, the lens units are each composed, from the object side, as follows. The first lens unit (Gri) is composed of a negative meniscus lens element convex to the object side, and a positive meniscus lens element convex to the object side. The second lens unit (Gr2) is composed of two biconcave lens elements, and a positive meniscus lens element convex to the object side. The third lens unit (Gr3) is composed of an aperture stop (S), and a doublet lens element formed by cementing together a positive meniscus lens element convex to the object side and a negative meniscus lens element convex to the object side. The fourth lens unit (Gr4) is composed of a biconvex lens element, and a negative meniscus lens element convex to the image side.

In the zoom lens system of the third embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), and a doublet lens element formed by cementing together a biconvex lens element and a biconcave lens element. The fourth lens unit (Gr4) is composed of a positive meniscus lens element convex to the object side, a biconvex lens element, and a biconcave lens element.

In a zoom lens system, like those of the first to third embodiments, that consists of a positive, a negative, a positive, and a positive lens unit and in which, during zooming, the first and third lens units (Gr1 and Gr3) are kept in fixed positions and the second and fourth lens units (Gr2 and Gr4) are moved (in particular, those of the type in which, during zooming from the wide-angle end [W] to the telephoto end [T], the second lens unit (Gr2) is moved monotonically from the object side to the image side and the fourth lens unit (Gr4) is moved monotonically from the image side to the object side), it is preferable that Condition (1) below be fulfilled.

$$2.5 < f1/fW < 8.0 \tag{1}$$

where f1 represents the focal length of the first lens unit (Gri); and fW represents the focal length of the entire zoom lens system at the wide-angle end [W].

Condition (1) defines the ratio of the focal length of the first lens unit (Gr1) to the focal length of the entire zoom lens system to be preferably fulfilled to strike a proper balance between the total length and the aberration characteristics. If the lower limit of Condition (1) is exceeded, the focal length of the first lens unit (Gr1) is so short that the optical power of the first lens unit (Gr1) is too strong. This helps reduce the total length of the zoom lens system, but simultaneously increases aberrations (in particular, the spherical aberration and the longitudinal chromatic aberration on the telephoto side). In contrast, if the upper limit of Condition (1) is exceeded, the focal length of the first lens unit (Gr1) is so long that the optical power of the first lens unit (Gr1) is too weak. This helps reduce aberrations, but simultaneously makes the total length of the zoom lens system unduly long. An unduly long total length demands an unduly large diameter in the front-end lens unit, and thus makes the zoom lens system as a whole unduly large.

In a zoom lens system, like those of the first to third embodiments, that consists of a positive, a negative, a positive, and a positive lens unit and in which, during zooming, the first and third lens units (Gr1 and Gr3) are kept in fixed positions and the second and fourth lens units (Gr2 and Gr4) are moved (in particular, those of the type in which, during zooming from the wide-angle end [W] to the telephoto end [T], the second lens unit (Gr2) is moved monotonically from the object side to the image side and the fourth lens unit (Gr4) is moved monotonically from the image side to the object side), it is preferable that Condition (2) below be fulfilled. Moreover, it is more preferable that Condition (1) noted above be additionally fulfilled.

$$0.7 \times (\beta 34T/\beta 34W) < \beta 2T/\beta 2W < 2.3 \times (\beta 34T/\beta 34W) \tag{2}$$

where $\beta 2W$ represents the lateral magnification of the second lens unit (Gr2) at the wide-angle end [W];

$\beta 2T$ represents the lateral magnification of the second lens unit (Gr2) at the telephoto end [T];

$\beta 34W$ represents the composite lateral magnification of the third and fourth lens units (Gr3 and Gr4) at the wide-angle end [W]; and $\beta 34T$ represents the composite lateral magnification of the third and fourth lens units (Gr3 and Gr4) at the telephoto end [T].

Condition (2) defines the relationship to be preferably fulfilled between the second lens unit (Gr2) and the lens units disposed on the image side thereof in terms of how far they are responsible for zooming. If the lower limit of Condition (2) is exceeded, the responsibility of the second lens unit (Gr2) for zooming is too light (that is, the responsibility of the lens units disposed on the image side of the second lens unit (Gr2) for zooming is too heavy). This increases the variation of aberrations (in particular, the variation of spherical aberration) that accompanies zooming. In contrast, if the upper limit of Condition (2) is exceeded, the responsibility of the second lens unit (Gr2) for zooming is so heavy that the second lens unit (Gr2) needs to be moved for an unduly long distance for zooming. This causes the entrance pupil to be positioned very far at or near the wide-angle end [W], and thus requires that the front-end lens unit have an unduly large diameter.

In a zoom lens system, like those of the first to third embodiments, that consists of a positive, a negative, a positive, and a positive lens unit and in which, during zooming, the first and third lens units (Gr1 and Gr3) are kept in fixed positions and the second and fourth lens units (Gr2 and Gr4) are moved (in particular, those of the type in which, during zooming from the wide-angle end [W] to the telephoto end [T], the second lens unit (Gr2) is moved monotonically from the object side to the image side and the fourth lens unit (Gr4) is moved monotonically from the image side to the object side), it is preferable that Condition (3) below be fulfilled. Moreover, it is more preferable that Condition (1) noted above be additionally fulfilled.

$$0.9 < M2/Z < 2.7 \tag{3}$$

where

M2 represents the displacement amount of the second lens unit (Gr2) during zooming from the wide-angle end [W] to the telephoto end [T]; and Z represents the zoom ratio (which equals fT/fW, where fT represents the focal length of the entire zoom lens system at the telephoto end [T], and fW represents the focal length of the entire zoom lens system at the wide-angle end [W]).

Condition (3) defines the relationship to be preferably fulfilled between the amount of movement of the second lens unit (Gr2) during zooming from the wide-angle end [W] to the telephoto end [T] and the zoom ratio. Note that, in general, the greater the zoom ratio, the larger the amount of movement. Thus, it can be said that Condition (3) defines the range of the preferable amount of movement of the second lens unit (Gr2) to obtain satisfactory optical performance in a compact optical system. If the upper limit of Condition (3) is exceeded, the amount of movement of the second lens unit (Gr2) is too large relative to the zoom ratio, and thus, at the wide-angle end [W], the gap between the second lens unit (Gr2) and the aperture stop (S) is so large that the entrance pupil is positioned very far. This requires that the front-end lens unit have unduly large diameters. In contrast, if the lower limit of Condition (3) is exceeded, the amount of movement of the second lens unit (Gr2) is too small relative to the zoom ratio. A reduction in the amount of movement of the second lens unit (Gr2) is necessarily accompanied by an increase in the optical power in the second lens unit (Gr2). However, an unduly strong optical power in the second lens unit (Gr2) increases the aberrations that occur in the second lens unit (Gr2) (in particular, the distortion and the curvature of field on the wide-angle side).

In a zoom lens system, like those of the first to third embodiments, that consists of a positive, a negative, a positive, and a positive lens unit and in which, during zooming, the first and third lens units (Gr1 and Gr3) are kept in fixed positions and the second and fourth lens units (Gr2 and Gr4) are moved (in particular, those of the type in which, during zooming from the wide-angle end [W] to the telephoto end [T], the second lens unit (Gr2) is moved monotonically from the object side to the image side and the fourth lens unit (Gr4) is moved monotonically from the image side to the object side), it is preferable that Condition (4) below be fulfilled. Moreover, it is more preferable that Conditions (1), and further, Condition (3) noted above be additionally fulfilled.

$$0.2 < f4/f3 < 1.0 \qquad (4)$$

where f3 represents the focal length of the third lens unit (Gr3); and f4 represents the focal length of the fourth lens unit (Gr4).

Condition (4) defines the preferable ratio of the focal length of the third lens unit (Gr3) to the focal length of the fourth lens unit (Gr4). If the lower limit of Condition (4) is exceeded, the focal length of the fourth lens unit (Gr4) is relatively short, and thus the optical power of the fourth lens unit (Gr4) is relatively strong. Accordingly, if the lower limit of Condition (4) is exceeded, it is difficult to correct off-axial optical performance (in particular, the curvature of field at the wide-angle end [W]) properly. In contrast, if the upper limit of Condition (4) is exceeded, the focal length of the third lens unit (Gr3) is relatively short, and thus the optical power of the third lens unit (Gr3) is relatively strong. Accordingly, if the upper limit of Condition (4) is exceeded, it is difficult to correct the spherical aberration properly over the entire zoom range.

In a zoom lens system, like those of the first to third embodiments, that consists of a positive, a negative, a positive, and a positive lens unit and in which, during zooming, the first and third lens units (Gr1 and Gr3) are kept in fixed positions and the second and fourth lens units (Gr2 and Gr4) are moved (in particular, those of the type in which, during zooming from the wide-angle end [W] to the telephoto end [T], the second lens unit (Gr2) is moved monotonically from the object side to the image side and the fourth lens unit (Gr4) is moved monotonically from the image side to the object side), it is preferable that Condition (5) below be fulfilled.

$$0.4 < \log(\beta 2T/\beta 2W)/\log(Z) < 0.75 \qquad (5)$$

where $\beta 2W$ represents the lateral magnification of the second lens unit (Gr2) at the wide-angle end [W]; and $\beta 2T$ represents the lateral magnification of the second lens unit (Gr2) at the telephoto end [T].

In Condition (5), the term "$\log(\beta 2T/\beta 2W)/\log(Z)$" defines how far the second lens unit (Gr2) is responsible for the zooming achieved by the entire zoom lens system. Condition (5) assumes that the second lens unit (Gr2) is responsible for zooming substantially to the same extent as the lens units other than the second lens unit (Gr2) are. If the lower limit of Condition (5) is exceeded, the responsibility of the lens units disposed on the image side of the second lens unit (Gr2) for zooming is so heavy that spherical aberration cannot be corrected properly. In contrast, if the upper limit of Condition (5) is exceeded, the responsibility of the second lens unit (Gr2) for zooming is so heavy that distortion and curvature of field cannot be corrected properly.

In a zoom lens system, like those of the first to third embodiments, that consists of a positive, a negative, a positive, and a positive lens unit and in which, during zooming, the first and third lens units (Gr1 and Gr3) are kept in fixed positions and the second and fourth lens units (Gr2 and Gr4) are moved (in particular, those of the type in which, during zooming from the wide-angle end [W] to the telephoto end [T], the second lens unit (Gr2) is moved monotonically from the object side to the image side and the fourth lens unit (Gr4) is moved monotonically from the image side to the object side), the use of an aspherical surface makes it possible to obtain more satisfactory optical performance effectively. For example, it is preferable to use an aspherical surface that fulfills Condition (6) below at least on one surface in the second lens unit (Gr2).

$$0.45 < (|x| - |x0|)/\{C0(N' - N) \cdot f2\} < 0 \qquad (6)$$

where x represents the deviation (mm) of the aspherical surface in a direction perpendicular to the optical axis (AX) direction of the aspherical surface;

x0 represents the deviation (mm) of the reference spherical surface in a direction perpendicular to the optical axis (AX) direction of the reference spherical surface;

C0 represents the curvature of the reference spherical surface (i.e. the nominal curvature of the aspherical surface (mm$^{-1}$));

N represents the refractive index of the object-side medium of the aspherical surface for the d-line;

N' represents the refractive index of the image-side medium of the aspherical surface for the d-line; and f2 represents the focal length (mm) of the second lens unit (Gr2), where x and x0 are defined respectively by Formulae (AS) and (RE) below. Note that x represents the shape of the aspherical surface, and x0 represents the shape of the reference spherical surface.

$$x = (C0 \cdot y^2) / \left(1 + \sqrt{1 - \varepsilon \cdot C0^2 \cdot y^2}\right) + \Sigma(Ai \cdot y^i) \quad \text{(AS)}$$

$$x0 = (C0 \cdot y^2) / \left(1 + \sqrt{1 - C0^2 \cdot y^2}\right) \quad \text{(RE)}$$

where
  y represents the height in a direction perpendicular to the optical axis (AX);
  ε represents the quadric surface parameter; and
  Ai represents the aspherical coefficient of the ith order.

Condition (6) defines the aspherical surface as being so shaped as to weaken the negative optical power of the second lens unit (Gr2). Fulfillment of Condition (6) makes it possible to achieve proper correction of aberrations, in particular the distortion and the curvature of field on the wide-angle side. If the lower limit of Condition (6) is exceeded, the positive distortion increases on the wide-angle side, and simultaneously the inclination of the image plane in the positive direction becomes unduly large. In contrast, if the upper limit of Condition (6) is exceeded, the negative distortion increases on the wide-angle side, and simultaneously the inclination of the image plane in the negative direction becomes unduly large. Note that, in a case where the second lens unit (Gr2) includes a plurality of aspherical surfaces, at least one of those aspherical surfaces needs to fulfill Condition (6) above; that is, the other aspherical surfaces do not necessarily have to fulfill Condition (6) above, if that is advantageous for the correction of other aberrations.

It is preferable that the fourth lens unit (Gr4) include at least one aspherical surface that fulfills Condition (7) below.

$$0.8 < (|x| - |x0|) / \{C0(N' - N) \cdot f4\} < 0 \quad (7)$$

Condition (7) defines the aspherical surface as being so shaped as to weaken the positive optical power of the fourth lens unit (Gr4). Fulfillment of Condition (7) makes it possible to achieve proper correction of aberrations, in particular the distortion and the curvature of field on the wide-angle side as well as the spherical aberration on the telephoto side. If the lower limit of Condition (7) is exceeded, the positive distortion increases on the wide-angle side, and simultaneously the inclination of the image plane in the positive direction becomes unduly large. Moreover, spherical aberration appears notably in the positive direction on the telephoto side. In contrast, if the upper limit of Condition (7) is exceeded, the negative distortion increases on the wide-angle side, and simultaneously the inclination of the image plane in the negative direction becomes unduly large. Moreover, spherical aberration appears notably in the negative direction on the telephoto side.

<Embodiments 4 to 7>

The zoom lens systems of the fourth to seventh embodiments are each composed of, from the object side, a first lens unit having a positive optical power (Gr1), a second lens unit having a negative optical power (Gr2), a third lens unit having a positive optical power (Gr3), and a fourth lens unit having a positive optical power (Gr4). During zooming from the wide-angle end [W] to the telephoto end [T], the first and third lens units (Gr1 and Gr3) are kept in fixed positions, the second lens unit (Gr2) is moved monotonically from the object side to the image side, and the fourth lens unit (Gr4) is moved monotonically from the image side to the object side. Note that the fourth lens unit (Gr4) has at its image-side end a low-pass filter (LPF) having the shape of a flat plate.

In the zoom lens system of the fourth embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), and a doublet lens element formed by cementing together a biconvex lens element and a biconcave lens element. The fourth lens unit (Gr4) is composed of a biconvex lens element, and a negative meniscus lens element convex to the object side.

In the zoom lens system of the fifth embodiment, the lens units are each composed, from the object side, as follows. The first lens unit (Gri) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), and a doublet lens element formed by cementing together a biconvex lens element and a biconcave lens element. The fourth lens unit (Gr4) is composed of a biconvex lens element, a negative meniscus lens element convex to the object side, and a positive meniscus lens element convex to the object side.

In the zoom lens system of the sixth embodiment, the lens units are each composed, from the object side, as follows. The first lens unit (Gr1) is composed of a negative meniscus lens element convex to the object side, and a positive meniscus lens element convex to the object side. The second lens unit (Gr2) is composed of a negative meniscus lens element convex to the object side, a biconcave lens element, and a plano-convex lens element convex to the object side. The third lens unit (Gr3) is composed of an aperture stop (S), and a doublet lens element formed by cementing together a positive meniscus lens element convex to the object side and a negative meniscus lens element convex to the object side. The fourth lens unit (Gr4) is composed of a biconvex lens element, and a biconcave lens element.

In the zoom lens system of the seventh embodiment, the lens units are each composed, from the object side, as follows. The first lens unit (Gri) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), and a doublet lens element formed by cementing together a biconvex lens element and a biconcave lens element. The fourth lens unit (Gr4) is composed of a biconvex lens element, a biconcave lens element, and a positive meniscus lens element convex to the object side.

Two examples of focusing methods that are considered fit for a zoom lens system like those of the fourth to seventh embodiments are: a front-end-unit-focusing method in which focusing is achieved by moving the first lens unit (Gr1), and an inner-unit-focusing method in which focusing is achieved by moving the fourth lens unit (Gr4). According to the former focusing method, the first lens unit (Gr1) is moved out toward the object side for focusing on a close-distance object, and therefore the front-end lens unit needs to be given a comparatively large diameter in order to secure sufficient amount of peripheral light. Moreover, the lens unit that is moved for focusing is kept in a fixed position during zooming. This is inefficient. On the other hand, according to the latter focusing method, although the third and fourth lens units (Gr3 and Gr4) come closest to each other in the range from the middle-focal-length position [M] to the telephoto end [T], where a relatively large amount of movement is required for focusing, it is necessary to secure a sufficient space between the third and fourth lens units (Gr3 and Gr4) to achieve focusing. This is also inefficient.

For these reasons, the zoom lens systems of the fourth to seventh embodiments adopt the inner-unit-focusing method, and thus perform focusing by moving the second lens unit (Gr2); more precisely, for focusing on a close-distance object, it moves the second lens unit (Gr2) toward the object side. Where focusing is performed by moving the second lens unit (Gr2) in this way, the first and second lens units (Gr1 and Gr2) come closest to each other at the wide-angle end [W], where a minimum amount of movement of the second lens unit (Gr2) is required for focusing. This makes it possible to secure a space for focusing very efficiently.

In a zoom lens system, like those of the fourth to seventh embodiments, that consists of a positive, a negative, a positive, and a positive lens unit and in which, during zooming from the wide-angle end [W] to the telephoto end [T], the first and third lens units (Gr1 and Gr3) are kept in fixed positions, the second lens unit (Gr2) is moved from the object side to the image side, and simultaneously the fourth lens unit (Gr4) is so moved as to compensate the movement of the image plane properly, and in which the second lens unit (Gr2) is moved for focusing, it is preferable that Condition (8) below be fulfilled.

$$0.5 < |\beta 2T| < 0.98 \tag{8}$$

where

β2T represents the lateral magnification of the second lens unit (Gr2) at the telephoto end [T].

Condition (8) defines the lateral magnification of the second lens unit (Gr2) at the telephoto end [T] to be preferably fulfilled. If the lower limit of Condition (8) is exceeded, the total length is too long and the diameter of the front-end lens unit is too large, and simultaneously, spherical aberration appears notably toward the positive side. In contrast, if the upper limit of Condition (8) is exceeded, spherical aberration appears notably toward the negative side.

In a zoom lens system, like those of the fourth to seventh embodiments, that consists of a positive, a negative, a positive, and a positive lens unit and in which, during zooming from the wide-angle end [W] to the telephoto end [T], the first and third lens units (Gr1 and Gr3) are kept in fixed positions, the second lens unit (Gr2) is moved from the object side to the image side, and simultaneously the fourth lens unit (Gr4) is so moved as to compensate the movement of the image plane properly, and in which the second lens unit (Gr2) is moved for focusing, it is preferable that Condition (9) below be fulfilled. Moreover, it is more preferable that Condition (8) noted above be additionally fulfilled.

$$3.0 < f1/fW < 9.0 \tag{9}$$

where f1 represents the focal length of the first lens unit (Gr1); and fW represents the focal length of the entire zoom lens system at the wide-angle end [W].

Condition (9) defines the ratio of the focal length of the first lens unit (Gr1) to the focal length of the entire zoom lens system to be preferably fulfilled to strike a proper balance between the total length and the aberration characteristics. If the lower limit of Condition (9) is exceeded, the focal length of the first lens unit (Gr1) is so short that the optical power of the first lens unit (Gr1) is too strong. This helps reduce the total length of the zoom lens system, but simultaneously increases aberrations (in particular, the spherical aberration and the longitudinal chromatic aberration on the telephoto side). In contrast, if the upper limit of Condition (9) is exceeded, the focal length of the first lens unit (Gr1) is so long that the optical power of the first lens unit (Gr1) is too weak. This helps reduce aberrations, but simultaneously makes the total length of the zoom lens system unduly long. An unduly long total length demands an unduly large diameter in the front-end lens unit, and thus makes the zoom lens system as a whole unduly large.

In a zoom lens system, like those of the fourth to seventh embodiments, that consists of a positive, a negative, a positive, and a positive lens unit and in which, during zooming from the wide-angle end [W] to the telephoto end [T], the first and third lens units (Gr1 and Gr3) are kept in fixed positions, the second lens unit (Gr2) is moved monotonically from the object side to the image side, and simultaneously the fourth lens unit (Gr4) is moved monotonically from the image side to the object side, and in which the second lens unit (Gr2) is moved for focusing, it is preferable that Condition (10) below be fulfilled.

$$0.15 < M4/M2 < 0.55 \tag{10}$$

where

M2 represents the displacement amount of the second lens unit (Gr2) during zooming from the wide-angle end [W] to the telephoto end [T]; and M4 represents the displacement amount of the fourth lens unit (Gr4) during zooming from the wide-angle end [W] to the telephoto end [T].

Condition (10) defines the ratio of the amount of movement of the fourth lens unit (Gr4) to that of the second lens unit (Gr2) during zooming from the wide-angle end [W] to the telephoto end [T]. Fulfillment of Condition (10) makes it possible to keep the ratio of the responsibility of the second lens unit (Gr2) for zooming to the responsibility of the lens units other than the second lens unit (Gr2) for zooming in an appropriate range, and thereby strike a proper balance between the size of the zoom lens system and the aberration characteristics. If the lower limit of Condition (10) is exceeded, the amount of movement of the second lens unit (Gr2) is too large, and thus the entrance pupil is positioned too far. This requires that the front-end lens unit have an unduly large diameter. Moreover, the responsibility of the second lens unit (Gr2) for zooming is so heavy that distortion and curvature of field cannot be corrected properly. In contrast, if the upper limit of Condition (10) is exceeded, the amount of movement of the second lens unit (Gr2) is too small, and thus the responsibility of the lens units disposed on the image side of the second lens unit (Gr2) for zooming is so heavy that spherical aberration cannot be corrected properly.

In a zoom lens system, like those of the fourth to seventh embodiments, that consists of a positive, a negative, a positive, and a positive lens unit and in which, during zooming from the wide-angle end [W] to the telephoto end [T], the first and third lens units (Gr1 and Gr3) are kept in fixed positions, the second lens unit (Gr2) is moved monotonically from the object side to the image side, and simultaneously the fourth lens unit (Gr4) is moved monotonically from the image side to the object side, and in which the second lens unit (Gr2) is moved for focusing, it is preferable that Condition (11) below be fulfilled. Moreover, it is more preferable that Condition (10) noted above be additionally fulfilled.

$$0.4 < \log(\beta 2T/\beta 2W)/\log(Z) < 0.75 \quad (11)$$

where $\beta 2W$ represents the lateral magnification of the second lens unit (Gr2) at the wide-angle end [W]; and Z represents the zoom ratio (which equals fT/fW, where fW represents the focal length of the entire zoom lens system at the wide-angle end [W]; and fT represents the focal length of the entire zoom lens system at the telephoto end [T].

In Condition (11), the term "$\log(\beta 2T/\beta 2W)/\log(Z)$" defines how far the second lens unit (Gr2) is responsible for the zooming achieved by the entire zoom lens system. Condition (11) assumes that the second lens unit (Gr2) is responsible for zooming substantially to the same extent as the lens units other than the second lens unit (Gr2) are. If the lower limit of Condition (11) is exceeded, the responsibility of the lens units disposed on the image side of the second lens unit (Gr2) for zooming is so heavy that spherical aberration cannot be corrected properly. In contrast, if the upper limit of Condition (11) is exceeded, the responsibility of the second lens unit (Gr2) for zooming is so heavy that distortion and curvature of field cannot be corrected properly.

In a zoom lens system, like those of the fourth to seventh embodiments, that consists of a positive, a negative, a positive, and a positive lens unit and in which, during zooming from the wide-angle end [W] to the telephoto end [T], the first and third lens units (Gr1 and Gr3) are kept in fixed positions, the second lens unit (Gr2) is moved from the object side to the image side, and simultaneously the fourth lens unit (Gr4) is so moved as to compensate the movement of the image plane properly, and in which the second lens unit (Gr2) is moved for focusing, the use of an aspherical surface makes it possible to obtain more satisfactory optical performance. For example, it is preferable to use an aspherical surface that fulfills Condition (12) below at least on one surface in the second lens unit (Gr2).

$$-0.45 < (|x|-|x0|)/\{C0(N'-N)\cdot f2\} < 0 \quad (12)$$

where x represents the deviation (mm) of the aspherical surface in a direction perpendicular to the optical axis (AX) direction of the aspherical surface;

x0 represents the deviation (mm) of the reference spherical surface in a direction perpendicular to the optical axis (AX) direction of the reference spherical surface;

C0 represents the curvature of the reference spherical surface (i.e. the nominal curvature of the aspherical surface ($mm^{-1}$));

N represents the refractive index of the object-side medium of the aspherical surface for the d-line;

N' represents the refractive index of the image-side medium of the aspherical surface for the d-line; and f2 represents the focal length (mm) of the second lens unit (Gr2), where x and x0 are defined respectively by Formulae (AS) and (RE) noted previously. Note that x represents the shape of the aspherical surface, and x0 represents the shape of the reference spherical surface.

Condition (12) defines the aspherical surface as being so shaped as to weaken the negative optical power of the second lens unit (Gr2). Fulfillment of Condition (12) makes it possible to achieve proper correction of aberrations, in particular the distortion and the curvature of field on the wide-angle side in a close-distance shooting condition. If the lower limit of Condition (12) is exceeded, the positive distortion increases on the wide-angle side, in particular in the close-distance shooting condition, and simultaneously the inclination of the image plane in the positive direction becomes unduly large. In contrast, if the upper limit of Condition (12) is exceeded, the negative distortion increases on the wide-angle side, in particular in the close-distance shooting condition, and simultaneously the inclination of the image plane in the negative direction becomes unduly large. Note that, in a case where the second lens unit (Gr2) includes a plurality of aspherical surfaces, at least one of those aspherical surfaces needs to fulfill Condition (12) above; that is, the other aspherical surfaces do not necessarily have to fulfill Condition (12) above, if that is advantageous for the correction of other aberrations.

It is preferable that the fourth lens unit (Gr4) include at least one aspherical surface that fulfills Condition (13) below.

$$-0.8 < (|x|-|x0|)/\{C0(N'-N)\cdot f4\} < 0 \quad (13)$$

where f4 represents the focal length (mm) of the fourth lens unit (Gr4).

Condition (13) defines the aspherical surface as being so shaped as to weaken the positive optical power of the fourth lens unit (Gr4). Fulfillment of Condition (13) makes it possible to achieve proper correction of aberrations, in particular the distortion and the curvature of field on the wide-angle side as well as the spherical aberration on the telephoto side. If the lower limit of Condition (13) is exceeded, the positive distortion increases on the wide-angle side, and simultaneously the inclination of the image plane in the positive direction becomes unduly large. Moreover, spherical aberration appears notably in the positive direction on the telephoto side. In contrast, if the upper limit of Condition (13) is exceeded, the negative distortion increases on the wide-angle side, and simultaneously the inclination of the image plane in the negative direction becomes unduly large. Moreover, spherical aberration appears notably in the negative direction on the telephoto side.

<Embodiments 8 to 10>

The zoom lens systems of the eighth to tenth embodiments are each composed of, from the object side, a first lens unit having a positive optical power (Gr1), a second lens unit having a negative optical power (Gr2), a third lens unit having a positive optical power (Gr3), and a fourth lens unit having a positive optical power (Gr4). During zooming from the wide-angle end [W] to the telephoto end [T], the third lens unit (Gr3) is kept in a fixed position, the first and fourth lens units (Gr1 and Gr4) are moved monotonically toward the object side, and the second lens unit (Gr2) is moved monotonically toward the image side. Note that the fourth lens unit (Gr4) has at its image-side end a low-pass filter (LPF) having the shape of a flat plate.

In the zoom lens system of the eighth embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), a biconvex lens element, and a negative meniscus lens element convex to the object side. The fourth lens unit (Gr4) is composed of a biconvex lens element, a negative meniscus lens element convex to the object side, and a positive meniscus lens element convex to the object side.

In the zoom lens system of the ninth embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, a biconcave lens element, and a biconvex lens element. The third lens unit (Gr3) is composed of an aperture stop (S), a biconvex lens element, and a negative meniscus lens element convex to the object side. The fourth lens unit (Gr4) is composed of a biconvex lens element, a negative meniscus lens element convex to the object side, and a positive meniscus lens element convex to the object side.

In the zoom lens system of the tenth embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), and a doublet lens element formed by cementing together a biconvex lens element and a biconcave lens element. The fourth lens unit (Gr4) is composed of a positive meniscus lens element convex to the object side, a biconvex lens element, and a biconcave lens element.

In a zoom lens system, like those of the eighth to tenth embodiments, that consists of a positive, a negative, a positive, and a positive lens unit and in which, during zooming, the third lens unit (Gr3) is kept in a fixed position and the first, second, and fourth lens units (Gr1, Gr2, and Gr4) are moved, it is preferable that Condition (14) below be fulfilled.

$$-5.0 < M1/Y\max < -1.0 \tag{14}$$

where

M1 represents the displacement amount of the first lens unit (Gr1) from the wide-angle end [W] to the telephoto end [T] (assuming that the direction pointing to the object side is negative); and Ymax represents the maximum image height.

Condition (14) defines the amount of movement of the first lens unit (Gr1) during zooming to be preferably fulfilled to strike a proper balance between the total length and the diameter of the front-end lens unit. If the lower limit of Condition (14) is exceeded, the amount of movement of the first lens unit (Gr1) during zooming is so large that the total length of the zoom lens system becomes unduly long at the telephoto end [T], and simultaneously the diameter of the front-end lens unit needs to be unduly large in order to secure sufficient amount of peripheral light at the telephoto end [T]. In contrast, if the upper limit of Condition (14) is exceeded, the amount of movement of the first lens unit (Gr1) during zooming is so small that the total length of the zoom lens system becomes unduly long at the wide-angle end [W], and simultaneously the diameter of the front-end lens unit needs to be unduly large in order to secure sufficient amount of peripheral light at the wide-angle end [W].

In a zoom lens system, like those of the eighth to tenth embodiments, that consists of a positive, a negative, a positive, and a positive lens unit and in which, during zooming, the third lens unit (Gr3) is kept in a fixed position and the first, second, and fourth lens units (Gr1, Gr2, and Gr4) are moved, it is preferable that Condition (15) below be fulfilled. Moreover, it is more preferable that Condition (14) noted above be additionally fulfilled.

$$1.0 < M4/M2 < -0.1 \tag{15}$$

where

M2 represents the displacement amount of the second lens unit (Gr2) from the wide-angle end [W] to the telephoto end [T] (assuming that the direction pointing to the object side is negative); and M4 represents the displacement amount of the fourth lens unit (Gr4) from the wide-angle end [W] to the telephoto end [T] (assuming that the direction pointing to the object side is negative).

Condition (15) defines the ratio of the amount of movement of the fourth lens unit (Gr4) to that of the second lens unit (Gr2) during zooming to be preferably fulfilled. If the lower limit of Condition (15) is exceeded, the amount of movement of the fourth lens unit (Gr4) is too large. As a result, the responsibility of the fourth lens unit (Gr4) for zooming is so heavy that spherical aberration cannot be corrected properly. In contrast, if the upper limit of Condition (15) is exceeded, the amount of movement of the second lens unit (Gr2) is too large. This increases the distance between the second lens unit (Gr2) and the aperture stop (S) at the wide-angle end [W]. As a result, the entrance pupil is positioned too far, and thus the front-end lens unit needs to be given an unduly large diameter. Moreover, the responsibility of the second lens unit (Gr2) for zooming is so heavy that distortion and curvature of field cannot be corrected properly.

In a zoom lens system, like those of the eighth to tenth embodiments, that consists of a positive, a negative, a positive, and a positive lens unit and in which, during zooming, the third lens unit (Gr3) is kept in a fixed position and the first, second, and fourth lens units (Gr1, Gr2, and Gr4) are moved, it is preferable that Condition (16) below be fulfilled. Moreover, it is more preferable that Condition (14) noted above be additionally fulfilled.

$$0.2 < \log(\beta 2T/\beta 2W)/\log(Z) < 0.9 \tag{16}$$

where

β2W represents the lateral magnification of the second lens unit (Gr2) at the wide-angle end [W];

β2T represents the lateral magnification of the second lens unit (Gr2) at the telephoto end [T]; and Z represents the zoom ratio (which equals fT/fW, where fr represents the focal length of the entire zoom lens system at the telephoto end [T]; and fW represents the focal length of the entire zoom lens system at the wide-angle end [W]).

In Condition (16), the term "log(β2T/β2W)/log(Z)" defines how far the second lens unit (Gr2) is responsible for the zooming achieved by the entire zoom lens system. If the lower limit of Condition (16) is exceeded, the responsibility of the lens units disposed on the image side of the second lens unit (Gr2) for zooming is so heavy that spherical aberration cannot be corrected properly. In contrast, if the upper limit of Condition (16) is exceeded, the responsibility of the second lens unit (Gr2) for zooming is so heavy that distortion and curvature of field cannot be corrected properly.

In a zoom lens system, like those of the eighth to tenth embodiments, that consists of a positive, a negative, a positive, and a positive lens unit and in which, during zooming, the third lens unit (Gr3) is kept in a fixed position and the first, second, and fourth lens units (Gr1, Gr2, and Gr4) are moved (in particular, those of the type in which, during zooming from the wide-angle end [W] to the telephoto end [T], the first and fourth lens units (Gr1 and Gr4) are moved monotonically to the object side and the second lens unit (Gr2) is moved monotonically to the image side), the use of an aspherical surface makes it possible to obtain more satisfactory optical performance. For example, it is preferable to use an aspherical surface that fulfills Condition (17) below in the second lens unit (Gr2). Moreover, it is more preferable that Conditions (14) and (15), or Conditions (14) and (16) noted above be additionally fulfilled.

$$0<(x-x0)/(N'-N)<0.9 \tag{17}$$

where x represents the deviation of the aspherical surface in a direction perpendicular to the optical axis (AX) direction of the aspherical surface (in millimeters, assuming that the direction pointing to the object side is negative);

x0 represents the deviation of the reference spherical surface in a direction perpendicular to the optical axis (AX) direction of the reference spherical surface (in millimeters, assuming that the direction pointing to the object side is negative);

N represents the refractive index of the object-side medium of the aspherical surface for the d-line; and N' represents the refractive index of the image-side medium of the aspherical surface for the d-line, where x and x0 are defined respectively by Formulae (AS) and (RE) noted previously. Note that x represents the shape of the aspherical surface, and x0 represents the shape of the reference spherical surface.

Condition (17) defines the aspherical surface as being so shaped as to weaken the negative optical power of the second lens unit (Gr2). Fulfillment of Condition (17) makes it possible to achieve proper correction of aberrations, in particular the distortion and the curvature of field on the wide-angle side. If the lower limit of Condition (17) is exceeded, the positive distortion increases on the wide-angle side, and simultaneously the inclination of the image plane in the positive direction becomes unduly large. In contrast, if the upper limit of Condition (17) is exceeded, the negative distortion increases on the wide-angle side, and simultaneously the inclination of the image plane in the negative direction becomes unduly large. Note that, in a case where the second lens unit (Gr2) includes a plurality of aspherical surfaces, at least one of those aspherical surfaces needs to fulfill Condition (17) above; that is, the other aspherical surfaces do not necessarily have to fulfill Condition (17) above, if that is advantageous for the correction of other aberrations.

It is preferable to use an aspherical surface that fulfills Condition (18) below in the third lens unit (Gr3). Moreover, it is more preferable that Conditions (14) and (15), or Conditions (14) and (16) noted above be additionally fulfilled.

$$-0.35<(x-x0)/(N'-N)<0 \tag{18}$$

Condition (18) defines the aspherical surface as being so shaped as to weaken the positive optical power of the third lens unit (Gr3). Fulfillment of Condition (18) makes it possible to achieve proper correction of aberrations, in particular spherical aberration. If the lower limit of Condition (18) is exceeded, in particular, spherical aberration appears notably in the positive direction on the telephoto side. In contrast, if the upper limit of Condition (18) is exceeded, in particular, spherical aberration appears notably in the negative direction on the telephoto side. Note that, in a case where the third lens unit (Gr3) includes a plurality of aspherical surfaces, at least one of those aspherical surfaces needs to fulfill Condition (18) above; that is, the other aspherical surfaces do not necessarily have to fulfill Condition (18) above, if that is advantageous for the correction of other aberrations.

It is preferable to use an aspherical surface that fulfills Condition (19) below in the fourth lens unit (Gr4). Moreover, it is more preferable that Conditions (14) and (15), or Conditions (14) and (16) noted above be additionally fulfilled.

$$0.85<(x-x0)/(N'-N)<0 \tag{19}$$

Condition (19) defines the aspherical surface as being so shaped as to weaken the positive optical power of the fourth lens unit (Gr4). Fulfillment of Condition (19) makes it possible to achieve proper correction of aberrations, in particular the distortion and the curvature of field on the wide-angle side as well as the spherical aberration on the telephoto side. If the lower limit of Condition (19) is exceeded, the positive distortion increases on the wide-angle side, and simultaneously the inclination of the image plane in the positive direction becomes unduly large. Moreover, spherical aberration appears notably in the positive direction on the telephoto side. In contrast, if the upper limit of Condition (19) is exceeded, the negative distortion increases on the wide-angle side, and simultaneously the inclination of the image plane in the positive direction becomes unduly large. Moreover, spherical aberration appears notably in the negative direction on the telephoto side. Note that, in a case where the fourth lens unit (Gr4) includes a plurality of aspherical surfaces, at least one of those aspherical surfaces needs to fulfill Condition (19) above; that is, the other aspherical surfaces do not necessarily have to fulfill Condition (19) above, if that is advantageous for the correction of other aberrations.

<Embodiments 11 to 13>

The zoom lens systems of the eleventh to thirteenth embodiments are each composed of, from the object side, a first lens unit having a positive optical power (Gr1), a second lens unit having a negative optical power (Gr2), a third lens unit having a positive optical power (Gr3), and a fourth lens unit having a positive optical power (Gr4). During zooming from the wide-angle end [W] to the telephoto end [T], the third lens unit (Gr3) is kept in a fixed position, the first and fourth lens units (Gr1 and Gr4) are moved monotonically to the object side, and the second lens unit (Gr2) is moved monotonically to the image side. Note that the fourth lens unit (Gr4) has at its image-side end a low-pass filter (LPF) having the shape of a flat plate. In the zoom lens system of the eleventh embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, a biconcave lens element, and a biconvex lens element. The third lens unit (Gr3) is composed of an aperture stop (S), a positive meniscus lens element convex to the object side, and a negative meniscus lens element convex to the object side. The fourth lens unit (Gr4) is composed of a positive meniscus lens element convex to the object side, a negative meniscus lens element convex to the object side, and a positive meniscus lens element convex to the object side.

In the zoom lens system of the twelfth embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element. The third lens unit (Gr3) is composed of an aperture stop (S), a biconvex lens element, and a negative meniscus lens element convex to the object side. The fourth lens unit (Gr4) is composed of a biconvex lens element, a negative meniscus lens element convex to the object side, and a positive meniscus lens element convex to the object side.

In the zoom lens system of the thirteenth embodiment, the lens units are each composed, from the object side, as follows. The first lens unit (Gr1) is composed of a doublet lens element formed by cementing together a negative meniscus lens element convex to the object side and a biconvex lens element, and a positive meniscus lens element convex to the object side. The second lens unit (Gr2) is composed of a negative meniscus lens element convex to the object side, and a doublet lens element formed by cementing together a biconcave lens element and a biconvex lens element.

The third lens unit (Gr3) is composed of an aperture stop (S), and a doublet lens element formed by cementing together a biconvex lens element and a negative meniscus lens element concave to the object side. The fourth lens unit (Gr4) is composed of a positive meniscus lens element convex to the object side, a biconvex lens element, and a negative meniscus lens element convex to the object side.

Two examples of focusing methods that are considered fit for a zoom lens system like those of the eleventh to thirteenth embodiments are: a front-end-unit-focusing method in which focusing is achieved by moving the first lens unit (Gr1), and an inner-unit-focusing method in which focusing is achieved by moving the fourth lens unit (Gr4). According to the former focusing method, the first lens unit (Gr1) is moved out toward the object side for focusing on a close-distance object, and therefore the front-end lens unit needs to be given a comparatively large diameter in order to secure sufficient amount of peripheral light. On the other hand, according to the latter focusing method, although the third and fourth lens units (Gr3 and Gr4) come closest to each other in the range from the middle-focal-length position [M] to the telephoto end [T], where a relatively large amount of movement is required for focusing, it is necessary to secure a sufficient space between the third and fourth lens units (Gr3 and Gr4) to achieve focusing. This is inefficient.

For these reasons, the zoom lens systems of the eleventh to thirteenth embodiments adopt the inner-unit-focusing method, and thus perform focusing by moving the second lens unit (Gr2); more precisely, for focusing on a close-distance object, it moves the second lens unit (Gr2) toward the object side. Where focusing is performed by moving the second lens unit (Gr2) in this way, the first and second lens units (Gr1 and Gr2) come closest to each other at the wide-angle end [W], where a minimum amount of movement of the second lens unit (Gr2) is required for focusing. This makes it possible to secure a space for focusing very efficiently.

In a zoom lens system, like those of the eleventh to thirteenth embodiments, that consists of a positive, a negative, a positive, and a positive lens unit and in which, during zooming, the first, second, and fourth lens units (Gr1, Gr2, and Gr4) are moved and the second lens unit (Gr2) is moved for focusing, it is preferable that Condition (20) below be fulfilled.

$$0.1 < |\beta 2T| < 1.0 \tag{20}$$

where $\beta 2T$ represents the lateral magnification of the second lens unit (Gr2) at the telephoto end [T].

Condition (20) defines the lateral magnification of the second lens unit (Gr2) at the telephoto end [T] to be preferably fulfilled. If the lower limit of Condition (20) is exceeded, the total length is too long and the diameter of the front-end lens unit is too large, and simultaneously, spherical aberration appears notably toward the positive side. In contrast, if the upper limit of Condition (20) is exceeded, spherical aberration appears notably toward the negative side.

In a zoom lens system, like those of the eleventh to thirteenth embodiments, that consists of a positive, a negative, a positive, and a positive lens unit and in which, during zooming, the first, second, and fourth lens units (Gr1, Gr2, and Gr4) are moved and the second lens unit (Gr2) is moved for focusing, it is preferable that Condition (21) below be fulfilled. Moreover, it is more preferable that Condition (20) noted above be additionally fulfilled.

$$0.2 < fW/f2 < 1.5 \tag{21}$$

where fW represents the focal length of the entire zoom lens system at the wide-angle end [W]; and f2 represents the focal length of the second lens unit (Gr2).

Condition (21) defines the ratio of the focal length of the second lens unit (Gr2) to the focal length of the entire zoom lens system to be preferably fulfilled to strike a proper balance between the total length and the aberration characteristics. If the lower limit of Condition (21) is exceeded, the focal length of the second lens unit (Gr2) is so long that the optical power of the second lens unit (Gr2) is too weak. This helps reduce aberrations, but simultaneously makes the total length of the zoom lens system unduly long. An unduly long total length demands an unduly large diameter in the front-end lens unit, and thus makes the zoom lens system as a whole unduly large. In contrast, if the upper limit of Condition (21) is exceeded, the focal length of the second lens unit (Gr2) is so short that the optical power of second lens unit (Gr2) is too strong. This helps reduce the total length of the zoom lens system, but simultaneously increases aberrations (in particular, the negative distortion increases on the wide-angle side). Moreover, the inclination of the image plane in the positive direction becomes unduly large.

In a zoom lens system, like those of the eleventh to thirteenth embodiments, that consists of a positive, a negative, a positive, and a positive lens unit and in which, during zooming, the first, second, and fourth lens units (Gr1, Gr2, and Gr4) are moved and the second lens unit (Gr2) is moved for focusing, it is preferable that Condition (22) below be fulfilled. Moreover, it is more preferable that Condition (20), and further, Condition (21) noted above be additionally fulfilled.

$$-5.0 < M1/Y\max < -1.0 \tag{22}$$

where

M1 represents the displacement amount of the first lens unit (Gr1) from the wide-angle end [W] to the telephoto end [T] (assuming that the direction pointing to the object side is negative).

Ymax represents the maximum image height.

Condition (22) defines the amount of movement of the first lens unit (Gr1) during zooming to be preferably fulfilled to strike a proper balance between, in particular the total length and the diameter of the front-end lens unit. If the lower limit of Condition (22) is exceeded, the amount of movement of the first lens unit (Gr1) during zooming is so large that the total length of the zoom lens system becomes unduly long at the telephoto end [T], and simultaneously the diameter of the front-end lens unit needs to be unduly large in order to secure sufficient amount of peripheral light at the telephoto end [T]. In contrast, if the upper limit of Condition (22) is exceeded, the amount of movement of the first lens unit (Gr1) during zooming is so small that the total length of the zoom lens system becomes unduly long at the wide-angle end [W], and simultaneously the diameter of the front-end lens unit needs to be unduly large in order to secure sufficient amount of peripheral light at the wide-angle end [W].

In a zoom lens system, like those of the eleventh to thirteenth embodiments, that consists of a positive, a negative, a positive, and a positive lens unit and in which, during zooming, the first, second, and fourth lens units (Gr1, Gr2, and Gr4) are moved and the second lens unit (Gr2) is moved for focusing, the use of an aspherical surface makes it possible to obtain more satisfactory optical performance. For example, it is preferable to use an aspherical surface that fulfills Condition (23) below in the second lens unit (Gr2).

$$0 < (x-x0)/(N'-N) < 0.9 \tag{23}$$

where x represents the deviation of the aspherical surface in a direction perpendicular to the optical axis (AX) direction of the aspherical surface (in millimeters, assuming that the direction pointing to the object side is negative);

x0 represents the deviation of the reference spherical surface in a direction perpendicular to the optical axis (AX) direction of the reference spherical surface (in millimeters, assuming that the direction pointing to the object side is negative);

N represents the refractive index of the object-side medium of the aspherical surface for the d-line; and N' represents the refractive index of the image-side medium of the aspherical surface for the d-line, where x and x0 are defined respectively by Formulae (AS) and (RE) noted previously. Note that x represents the shape of the aspherical surface, and x0 represents the shape of the reference spherical surface.

Condition (23) defines the aspherical surface as being so shaped as to weaken the negative optical power of the second lens unit (Gr2). Fulfillment of Condition (23) makes it possible to achieve proper correction of aberrations, in particular the distortion and the curvature of field on the wide-angle side. If the lower limit of Condition (23) is exceeded, the positive distortion increases on the wide-angle side, and simultaneously the inclination of the image plane in the positive direction becomes unduly large. In contrast, if the upper limit of Condition (23) is exceeded, the negative distortion increases on the wide-angle side, and simultaneously the inclination of the image plane in the negative direction becomes unduly large. Note that, in a case where the second lens unit (Gr2) includes a plurality of aspherical surfaces, at least one of those aspherical surfaces needs to fulfill Condition (23) above; that is, the other aspherical surfaces do not necessarily have to fulfill Condition (23) above, if that is advantageous for the correction of other aberrations.

It is preferable to use an aspherical surface that fulfills Condition (24) below in the third lens unit (Gr3).

$$0.35 < (x-x0)/(N'-N) < 0 \tag{24}$$

Condition (24) defines the aspherical surface as being so shaped as to weaken the positive optical power of the third lens unit (Gr3). Fulfillment of Condition (24) makes it possible to achieve proper correction of aberrations, in particular spherical aberration. If the lower limit of Condition (24) is exceeded, in particular, spherical aberration appears notably in the positive direction on the telephoto side. In contrast, if the upper limit of Condition (24) is exceeded, in particular, spherical aberration appears notably in the negative direction on the telephoto side. Note that, in a case where the third lens unit (Gr3) includes a plurality of aspherical surfaces, at least one of those aspherical surfaces needs to fulfill Condition (24) above; that is, the other aspherical surfaces do not necessarily have to fulfill Condition (24) above, if that is advantageous for the correction of other aberrations.

It is preferable to use an aspherical surface that fulfills Condition (25) below in the fourth lens unit (Gr4).

$$-0.85 < (x-x0)/(N'-N) < 0 \tag{25}$$

Condition (25) defines the aspherical surface as being so shaped as to weaken the positive optical power of the fourth lens unit (Gr4). Fulfillment of Condition (25) makes it possible to achieve proper correction of aberrations, in particular the distortion and the curvature of field on the wide-angle side as well as the spherical aberration on the telephoto side. If the lower limit of Condition (25) is exceeded, the positive distortion increases on the wide-angle side, and simultaneously the inclination of the image plane in the positive direction becomes unduly large. Moreover, spherical aberration appears notably in the positive direction on the telephoto side. In contrast, if the upper limit of Condition (25) is exceeded, the negative distortion increases on the wide-angle side, and simultaneously the inclination of the image plane in the negative direction becomes unduly large. Moreover, spherical aberration appears notably in the negative direction on the telephoto side. Note that, in a case where the fourth lens unit (Gr4) includes a plurality of aspherical surfaces, at least one of those aspherical surfaces needs to fulfill Condition (25) above; that is, the other aspherical surfaces do not necessarily have to fulfill Condition (25) above, if that is advantageous for the correction of other aberrations.

In a zoom lens system, like those of the eleventh to thirteenth embodiments, that consists of a positive, a negative, a positive, and a positive lens unit and in which, during zooming, the first, second, and fourth lens units (Gr1, Gr2, and Gr4) are moved and the second lens unit (Gr2) is moved for focusing, it is preferable that Condition (26) below be fulfilled, $$0.1 < M4/M < 1.0 \qquad (26)$$

where

M1 represents the displacement amount of the first lens unit (Gr1) from the wide-angle end [W] to the telephoto end [T] (assuming that the direction pointing to the object side is negative); and M4 represents the displacement amount of the fourth lens unit (Gr4) from the wide-angle end [W] to the telephoto end [T] (assuming that the direction pointing to the object side is negative).

Condition (26) defines the ratio of the amount of movement of the fourth lens unit (Gr4) to that of the first lens unit (Gr1) during zooming to be preferably fulfilled.

If the upper limit of Condition (26) is exceeded, the amount of movement of the fourth lens unit (Gr4) is too large, and thus the responsibility of the fourth lens unit (Gr4) for zooming is too heavy. This makes it difficult to correct spherical aberration properly. In contrast, if the lower limit of Condition (26) is exceeded, the amount of movement of the first lens unit (Gr1) is too large, and thus the entrance pupil is positioned too far away from the image plane in the longest focal length condition. As a result, the front-end lens unit needs to have an unduly large diameter.

<EXAMPLES>

Hereinafter, examples of the zoom lens systems of the first to thirteenth embodiments described above will be presented with reference to their construction data, graphic representations of aberrations, and other data. Tables 1 to 13 list the construction data of Examples 1 to 13, which respectively correspond to the first to thirteenth embodiments described above and have lens arrangements as shown in FIGS. 1 to 3, FIGS. 7 to 10, FIGS. 19 to 21, and FIGS. 25 to 27.

In the construction data of each example, ri (i=1, 2, 3, ...) represents the radius of curvature of the ith surface counted from the object side, di (i=1, 2, 3, ...) represents the ith axial distance counted from the object side, and Ni (i=1, 2, 3, ...) and vi (i=1, 2, 3, ...) represent the refractive index (Nd) and the Abbe number (vd), respectively, for the d-line of the ith optical element counted from the object side. Moreover, in the construction data, for each of the axial distances that vary with zooming (i.e. the variable axial distances), three values are listed that represent, from left, the actual surface-to-surface distance between the relevant lens units at the wide-angle end [W] (i.e. in the shortest focal length condition), the same distance at the middle-focal-length position [M], and the same distance at the telephoto end [T] (i.e. in the longest focal length condition). Also listed are the focal lengths f and the F-numbers FNO of the entire zoom lens system in those three focal-length conditions [W], [M], and [T]. Table 15 lists the distances that vary with focusing as observed in a close-distance shooting condition in Examples 4 to 7 (when the object distance D=equals 1m). Table 18 lists the same values as observed in Examples 11 to 13.

Furthermore, a surface whose radius of curvature ri is marked with an asterisk (*) is an aspherical surface, whose surface shape is defined by Formula (AS) noted earlier. Also listed for each Example together with the construction data are the data of the aspherical surfaces, and the values corresponding to Condition (6), (7), (12), (13), (17) to (19), and (23) to (25) that define conditions to be fulfilled by the aspherical surface (note that, there, ymax represents the maximum height of an aspherical surface in a direction perpendicular to its optical axis (AX) (i.e. the maximum effective radius)). Table 14 lists the values corresponding to Conditions (1) to (5) noted above as observed in Examples 1 to 3; Table 16 lists the values corresponding to Conditions (8) to (11) noted above as observed in Examples 4 to 7; Table 17 lists the values corresponding to Conditions (14) to (16) noted above as observed in Examples 8 to 10; and Table 19 lists the values corresponding to Conditions (20) to (22) and (26) noted above as observed in Examples 11 to 13.

Figure 5A:
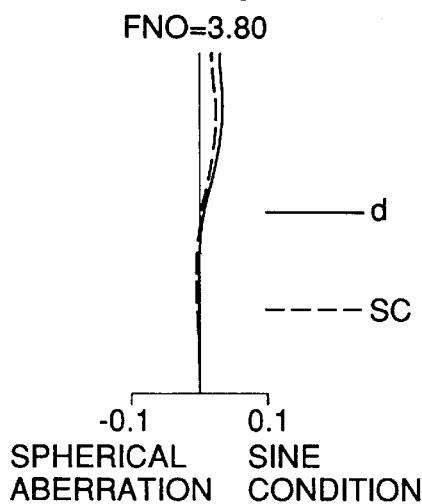
FIGS. 5A to 5I are graphic representations of the aberrations observed in the zoom lens system of Example 2.
Figure 5B:
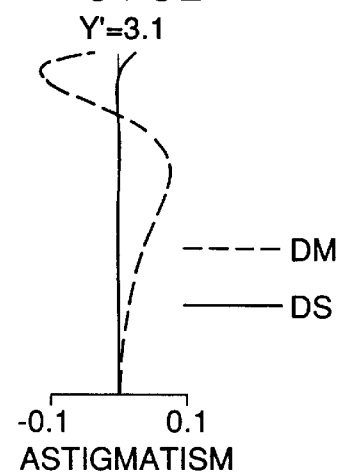
Figure 5C:
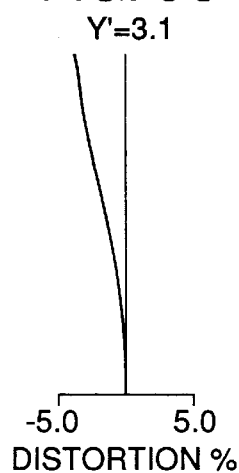
Figure 5D:
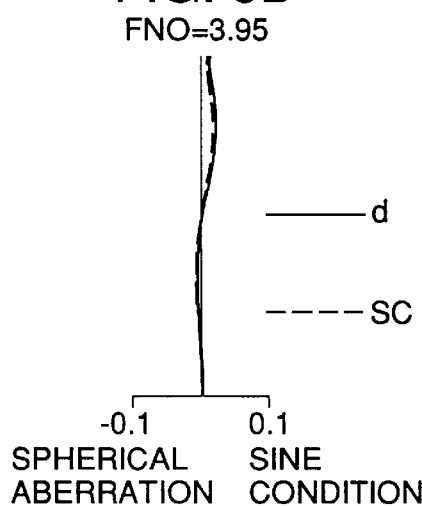
Figure 5E:
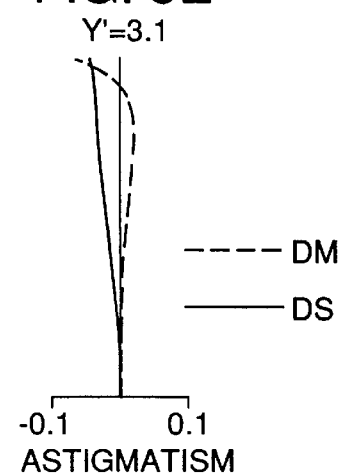
Figure 5F:
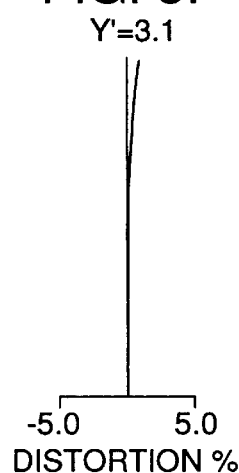
Figure 5G:
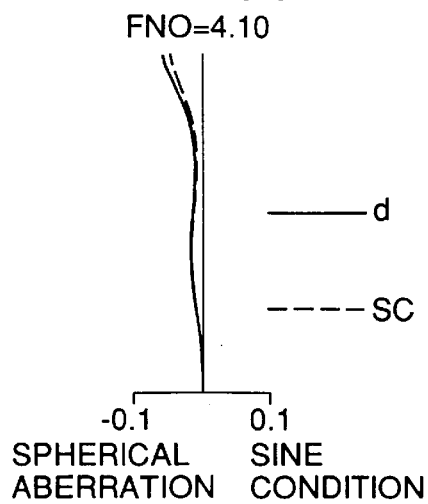
Figure 5H:
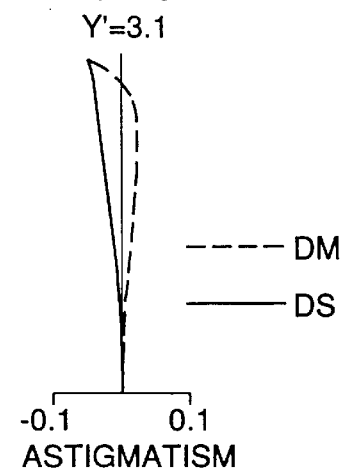
Figure 5I:
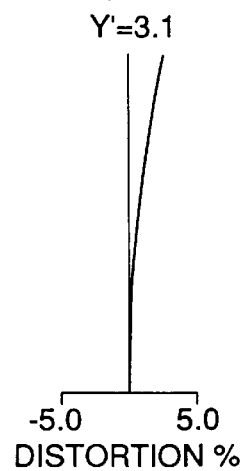
Figure 6A:
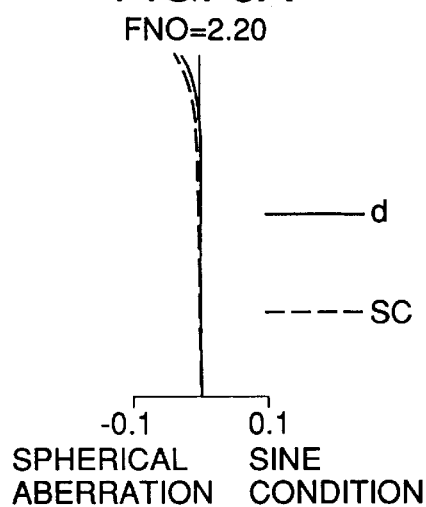
FIGS. 6A to 6I are graphic representations of the aberrations observed in the zoom lens system of Example 3.
Figure 6B:
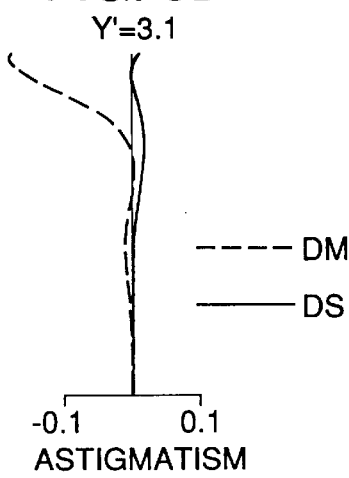
Figure 6C:
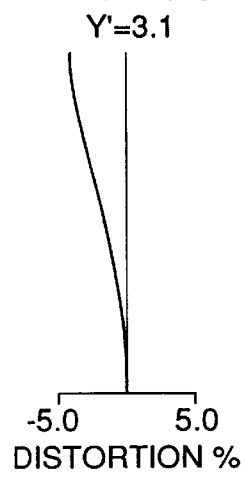
Figure 6D:
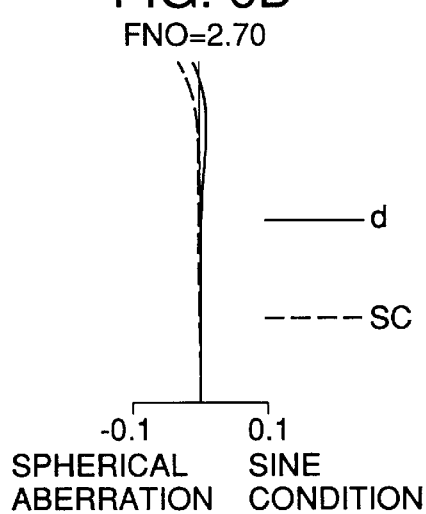
Figure 6E:
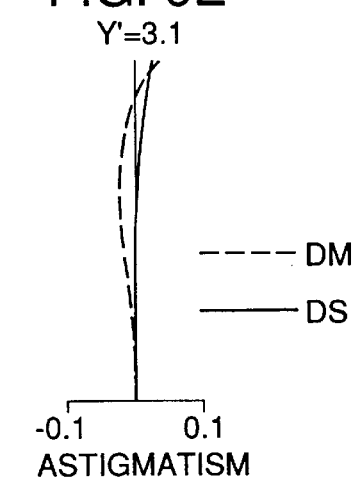
Figure 6F:
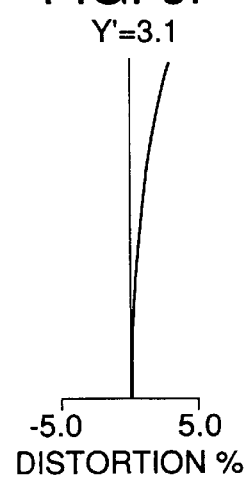
Figure 6G:
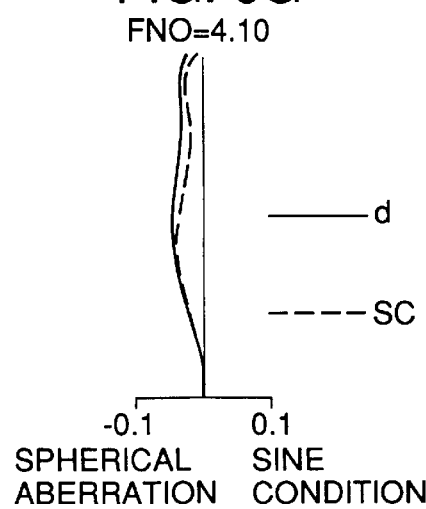
Figure 6H:
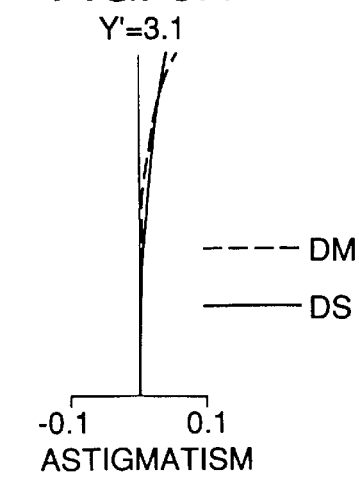
Figure 6I:
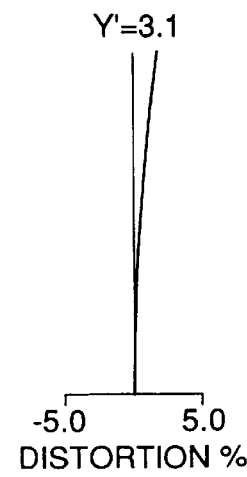
Figure 11A:
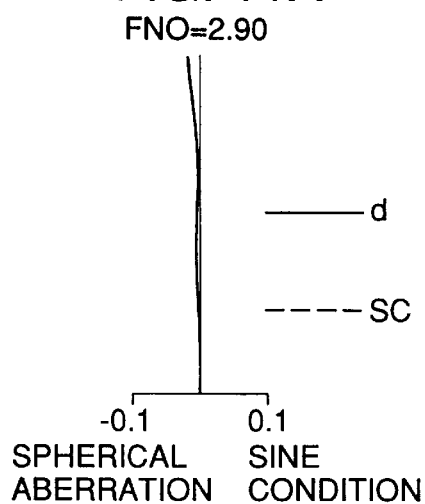
FIGS. 11A to 11I are graphic representations of the aberrations observed in the infinite-distance shooting condition in Example 4.
Figure 11B:
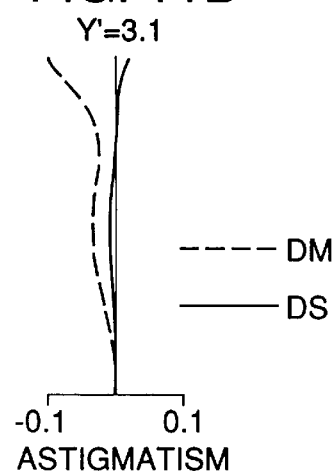
Figure 11C:
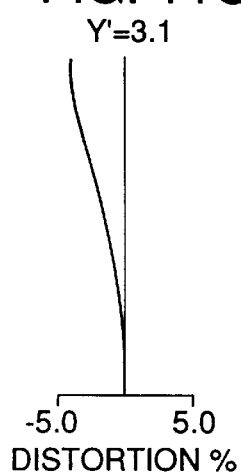
Figure 11D:
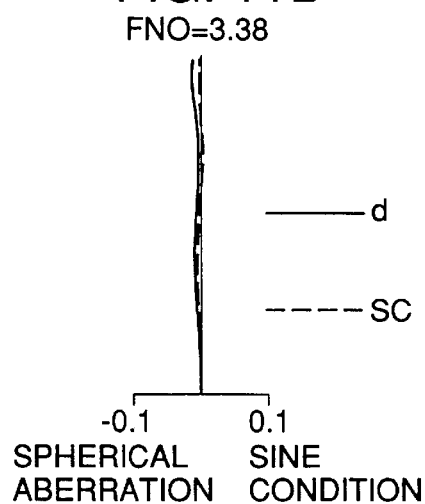
Figure 11E:
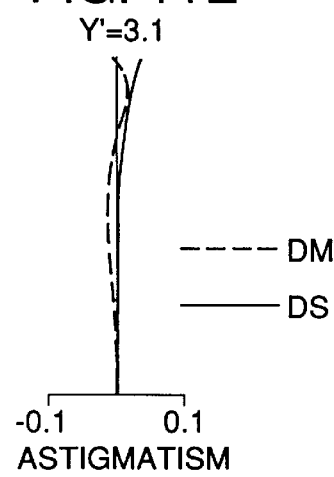
Figure 11F:
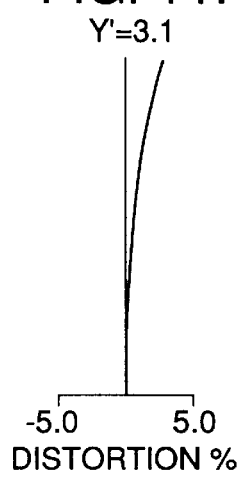
Figure 11G:
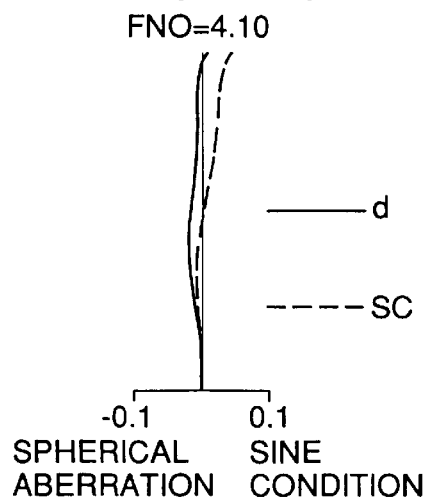
Figure 11H:
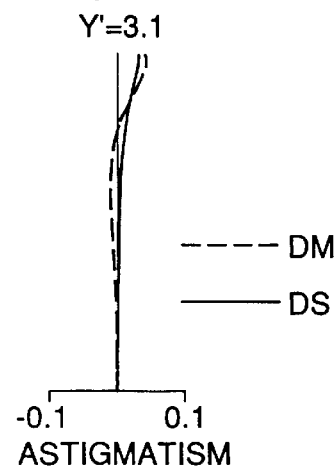
Figure 11I:
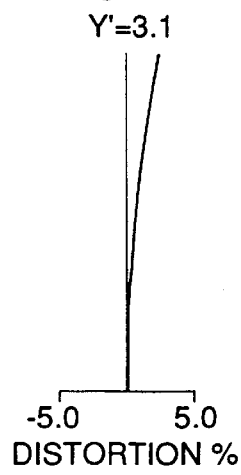
Figure 12A:
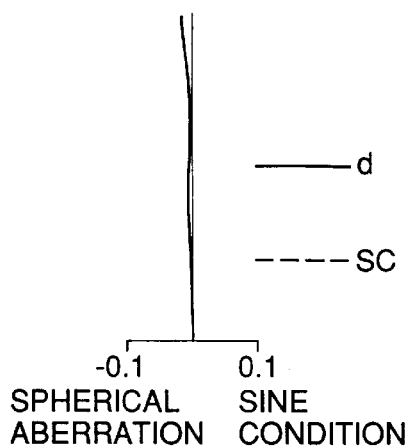
FIGS. 12A to 12I are graphic representations of the aberrations observed in the close-distance shooting condition (D=1m) in Example 4.
Figure 12B:
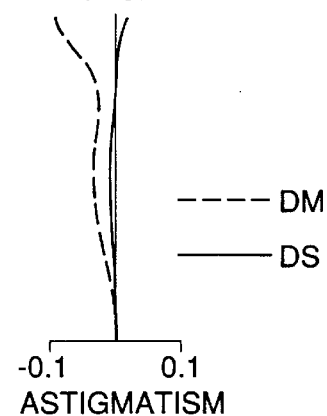
Figure 12C:
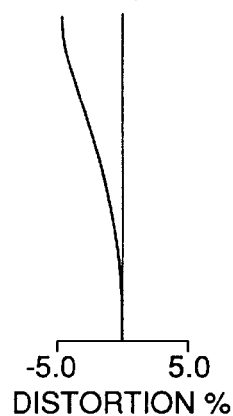
Figure 12D:
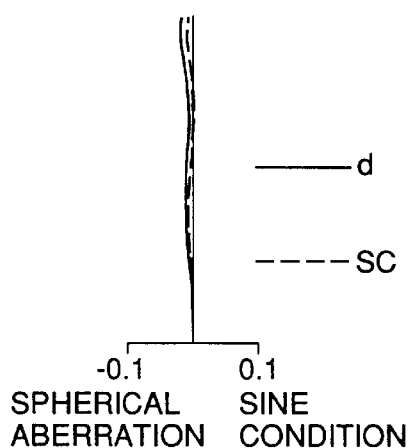
Figure 12E:
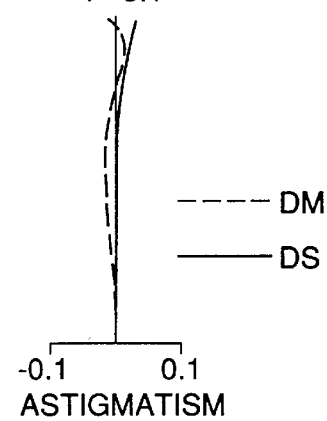
Figure 12F:
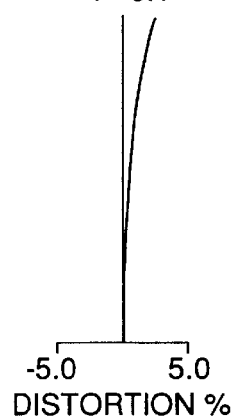
Figure 12G:
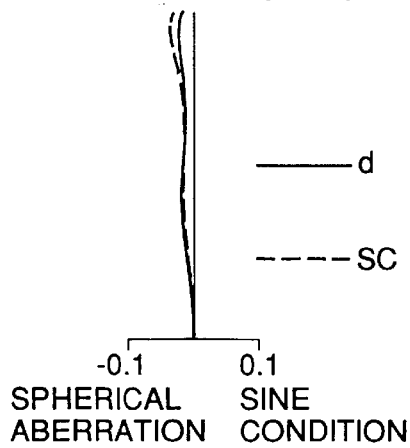
Figure 12H:
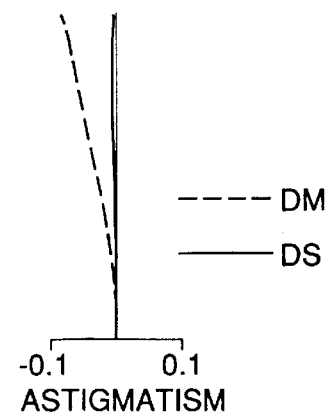
Figure 12I:
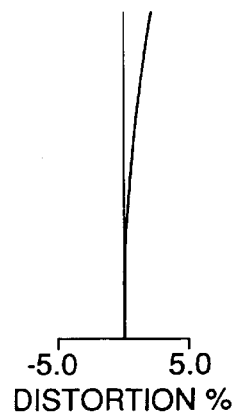
Figure 14A:
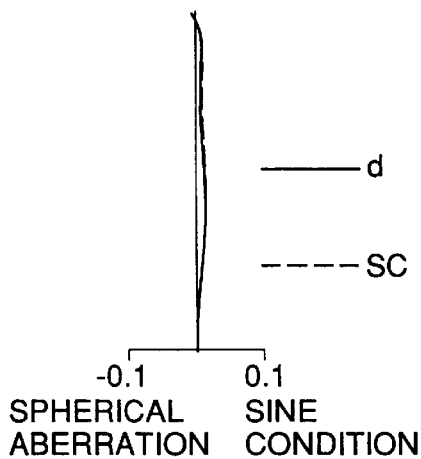
FIGS. 14A to 14I are graphic representations of the aberrations observed in the close-distance shooting condition (D=1m) in Example 5.
Figure 14B:
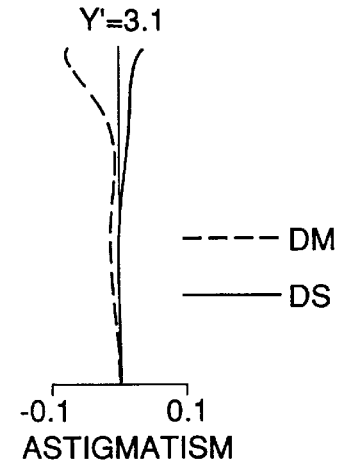
Figure 14C:
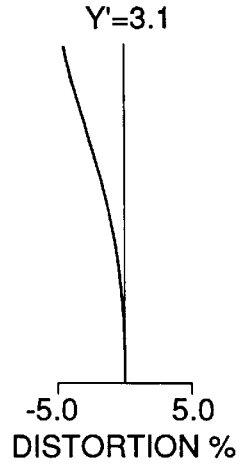
Figure 14D:
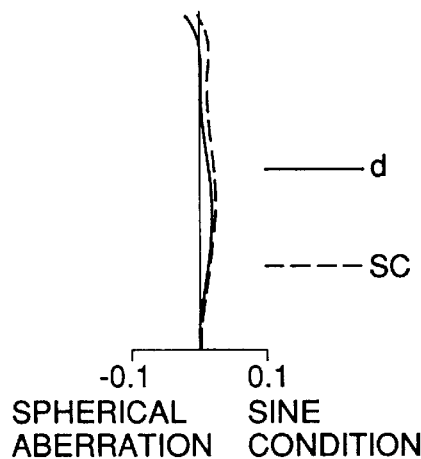
Figure 14E:
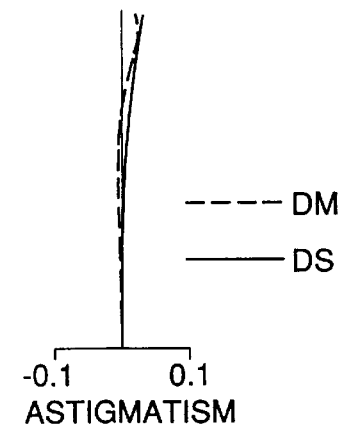
Figure 14F:
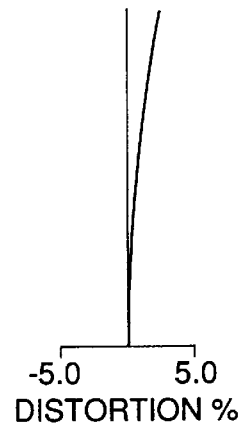
Figure 14G:
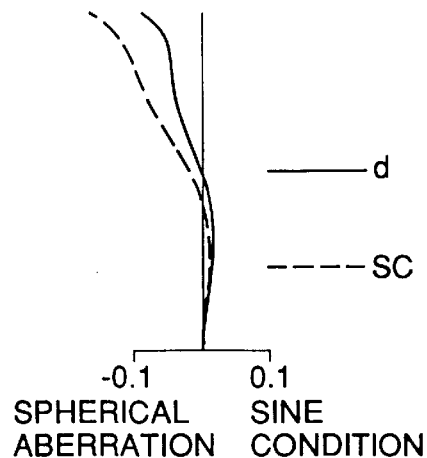
Figure 14H:
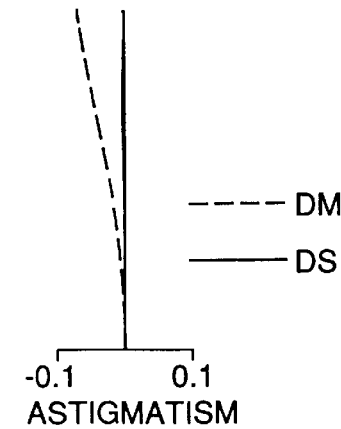
Figure 14I:
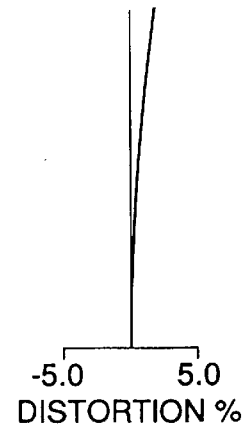
Figure 15A:
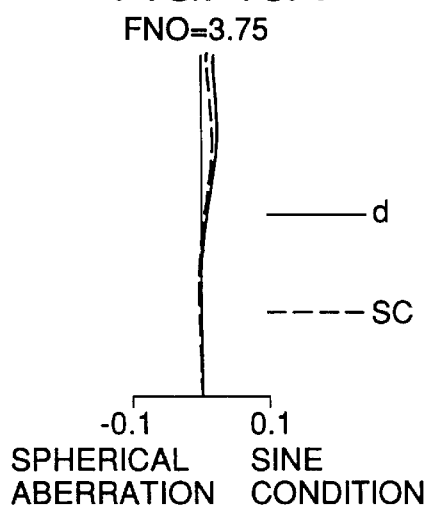
FIGS. 15A to 15I are graphic representations of the aberrations observed in the infinite-distance shooting condition in Example 6.
Figure 15B:
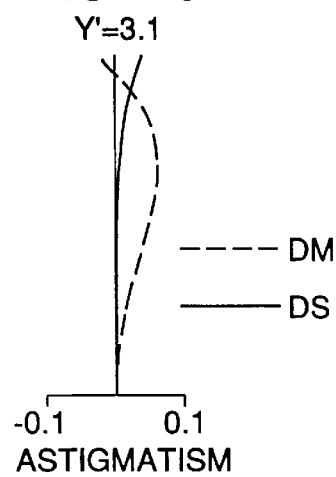
Figure 15C:
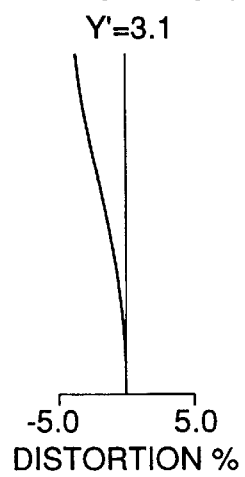
Figure 15D:
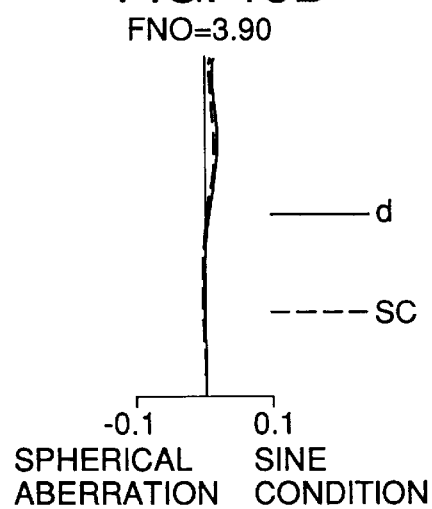
Figure 15E:
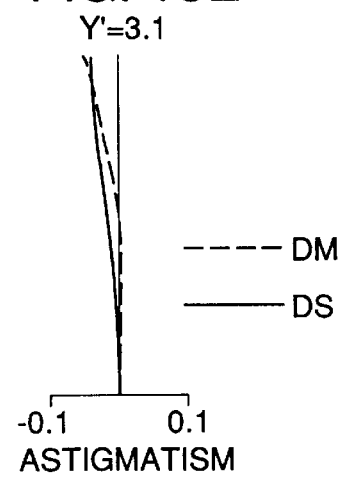
Figure 15F:
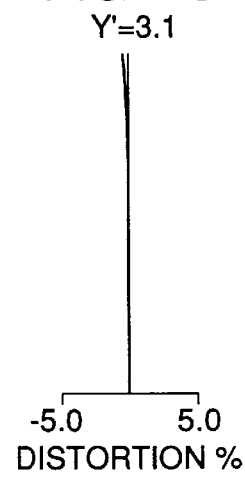
Figure 15G:
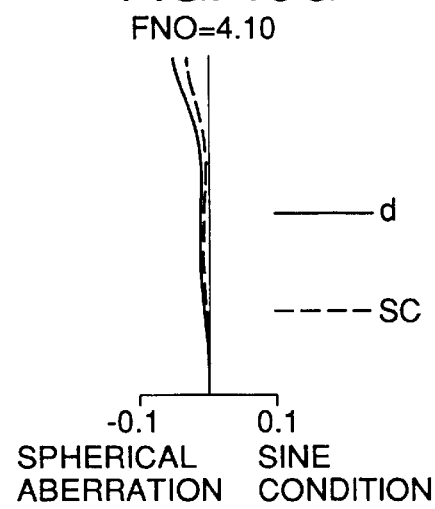
Figure 15H:
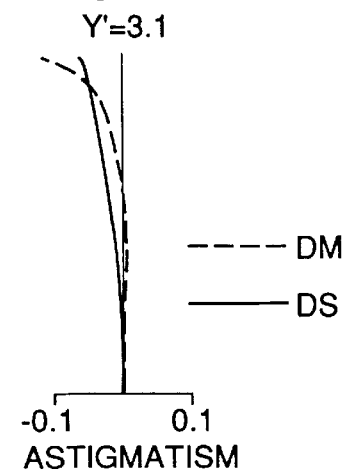
Figure 15I:
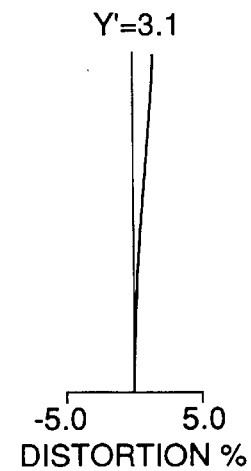
Figure 18A:
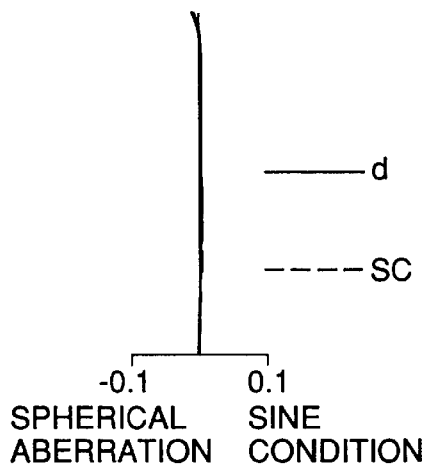
FIGS. 18A to 18I are graphic representations of the aberrations observed in the close-distance shooting condition (D=1m) in Example 7.
Figure 18B:
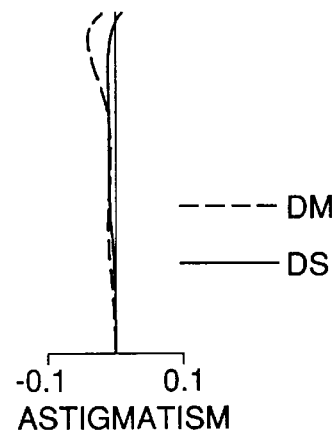
Figure 18C:
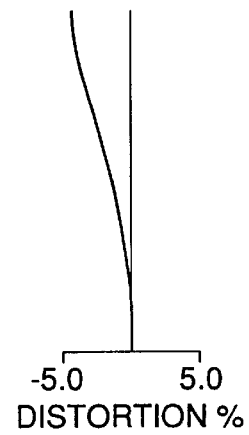
Figure 18D:
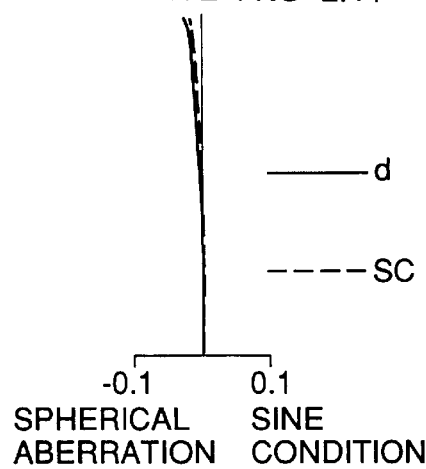
Figure 18E:
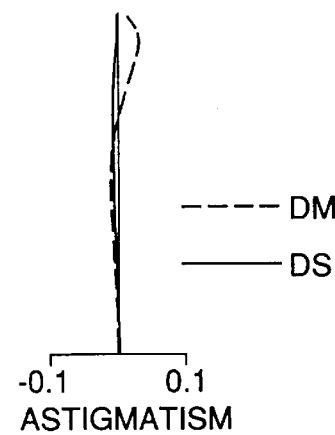
Figure 18F:
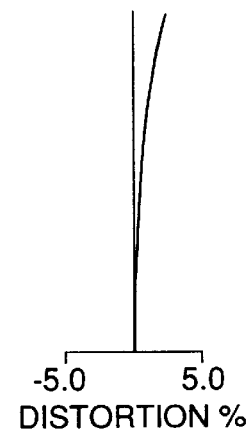
Figure 18G:
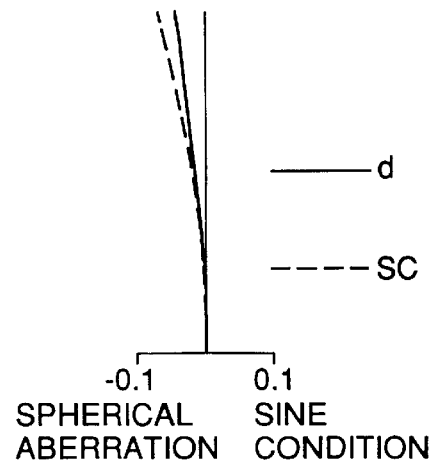
Figure 18H:
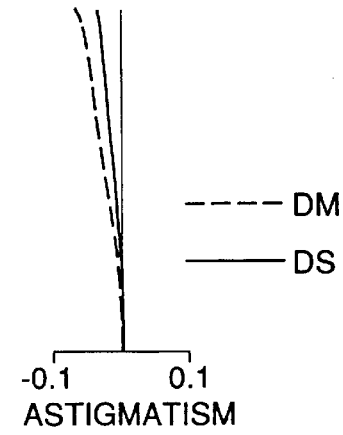
Figure 18I:
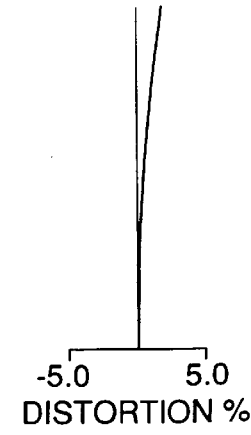
Figure 22A:
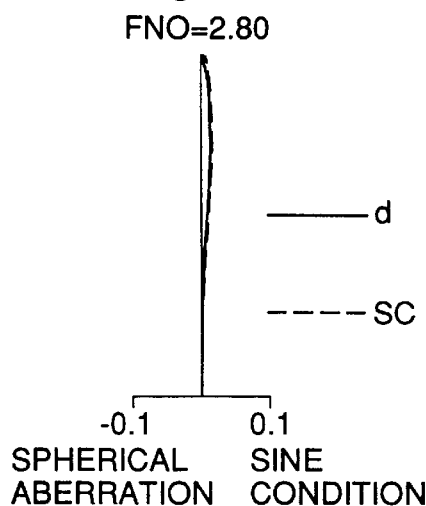
FIGS. 22A to 22I are graphic representations of the aberrations observed in the zoom lens system of Example 8.
Figure 22B:
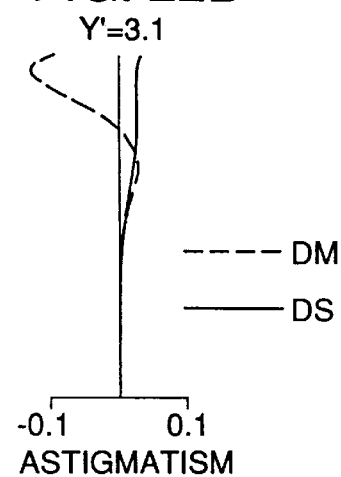
Figure 22C:
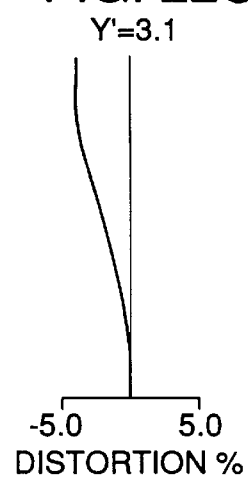
Figure 22D:
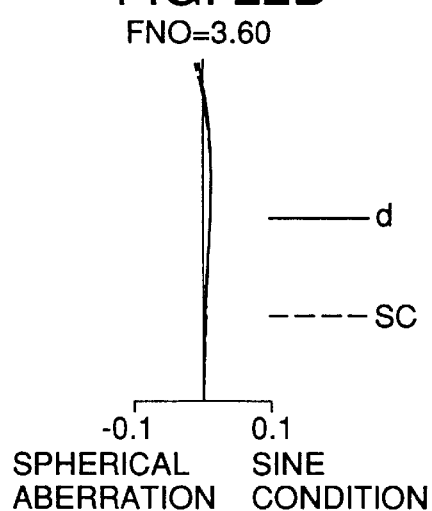
Figure 22E:
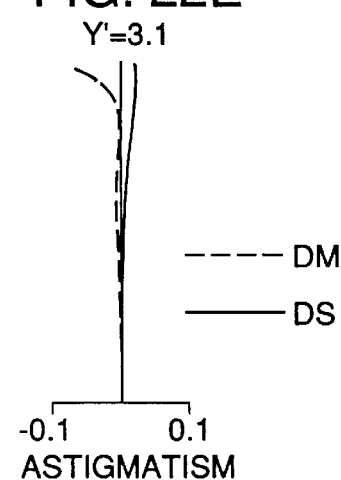
Figure 22F:
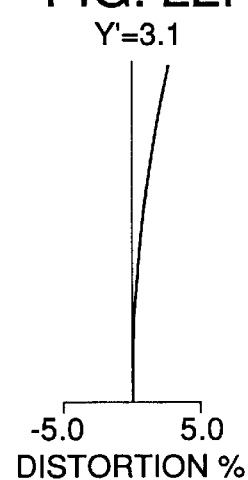
Figure 22G:
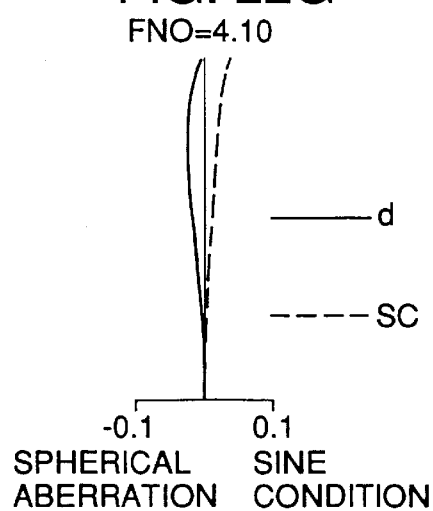
Figure 22H:
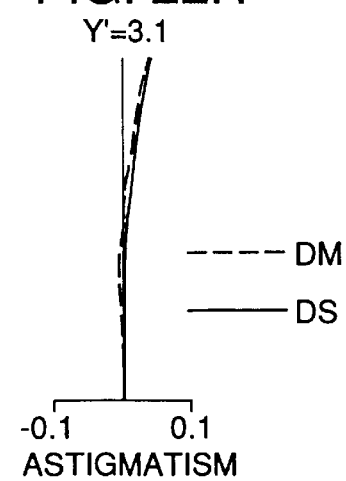
Figure 22I:
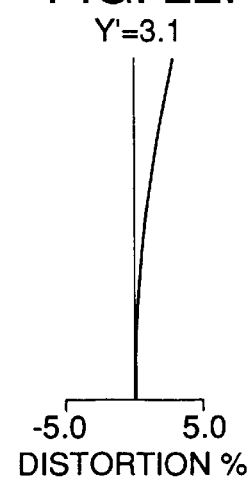
Figure 24A:
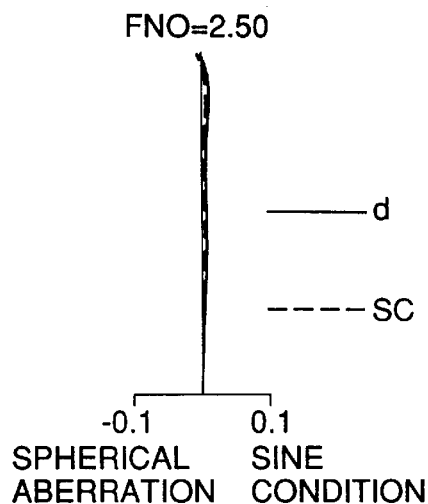
FIGS. 24A to 24I are graphic representations of the aberrations observed in the zoom lens system of Example 10.
Figure 24B:
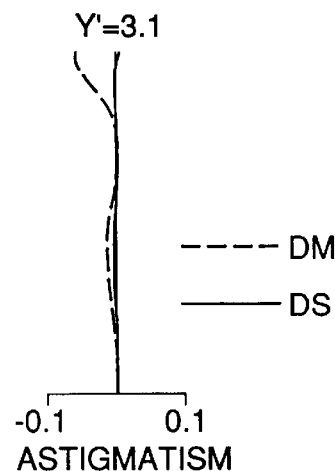
Figure 24C:
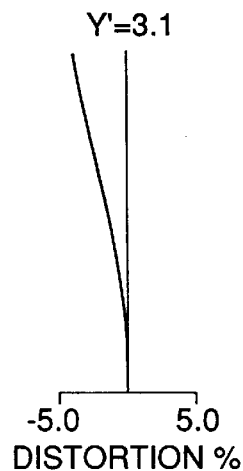
Figure 24D:
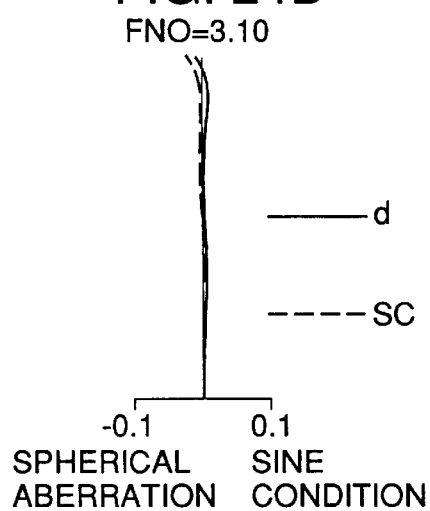
Figure 24E:
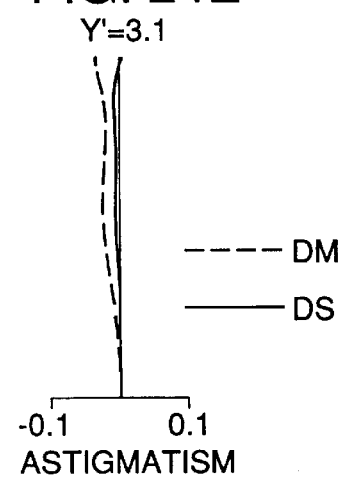
Figure 24F:
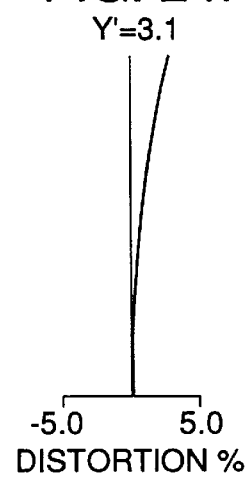
Figure 24G:
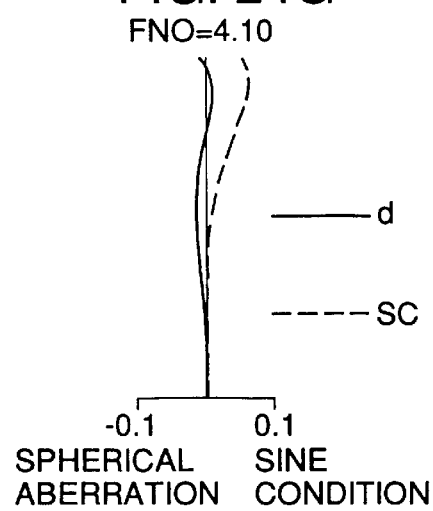
Figure 24H:
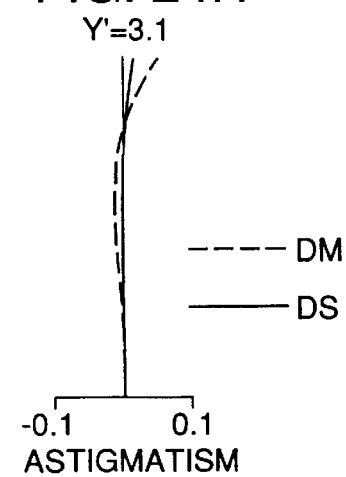
Figure 24I:
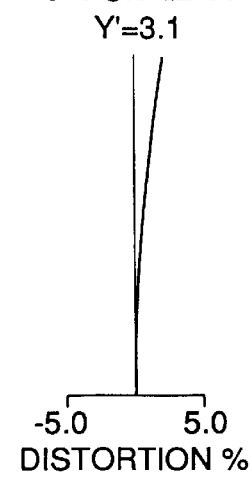
Figure 29A:
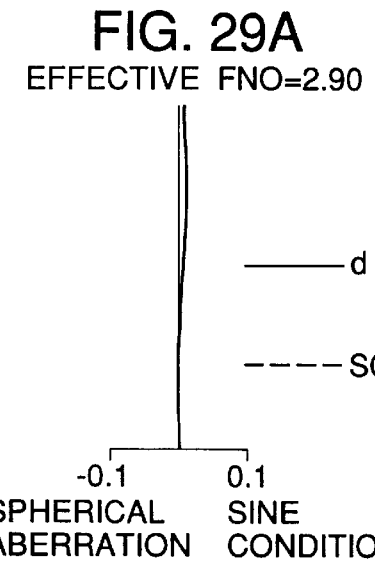
FIGS. 29A to 29I are graphic representations of the aberrations observed in the close-distance shooting condition (D=1m) in Example 11.
Figure 29B:
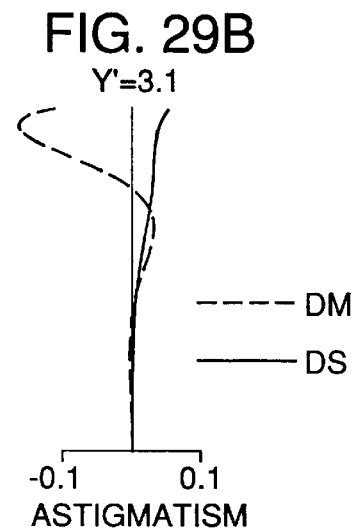
Figure 29C:
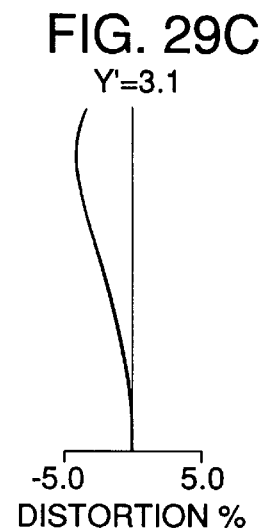
Figure 29D:
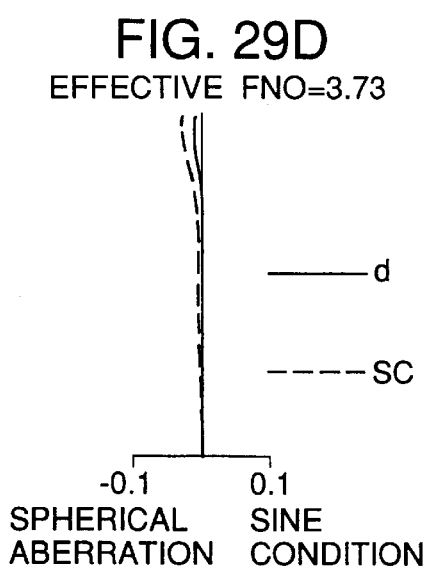
Figure 29E:
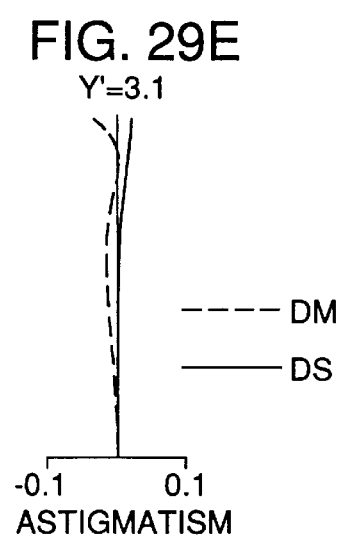
Figure 29F:
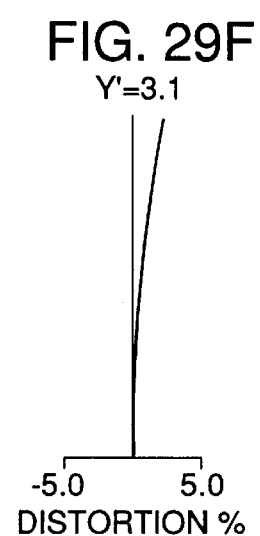
Figure 29G:
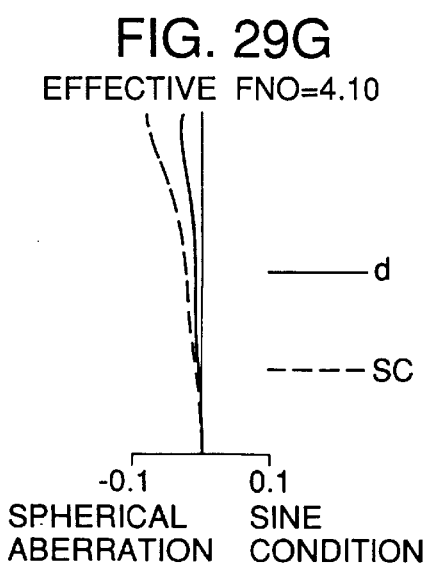
Figure 29H:
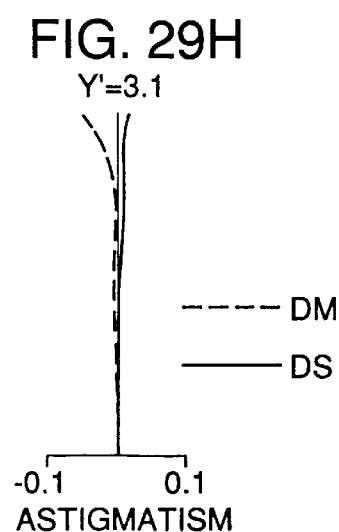
Figure 29I:
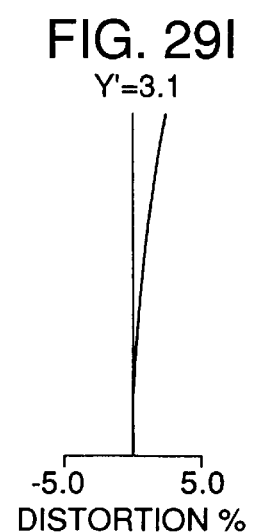
Figure 30A:
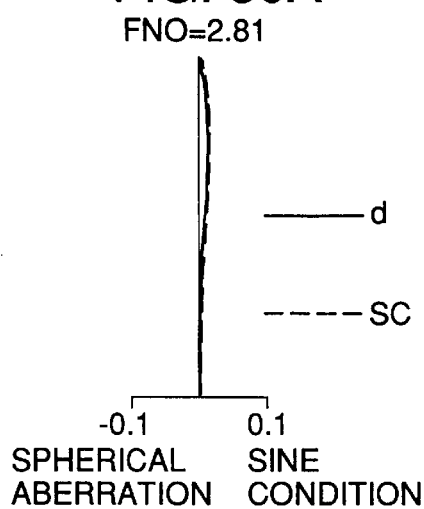
FIGS. 30A to 30I are graphic representations of the aberrations observed in the infinite-distance shooting condition in Example 12.
Figure 30B:
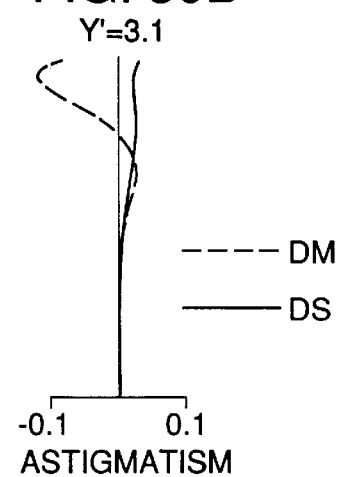
Figure 30C:
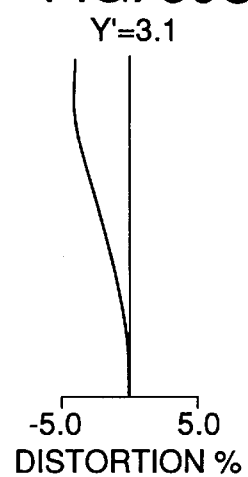
Figure 30D:
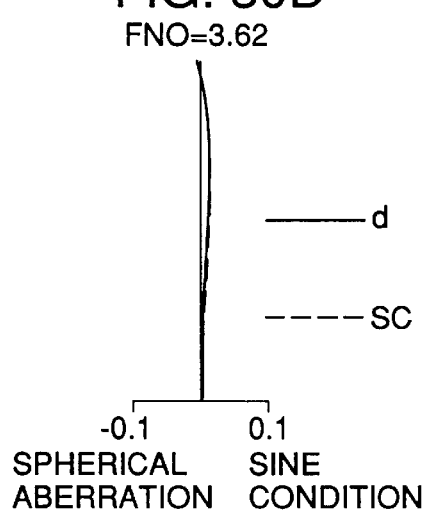
Figure 30E:
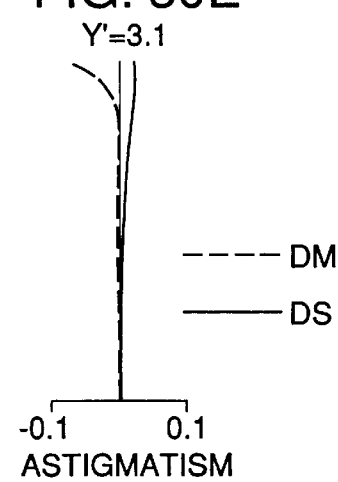
Figure 30F:
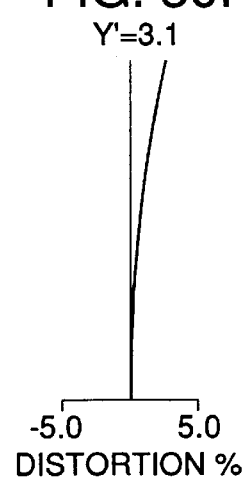
Figure 30G:
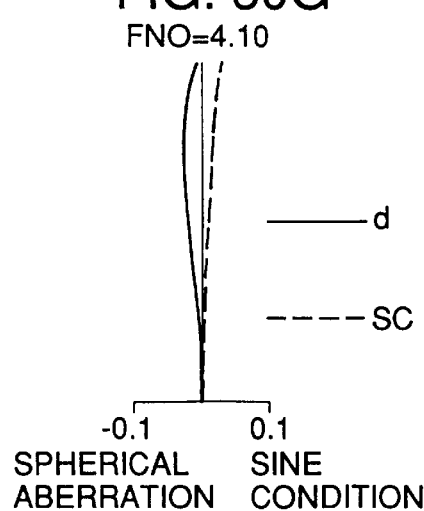
Figure 30H:
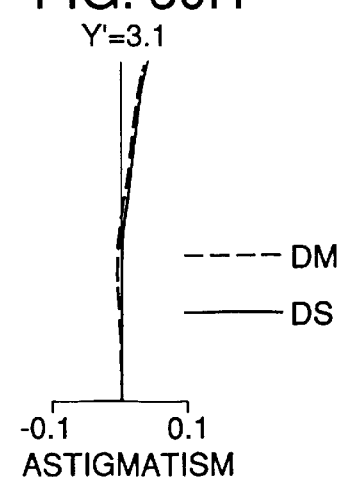
Figure 30I:
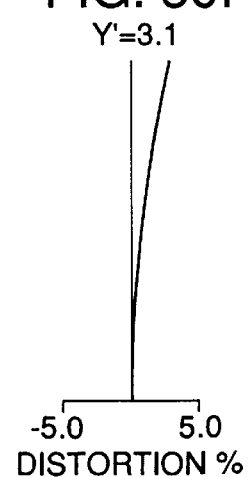
Figure 31A:
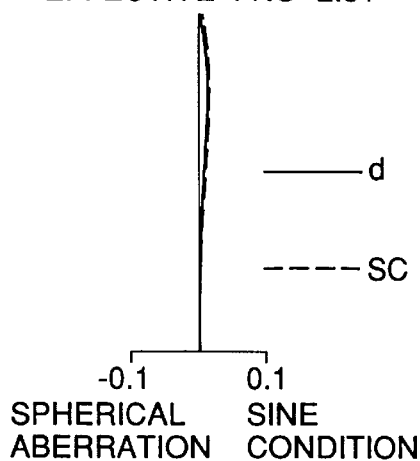
FIGS. 31A to 31I are graphic representations of the aberrations observed in the close-distance shooting condition (D=1m) in Example 12.
Figure 31B:
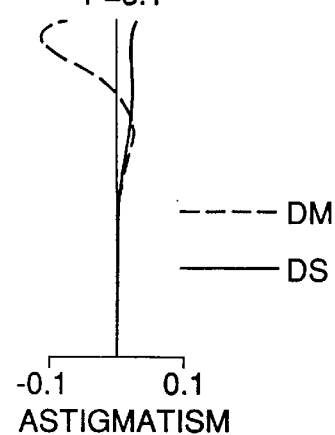
Figure 31C:
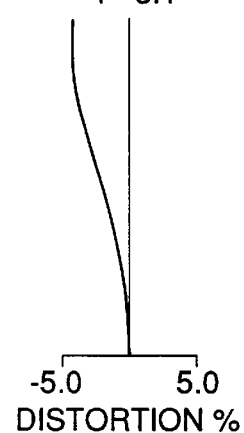
Figure 31D:
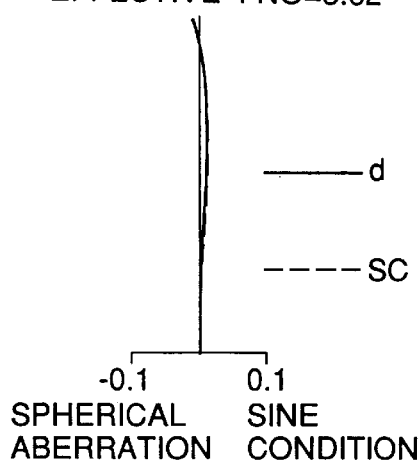
Figure 31E:
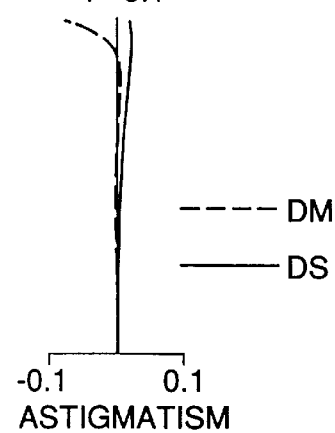
Figure 31F:
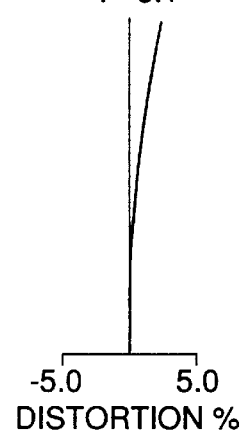
Figure 31G:
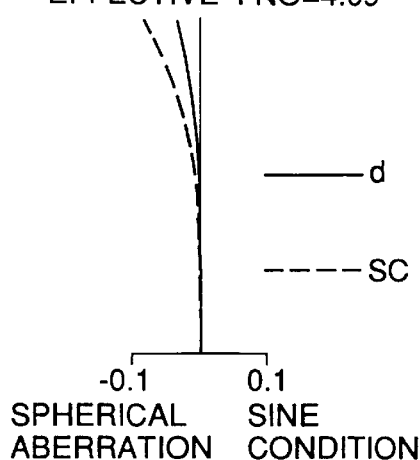
Figure 31H:
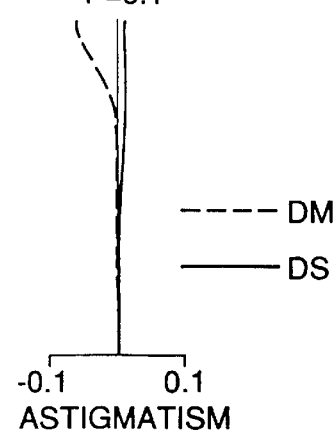
Figure 31I:
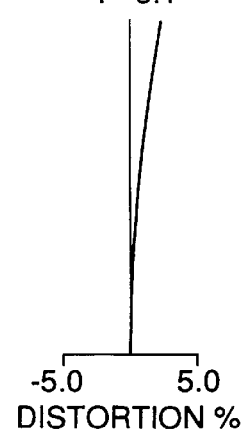
Figure 32A:
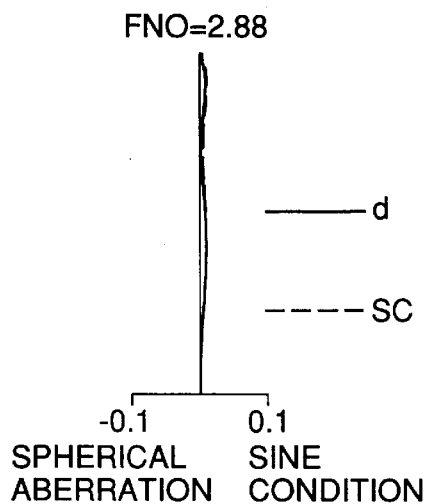
FIGS. 32A to 32I are graphic representations of the aberrations observed in the infinite-distance shooting condition in Example 13.
Figure 32B:
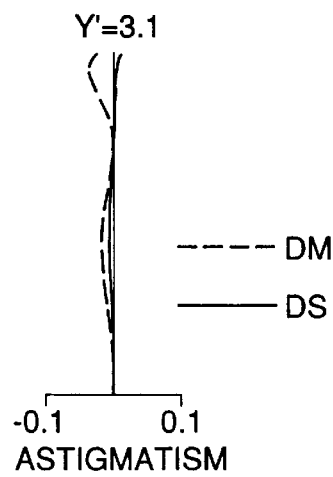
Figure 32C:
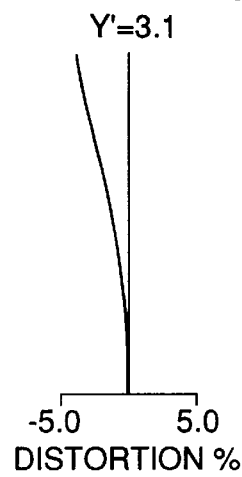
Figure 32D:
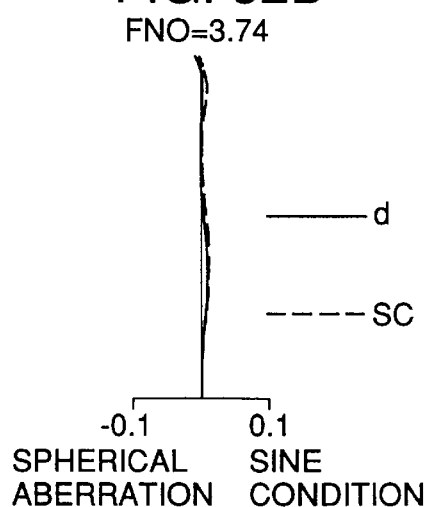
Figure 32E:
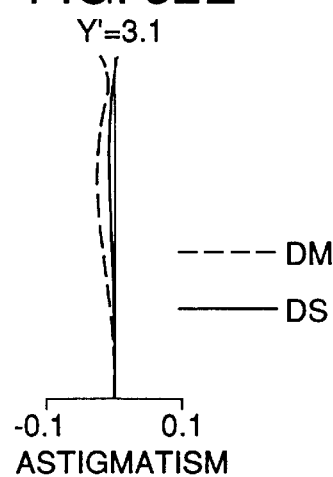
Figure 32F:
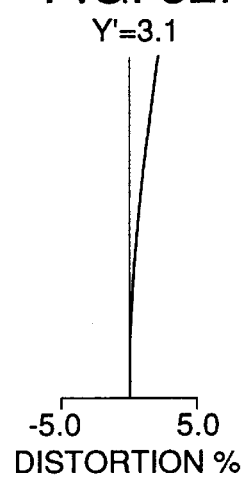
Figure 32G:
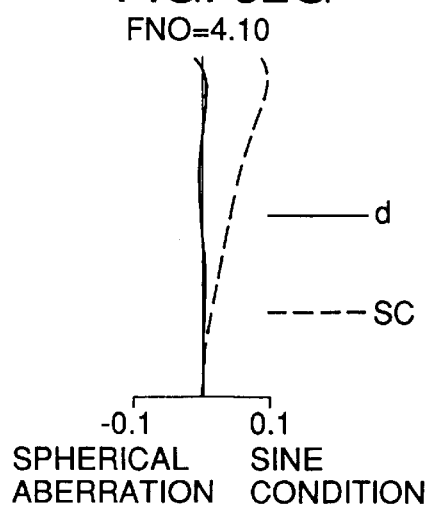
Figure 32H:
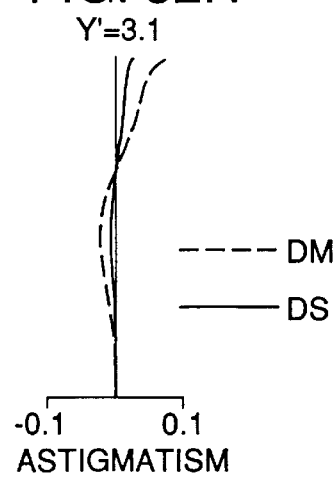
Figure 32I:
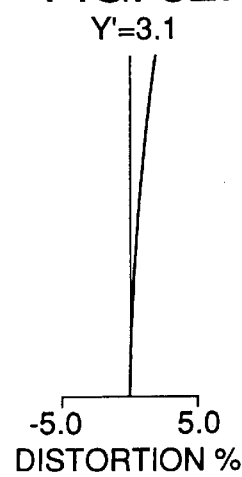
Figure 33A:
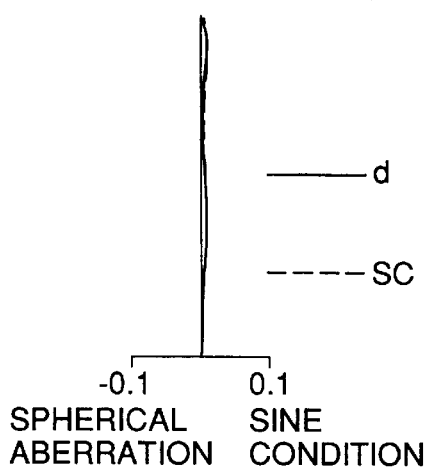
FIGS. 33A to 33I are graphic representations of the aberrations observed in the close-distance shooting condition (D=1m) in Example 13.
Figure 33B:
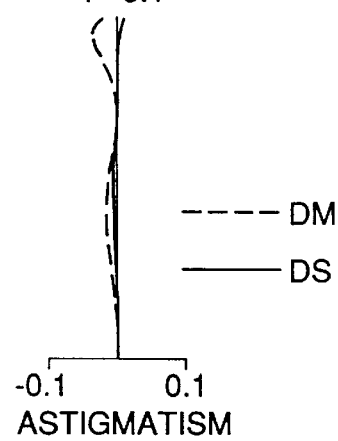
Figure 33C:
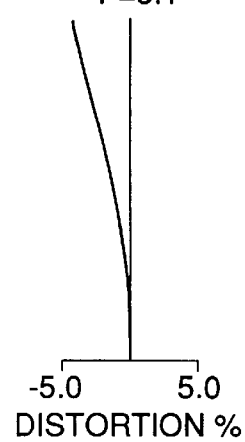
Figure 33D:
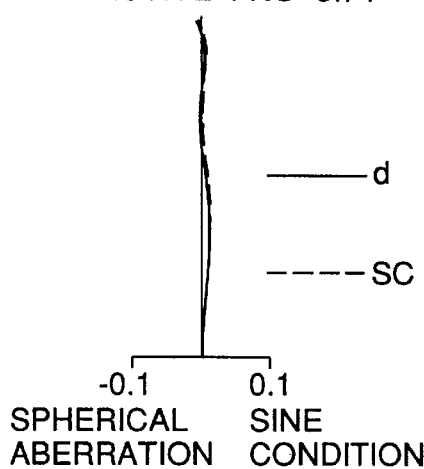
Figure 33E:
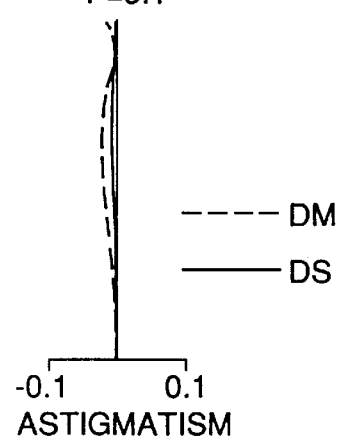
Figure 33F:
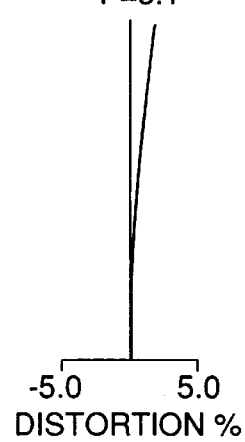
Figure 33G:
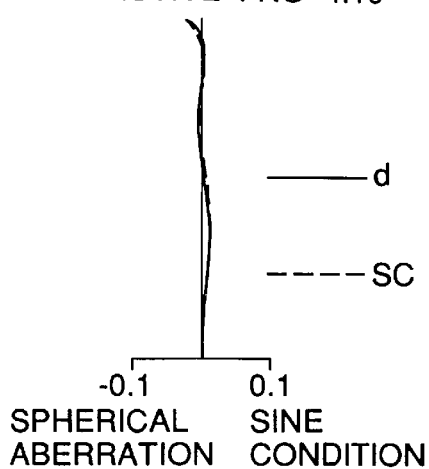
Figure 33H:
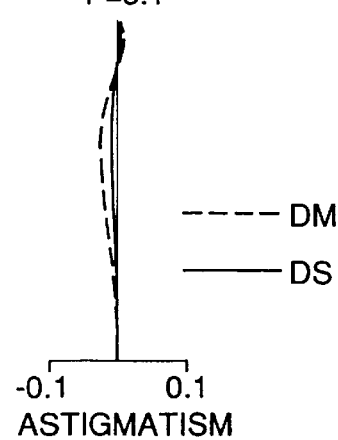
Figure 33I:
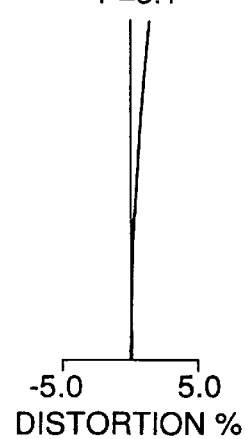

FIGS. 4A to 4I, 5A to 5I, and 6A to 6I are graphic representations of the aberrations observed in Examples 1 to 3, respectively; FIGS. 11A to 11I and 12A to 12I, 13A to 13I and 14A to 14I, 15A to 15I and 16A to 16I, and 17A to 17I and 18A to 18I are graphic representations of the aberrations observed in Examples 4 to 7, respectively; FIGS. 22A to 22I, 23A to 23I, and 24A to 24I are graphic representations of the aberrations observed in Examples 8 to 10, respectively; and FIGS. 28A to 28I and 29A to 29I, 30A to 30I and 31A to 31I, and 32A to 32I and 33A to 33I are graphic representations of the aberrations observed in Examples 11 to 13, respectively. Of these diagrams, FIGS. 11A to 11I, 13A to 13I, 15A to 15I, and 17A to 17I show the aberrations observed in the infinite-distance shooting condition in Examples 4 to 7; FIGS. 12A to 12I, 14A to 14I, 16A to 16I, and 18A to 18I show the aberrations observed in the close-distance shooting condition (the object distance D equals 1m) in Examples 4 to 7; FIGS. 28A to 28I, 30A to 30I, and 32A to 32I show the aberrations observed in the infinite-distance shooting condition in Examples 11 to 13; and FIGS. 29A to 29I, 31A to 31I, and 33A to 33I show the aberrations observed in the close-distance shooting condition (the object distance D equals 1m) in Examples 11 to 13.

Of these diagrams, FIGS. 4A to 4C, 5A to 5C, 6A to 6C, 11A to 11C, 12A to 12C, 13A to 13C, 14A to 14C, 15A to 15C, 16A to 16C, 17A to 17C, 18A to 18C, 22A to 22C, 23A to 23C, 24A to 24C, 28A to 28C, 29A to 29C, 30A to 30C, 31A to 31C, 32A to 32C, and 33A to 33C show the aberrations observed at the wide-angle end [W]; FIGS. 4D to 4F, 5D to 5F, 6D to 6F, 11D to 11F, 12D to 12F, 13D to 13F, 14D to 14F, 15D to 15F, 16D to 16F, 17D to 17F, 18D to 18F, 22D to 22F, 23D to 23F, 24D to 24F, 28D to 28F, 29D to 29F, 30D to 30F, 31D to 31F, 32D to 32F, and 33D to 33F show the aberrations observed at the middle focal length [M]; and FIGS. 4G to 4I, 5G to 5I, 6G to 6I, 11G to 11I, 12G to 12I, 13G to 13I, 14G to 14I, 15G to 15I, 16G to 16I, 17G to 17I, 18G to 18I, 22G to 22I, 23G to 23I, 24G to 24I, 28G to 28I, 29G to 29I, 30G to 30I, 31G to 31I, 32G to 32I, and 33G to 33I show the aberrations observed at the telephoto end [T].

Of these diagrams, FIGS. 4A, 4D, 4G, 5A, 5D, 5G, 6A, 6D, 6G, 11A, 11D, 11G, 12A, 12D, 12G, 13A, 13D, 13G, 14A, 14D, 14G, 15A, 15D, 15G, 16A, 16D, 16G, 17A, 17D, 17G, 18A, 18D, 18G, 22A, 22D, 22G, 23A, 23D, 23G, 24A, 24D, 24G, 28A, 28D, 28G, 29A, 29D, 29G, 30A, 30D, 30G, 31A, 31D, 31G, 32A, 32D, 32G, 33A, 33D, and 33G show spherical aberration and sine condition. In these diagrams, the solid line (d) represents the spherical aberration for the d-line and the broken line (SC) represents the sine condition. FIGS. 4B, 4E, 4H, 5B, 5E, 5H, 6B, 6E, 6H, 11B, 11E, 11H, 12B, 12E, 12H, 13B, 13E, 13H, 14B, 14E, 14H, 15B, 15E, 15H, 16B, 16E, 16H, 17B, 17E, 17H, 18B, 18E, 18H, 22B, 22E, 22H, 23B, 23E, 23H, 24B, 24E, 24H, 28B, 28E, 28H, 29B, 29E, 29H, 30B, 30E, 30H, 31B, 31E, 31H, 32B, 32E, 32H, 33B, 33E, and 33H show astigmatism (Y' represents the image height). In these diagrams, the broken line (DM) and the solid line (DS) represent the astigmatism for the d-line on the meridional plane and on the sagittal plane, respectively. FIGS. 4C, 4F, 4I, 5C, 5F, 5I, 6C, 6F, 6I, 11C, 11F, 11I, 12C, 12F, 12I, 13C, 13F, 13I, 14C, 14F, 14I, 15C, 15F, 15I, 16C, 16F, 16I, 17C, 17F, 17I, 18C, 18F, 18I, 22C, 22F, 22I, 23C, 23F, 23I, 24C, 24F, 24I, 28C, 28F, 28I, 29C, 29F, 29I, 30C, 30F, 30I, 31C, 31F, 31I, 32C, 32F, 32I, 33C, 33F, and 33I show distortion (Y' represents the image height).

TABLE 1

Construction Data of Example 1 f = 5.1~12.0~29.5
FNO = 2.47~2.88~3.5

| Radius of Curvature | Axial Distance | Refractive Index | Abbe Number |
|---|---|---|---|
| r1 = 43.996 | d1 = 0.800 | N1 = 1.83350 | ν1 = 21.00 |
| r2 = 21.914 | d2 = 3.302 | N2 = 1.60311 | ν2 = 60.74 |
| r3 = −73.535 | d3 = 0.100 | | |
| r4 = 13.657 | d4 = 1.660 | N3 = 1.71300 | ν3 = 53.93 |
| r5 = 22.983 | d5 = 0.500~6.229~10.540 | | |
| r6 = 23.565 | d6 = 0.650 | N4 = 1.77250 | ν4 = 49.77 |
| r7 = 5.746 | d7 = 3.043 | | |
| r8* = −7.343 | d8 = 0.700 | N5 = 1.77250 | ν5 = 49.77 |
| r9 = 8.300 | d9 = 1.434 | N6 = 1.84666 | ν6 = 23.82 |
| r10* = −31.736 | d10 = 10.540~4.811~0.500 | | |
| r11 = ∞ (Aperture Stop S) | d11 = 0.500 | | |
| r12* = 10.624 | d12 = 1.643 | N7 = 1.69680 | ν7 = 56.47 |
| r13 = −28.755 | d13 = 0.600 | N8 = 1.84666 | ν8 = 23.82 |
| r14* = 45.584 | d14 = 5.020~2.671~0.200 | | |
| r15 = 6.982 | d15 = 2.727 | N9 = 1.68828 | ν9 = 52.89 |
| r16 = 118.458 | d16 = 0.100 | | |
| r17 = 10.853 | d17 = 1.772 | N10 = 1.48749 | ν10 = 70.44 |
| r18 = −61.268 | d18 = 0.100 | | |
| r19* = −611.273 | d19 = 1.000 | N11 = 1.84666 | ν11 = 23.82 |
| r20* = 10.062 | d20 = 1.000~3.349~5.820 | | |
| r21 = ∞ | d21 = 3.400 | N12 = 1.51680 | ν12 = 64.20 |
| r22 = ∞ | | | |

[Aspherical Data of Eighth Surface (r8)]

$\epsilon = 1.0000$
$A4 = 0.58736 \times 10^{-3}$
$A6 = -0.37613 \times 10^{-4}$
$A8 = 0.15455 \times 10^{-5}$

[Aspherical Data of Tenth Surface (r10)]

$\epsilon = 1.0000$
$A4 = 0.27038 \times 10^{-3}$
$A6 = -0.12672 \times 10^{-4}$
$A8 = -0.52313 \times 10^{-6}$
$A10 = 0.83144 \times 10^{-7}$

[Aspherical Data of Twelfth Surface (r12)]

$\epsilon = 1.0000$
$A4 = -0.10024 \times 10^{-3}$

TABLE 1-continued

Construction Data of Example 1 f = 5.1~12.0~29.5
FNO = 2.47~2.88~3.5

$A6 = 0.22829 \times 10^{-4}$
$A8 = -0.38887 \times 10^{-5}$
$A10 = 0.24924 \times 10^{-6}$

[Aspherical Data of Fourteenth Surface (r14)]

$\epsilon = 1.0000$
$A4 = 0.79577 \times 10^{-4}$
$A6 = 0.83193 \times 10^{-5}$
$A8 = -0.12804 \times 10^{-5}$
$A10 = 0.89044 \times 10^{-7}$

[Aspherical Data of Nineteenth Surface (r19)]

$\epsilon = 1.0000$
$A4 = 0.10674 \times 10^{-2}$
$A6 = -0.83586 \times 10^{-4}$
$A8 = 0.11200 \times 10^{-5}$

[Aspherical Data of Twentieth Surface (r20)]

$\epsilon = 1.0000$
$A4 = 0.29367 \times 10^{-2}$
$A6 = -0.32238 \times 10^{-4}$
$A8 = 0.24911 \times 10^{-5}$

[Values of Condition (6) on Eighth Surface (r8)]

y = 0.00 ymax ... $(|x| - |x0|)/\{C0(N' - N) \cdot f2\} = 0.00000$
y = 0.20 ymax ... $(|x| - |x0|)/\{C0(N' - N) \cdot f2\} = -0.00015$
y = 0.40 ymax ... $(|x| - |x0|)/\{C0(N' - N) \cdot f2\} = -0.00218$
y = 0.60 ymax ... $(|x| - |x0|)/\{C0(N' - N) \cdot f2\} = -0.00985$
y = 0.80 ymax ... $(|x| - |x0|)/\{C0(N' - N) \cdot f2\} = -0.02713$
y = 1.00 ymax ... $(|x| - |x0|)/\{C0(N' - N) \cdot f2\} = -0.05890$

[Values of Condition (6) on Tenth Surface (r10)]

y = 0.00 ymax ... $(|x| - |x0|)/\{C0(N' - N) \cdot f2\} = 0.00000$
y = 0.20 ymax ... $(|x| - |x0|)/\{C0(N' - N) \cdot f2\} = 0.00018$
y = 0.40 ymax ... $(|x| - |x0|)/\{C0(N' - N) \cdot f2\} = 0.00273$
y = 0.60 ymax ... $(|x| - |x0|)/\{C0(N' - N) \cdot f2\} = 0.01263$
y = 0.80 ymax ... $(|x| - |x0|)/\{C0(N' - N) \cdot f2\} = 0.03506$
y = 1.00 ymax ... $(|x| - |x0|)/\{C0(N' - N) \cdot f2\} = 0.07505$

[Values of Condition (7) on Nineteenth Surface (r19)]

y = 0.00 ymax ... $(|x| - |x0|)/\{C0(N' - N) \cdot f4\} = -0.00000$
y = 0.20 ymax ... $(|x| - |x0|)/\{C0(N' - N) \cdot f4\} = 0.01309$
y = 0.40 ymax ... $(|x| - |x0|)/\{C0(N' - N) \cdot f4\} = -0.00325$
y = 0.60 ymax ... $(|x| - |x0|)/\{C0(N' - N) \cdot f4\} = -0.35412$
y = 0.80 ymax ... $(|x| - |x0|)/\{C0(N' - N) \cdot f4\} = -0.96012$
y = 1.00 ymax ... $(|x| - |x0|)/\{C0(N' - N) \cdot f4\} = -0.95819$

[Values of Condition (7) on Twentieth Surface (r20)]

y = 0.00 ymax ... $(|x| - |x0|)/\{C0(N' - N) \cdot f4\} = -0.00000$
y = 0.20 ymax ... $(|x| - |x0|)/\{C0(N' - N) \cdot f4\} = -0.00037$
y = 0.40 ymax ... $(|x| - |x0|)/\{C0(N' - N) \cdot f4\} = -0.00580$
y = 0.60 ymax ... $(|x| - |x0|)/\{C0(N' - N) \cdot f4\} = -0.02900$
y = 0.80 ymax ... $(|x| - |x0|)/\{C0(N' - N) \cdot f4\} = -0.09082$
y = 1.00 ymax ... $(|x| - |x0|)/\{C0(N' - N) \cdot f4\} = -0.22259$

TABLE 2

Construction Data of Example 2 f = 5.3~9.2~15.3
FNO = 3.8~3.95~4.1

| Radius of Curvature | Axial Distance | Refractive Index | Abbe Number |
|---|---|---|---|
| r1 = 15.662 | d1 = 0.750 | N1 = 1.84666 | ν1 = 23.82 |
| r2 = 9.499 | d2 = 0.176 | | |
| r3 = 9.726 | d3 = 2.869 | N2 = 1.77250 | ν2 = 49.77 |
| r4 = 1208.226 | d4 = 0.600~4.439~7.518 | | |
| r5 = −173.591 | d5 = 0.550 | N3 = 1.77250 | ν3 = 49.77 |

TABLE 2-continued

Construction Data of Example 2 f = 5.3~9.2~15.3
FNO = 3.8~3.95~4.1

| | | | |
|---|---|---|---|
| r6 = 6.399 | d6 = 1.275 | | |
| r7* = −40.319 | d7 = 0.600 | N4 = 1.77250 | ν4 = 49.77 |
| r8* = 6.348 | d8 = 0.116 | | |
| r9 = 7.236 | d9 = 1.313 | N5 = 1.84666 | ν5 = 23.82 |
| r10 = 70.504 | d10 = 7.418~3.578~0.500 | | |
| r11 = ∞ (Aperture Stop S) | d11 = 0.500 | | |
| r12* = 2.954 | d12 = 1.299 | N6 = 1.77250 | ν6 = 49.77 |
| r13 = 6.854 | d13 = 0.500 | N7 = 1.84666 | ν7 = 23.82 |
| r14* = 3.296 | d14 = 3.142~2.287~1.757 | | |
| r15* = 5.968 | d15 = 2.100 | N8 = 1.51728 | ν8 = 69.43 |
| r16* = −5.999 | d16 = 0.138 | | |
| r17 = −5.519 | d17 = 0.600 | N9 = 1.80518 | ν9 = 25.43 |
| r18 = −8.350 | d18 = 1.206~2.061~2.591 | | |
| r19 = ∞ | d19 = 3.400 | N10 = 1.51680 | ν10 = 64.20 |
| r20 = ∞ | | | |

[Aspherical Data of Seventh Surface (r7)]

$\epsilon = 1.0000$
$A4 = -0.13314 \times 10^{-2}$
$A6 = 0.12578 \times 10^{-3}$
$A8 = -0.29071 \times 10^{-5}$

[Aspherical Data of Eighth Surface (r8)]

$\epsilon = 1.0000$
$A4 = -0.19343 \times 10^{-2}$
$A6 = 0.11548 \times 10^{-3}$
$A8 = -0.18660 \times 10^{-5}$

[Aspherical Data of Twelfth Surface (r12)]

$\epsilon = 1.0000$
$A4 = -0.87387 \times 10^{-3}$
$A6 = -0.76491 \times 10^{-3}$
$A8 = 0.44346 \times 10^{-3}$
$A10 = -0.83383 \times 10^{-4}$

[Aspherical Data of Fourteenth Surface (r14)]

$\epsilon = 1.0000$
$A4 = 0.29659 \times 10^{-2}$
$A6 = -0.86284 \times 10^{-4}$
$A8 = 0.62922 \times 10^{-3}$
$A10 = -0.91345 \times 10^{-4}$

[Aspherical Data of Fifteenth Surface (r15)]

$\epsilon = 1.0000$
$A4 = -0.17705 \times 10^{-2}$
$A6 = -0.10599 \times 10^{-3}$
$A8 = -0.16088 \times 10^{-4}$
$A10 = 0.23640 \times 10^{-5}$
$A12 = -0.28239 \times 10^{-6}$

[Aspherical Data of Sixteenth Surface (r16)]

$\epsilon = 1.0000$
$A4 = 0.69986 \times 10^{-3}$
$A6 = -0.68554 \times 10^{-4}$
$A8 = -0.16895 \times 10^{-4}$

[Values of Condition (6) on Seventh Surface (r7)]

y = 0.00 ymax . . . $(|x| - |x0|)/\{C0(N' - N) \cdot f2\} = 0.00000$
y = 0.20 ymax . . . $(|x| - |x0|)/\{C0(N' - N) \cdot f2\} = 0.00115$
y = 0.40 ymax . . . $(|x| - |x0|)/\{C0(N' - N) \cdot f2\} = 0.01671$
y = 0.60 ymax . . . $(|x| - |x0|)/\{C0(N' - N) \cdot f2\} = 0.07146$
y = 0.80 ymax . . . $(|x| - |x0|)/\{C0(N' - N) \cdot f2\} = 0.17348$
y = 1.00 ymax . . . $(|x| - |x0|)/\{C0(N' - N) \cdot f2\} = 0.28312$

[Values of Condition (6) on Eighth Surface (r8)]

y = 0.00 ymax . . . $(|x| - |x0|)/\{C0(N' - N) \cdot f2\} = 0.00000$
y = 0.20 ymax . . . $(|x| - |x0|)/\{C0(N' - N) \cdot f2\} = -0.00019$
y = 0.40 ymax . . . $(|x| - |x0|)/\{C0(N' - N) \cdot f2\} = -0.00294$
y = 0.60 ymax . . . $(|x| - |x0|)/\{C0(N' - N) \cdot f2\} = -0.01365$
y = 0.80 ymax . . . $(|x| - |x0|)/\{C0(N' - N) \cdot f2\} = -0.03805$

TABLE 2-continued

Construction Data of Example 2 f = 5.3~9.2~15.3
FNO = 3.8~3.95~4.1 y = 1.00 ymax . . . $(|x| - |x0|)/\{C0(N' - N) \cdot f2\} = -0.07816$

[Values of Condition (7) on Fifteenth Surface (r15)]

y = 0.00 ymax . . . $(|x| - |x0|)/\{C0(N' - N) \cdot f4\} = 0.00000$
y = 0.20 ymax . . . $(|x| - |x0|)/\{C0(N' - N) \cdot f4\} = -0.00016$
y = 0.40 ymax . . . $(|x| - |x0|)/\{C0(N' - N) \cdot f4\} = -0.00272$
y = 0.60 ymax . . . $(|x| - |x0|)/\{C0(N' - N) \cdot f4\} = -0.01511$
y = 0.80 ymax . . . $(|x| - |x0|)/\{C0(N' - N) \cdot f4\} = -0.05492$
y = 1.00 ymax . . . $(|x| - |x0|)/\{C0(N' - N) \cdot f4\} = -0.16599$

[Values of Condition (7) on Sixteenth Surface (r16)]

y = 0.00 ymax . . . $(|x| - |x0|)/\{C0(N' - N) \cdot f4\} = 0.00000$
y = 0.20 ymax . . . $(|x| - |x0|)/\{C0(N' - N) \cdot f4\} = -0.00017$
y = 0.40 ymax . . . $(|x| - |x0|)/\{C0(N' - N) \cdot f4\} = -0.00233$
y = 0.60 ymax . . . $(|x| - |x0|)/\{C0(N' - N) \cdot f4\} = -0.00813$
y = 0.80 ymax . . . $(|x| - |x0|)/\{C0(N' - N) \cdot f4\} = -0.00220$
y = 1.00 ymax . . . $(|x| - |x0|)/\{C0(N' - N) \cdot f4\} = -0.09842$

TABLE 3

Construction Data of Example 3 f = 5.1~16.0~48.9
FNO = 2.2~2.7~4.1

| Radius of Curvature | Axial Distance | Refractive Index | Abbe Number |
|---|---|---|---|
| r1 = 47.735 | d1 = 0.800 | N1 = 1.84666 | ν1 = 23.82 |
| r2 = 23.658 | d2 = 3.072 | N2 = 1.59286 | ν2 = 59.50 |
| r3 = −113.204 | d3 = 0.100 | | |
| r4 = 16.286 | d4 = 2.151 | N3 = 1.49310 | ν3 = 83.58 |
| r5 = 52.129 | d5 = 0.500~9.086~13.505 | | |
| r6 = 32.852 | d6 = 0.650 | N4 = 1.77250 | ν4 = 49.77 |
| r7 = 7.245 | d7 = 2.565 | | |
| r8* = −8.386 | d8 = 0.700 | N5 = 1.77250 | ν5 = 49.77 |
| r9 = 6.514 | d9 = 1.860 | N6 = 1.84666 | ν6 = 23.82 |
| r10* = −67.944 | d10 = 13.505~4.919~0.500 | | |
| r11 = ∞ (Aperture Stop S) | d11 = 0.500 | | |
| r12* = 8.994 | d12 = 1.803 | N7 = 1.70490 | ν7 = 53.41 |
| r13 = −757.679 | d13 = 0.600 | N8 = 1.84666 | ν8 = 23.82 |
| r14* = 16.350 | d14 = 9.617~5.891~0.200 | | |
| r15 = 6.901 | d15 = 2.778 | N9 = 1.48749 | ν9 = 70.44 |
| r16 = 42.197 | d16 = 0.100 | | |
| r17 = 7.060 | d17 = 2.808 | N10 = 1.48749 | ν10 = 70.44 |
| r18 = −25.612 | d18 = 0.100 | | |
| r19* = 68.296 | d19 = 2.499 | N11 = 1.84922 | ν11 = 34.59 |
| r20* = 6.757 | d20 = 1.000~4.726~10.417 | | |
| r21 = ∞ | d21 = 3.400 | N12 = 1.51680 | ν12 = 64.20 |
| r22 = ∞ | | | |

[Aspherical Data of Eighth Surface (r8)]

$\epsilon = 1.0000$
$A4 = 0.87732 \times 10^{-3}$
$A6 = -0.13530 \times 10^{-4}$
$A8 = 0.31574 \times 10^{-6}$

[Aspherical Data of Tenth Surface (r10)]

$\epsilon = 1.0000$
$A4 = 0.58793 \times 10^{-3}$
$A6 = -0.47078 \times 10^{-5}$
$A8 = -0.25169 \times 10^{-6}$
$A10 = 0.18773 \times 10^{-7}$

[Aspherical Data of Twelfth Surface (r12)]

$\epsilon = 1.0000$

TABLE 3-continued

Construction Data of Example 3 f = 5.1~16.0~48.9
FNO = 2.2~2.7~4.1

A4 = −0.17364 × $10^{-3}$
A6 = 0.14615 × $10^{-4}$
A8 = −0.13173 × $10^{-5}$
A10 = 0.54342 × $10^{-7}$
[Aspherical Data of Fourteenth Surface (r14)]

ε = 1.0000
A4 = −0.44606 × $10^{-4}$
A6 = 0.17082 × $10^{-4}$
A8 = −0.15023 × $10^{-5}$
A10 = 0.64066 × $10^{-7}$
[Aspherical Data of Nineteenth Surface (r19)]

ε = 1.0000
A4 = −0.12211 × $10^{-2}$
A6 = 0.11329 × $10^{-4}$
A8 = −0.12342 × $10^{-6}$
[Aspherical Data of Twentieth Surface (r20)]

ε = 1.0000
A4 = −0.91492 × $10^{-4}$
A6 = 0.58137 × $10^{-4}$
A8 = 0.11083 × $10^{-5}$
[Values of Condition (6) on Eighth Surface (r8)]

y = 0.00 ymax . . . (|x| − |x0|)/{C0(N' − N) · f2} = 0.00000
y = 0.20 ymax . . . (|x| − |x0|)/{C0(N' − N) · f2} = −0.00050
y = 0.40 ymax . . . (|x| − |x0|)/{C0(N' − N) · f2} = −0.00787
y = 0.60 ymax . . . (|x| − |x0|)/{C0(N' − N) · f2} = −0.03833
y = 0.80 ymax . . . (|x| − |x0|)/{C0(N' − N) · f2} = −0.11575
y = 1.00 ymax . . . (|x| − |x0|)/{C0(N' − N) · f2} = −0.27118
[Values of Condition (6) on Tenth Surface (r10)]

y = 0.00 ymax . . . (|x| − |x0|)/{C0(N' − N) · f2} = 0.00000
y = 0.20 ymax . . . (|x| − |x0|)/{C0(N' − N) · f2} = 0.00171
y = 0.40 ymax . . . (|x| − |x0|)/{C0(N' − N) · f2} = 0.02696
y = 0.60 ymax . . . (|x| − |x0|)/{C0(N' − N) · f2} = 0.13328
y = 0.80 ymax . . . (|x| − |x0|)/{C0(N' − N) · f2} = 0.40716
y = 1.00 ymax . . . (|x| − |x0|)/{C0(N' − N) · f2} = 0.961251
[Values of Condition (7) on Nineteenth Surface (r19)]

y = 0.00 ymax . . . (|x| − |x0|)/{C0(N' − N) · f4} = 0.00000
y = 0.20 ymax . . . (|x| − |x0|)/{C0(N' − N) · f4} = −0.00298
y = 0.40 ymax . . . (|x| − |x0|)/{C0(N' − N) · f4} = −0.04686
y = 0.60 ymax . . . (|x| − |x0|)/{C0(N' − N) · f4} = −0.23111
y = 0.80 ymax . . . (|x| − |x0|)/{C0(N' − N) · f4} = −0.25716
y = 1.00 ymax . . . (|x| − |x0|)/{C0(N' − N) · f4} = 0.14946
[Values of Condition (7) on Twentieth Surface (r20)]

y = 0.00 ymax . . . (|x| − |x0|)/{C0(N' − N) · f4} = 0.00000
y = 0.20 ymax . . . (|x| − |x0|)/{C0(N' − N) · f4} = 0.00000
y = 0.40 ymax . . . (|x| − |x0|)/{C0(N' − N) · f4} = 0.00000
y = 0.60 ymax . . . (|x| − |x0|)/{C0(N' − N) · f4} = −0.00082
y = 0.80 ymax . . . (|x| − |x0|)/{C0(N' − N) · f4} = −0.00665
y = 1.00 ymax . . . (|x| − |x0|)/{C0(N' − N) · f4} = −0.03019

TABLE 4

Construction Data of Example 4 f = 5.1~12.0~29.5
FNO = 2.9~3.38~4.1

| Radius of Curvature | Axial Distance | Refractive Index | Abbe Number |
|---|---|---|---|
| r1 = 43.378 | d1 = 0.800 | N1 = 1.83350 | ν1 = 21.00 |
| r2 = 21.278 | d2 = 3.321 | N2 = 1.60311 | ν2 = 60.74 |
| r3 = −69.047 | d3 = 0.100 | | |
| r4 = 13.046 | d4 = 1.674 | N3 = 1.71300 | ν3 = 53.93 |
| r5 = 22.328 | d5 = 0.500~5.897~9.983 | | |
| r6 = 22.712 | d6 = 0.650 | N4 = 1.77250 | ν4 = 49.77 |
| r7 = 5.535 | d7 = 2.790 | | |
| r8* = −7.538 | d8 = 0.700 | N5 = 1.77250 | ν5 = 49.77 |
| r9 = 7.065 | d9 = 1.428 | N6 = 1.84666 | ν6 = 23.82 |
| r10* = −50.971 | d10 = 9.983~4.586~0.500 | | |
| r11 = ∞ (Aperture Stop S) | d11 = 0.500 | | |
| r12* = 11.185 | d12 = 1.630 | N7 = 1.69680 | ν7 = 56.47 |
| r13 = −17.692 | d13 = 0.600 | N8 = 1.84666 | ν8 = 23.82 |
| r14* = 325.535 | d14 = 5.144~2.684~0.200 | | |
| r15 = 5.637 | d15 = 3.627 | N9 = 1.62280 | ν9 = 56.88 |
| r16 = −21.578 | d16 = 0.509 | | |
| r17* = 116.000 | d17 = 1.000 | N10 = 1.84666 | ν10 = 23.82 |
| r18* = 9.196 | d18 = 1.000~3.459~5.944 | | |
| r19 = ∞ | d19 = 3.400 | N11 = 1.51680 | ν11 = 64.20 |
| r20 = ∞ | | | |

[Aspherical Data of Eighth Surface (r8)]

ε = 1.0000
A4 = 0.40767 × $10^{-3}$
A6 = −0.34613 × $10^{-4}$
A8 = 0.14147 × $10^{-5}$
[Aspherical Data of Tenth Surface (r10)]

ε = 1.0000
A4 = 0.18081 × $10^{-3}$
A6 = −0.94386 × $10^{-5}$
A8 = −0.46661 × $10^{-6}$
A10 = 0.79702 × $10^{-7}$
[Aspherical Data of Twelfth Surface (r12)]

ε = 1.0000
A4 = 0.27751 × $10^{-4}$
A6 = −0.29005 × $10^{-4}$
A8 = 0.58934 × $10^{-5}$
A10 = −0.42363 × $10^{-6}$
[Aspherical Data of Fourteenth Surface (r14)]

ε = 1.0000
A4 = 0.11060 × $10^{-3}$
A6 = −0.37336 × $10^{-5}$
A8 = 0.53196 × $10^{-7}$
A10 = 0.36713 × $10^{-7}$
[Aspherical Data of Seventeenth Surface (r17)]

ε = 1.0000
A4 = −0.65248 × $10^{-3}$
A6 = −0.17220 × $10^{-4}$
A8 = −0.18944 × $10^{-5}$
[Aspherical Data of Eighteenth Surface (r18)]

ε = 1.0000
A4 = 0.14749 × $10^{-2}$
A6 = 0.60592 × $10^{-4}$
A8 = 0.94892 × $10^{-6}$
[Values of Condition (12) on Eighth Surface (r8)]

y = 0.00 ymax . . . (|x| − |x0|)/{C0(N' − N) · f2} = 0.00000
y = 0.10 ymax . . . (|x| − |x0|)/{C0(N' − N) · f2} = −0.00001
y = 0.20 ymax . . . (|x| − |x0|)/{C0(N' − N) · f2} = −0.00009
y = 0.30 ymax . . . (|x| − |x0|)/{C0(N' − N) · f2} = −0.00044
y = 0.40 ymax . . . (|x| − |x0|)/{C0(N' − N) · f2} = −0.00133
y = 0.50 ymax . . . (|x| − |x0|)/{C0(N' − N) · f2} = −0.00305
y = 0.60 ymax . . . (|x| − |x0|)/{C0(N' − N) · f2} = −0.00584
y = 0.70 ymax . . . (|x| − |x0|)/{C0(N' − N) · f2} = −0.00987
y = 0.80 ymax . . . (|x| − |x0|)/{C0(N' − N) · f2} = −0.01525
y = 0.90 ymax . . . (|x| − |x0|)/{C0(N' − N) · f2} = −0.02209
y = 1.00 ymax . . . (|x| − |x0|)/{C0(N' − N) · f2} = −0.03074

TABLE 4-continued

Construction Data of Example 4 f = 5.1~12.0~29.5
FNO = 2.9~3.38~4.1

[Values of Condition (12) on Tenth Surface (r10)]

y = 0.00 ymax ... ($|x| - |x0|$)/{C0(N' - N) · f2} = -0.00000
y = 0.10 ymax ... ($|x| - |x0|$)/{C0(N' - N) · f2} = 0.00001
y = 0.20 ymax ... ($|x| - |x0|$)/{C0(N' - N) · f2} = 0.00018
y = 0.30 ymax ... ($|x| - |x0|$)/{C0(N' - N) · f2} = 0.00088
y = 0.40 ymax ... ($|x| - |x0|$)/{C0(N' - N) · f2} = 0.00270
y = 0.50 ymax ... ($|x| - |x0|$)/{C0(N' - N) · f2} = 0.00633
y = 0.60 ymax ... ($|x| - |x0|$)/{C0(N' - N) · f2} = 0.01246
y = 0.70 ymax ... ($|x| - |x0|$)/{C0(N' - N) · f2} = 0.02165
y = 0.80 ymax ... ($|x| - |x0|$)/{C0(N' - N) · f2} = 0.03437
y = 0.90 ymax ... ($|x| - |x0|$)/{C0(N' - N) · f2} = 0.05118
y = 1.00 ymax ... ($|x| - |x0|$)/{C0(N' - N) · f2} = 0.07356

[Values of Condition (13) On Seventeenth Surface (r17)]

y = 0.00 ymax ... ($|x| - |x0|$)/{C0(N' - N) · f4} = 0.00000
y = 0.10 ymax ... ($|x| - |x0|$)/{C0(N' - N) · f4} = -0.00008
y = 0.20 ymax ... ($|x| - |x0|$)/{C0(N' - N) · f4} = -0.00135
y = 0.30 ymax ... ($|x| - |x0|$)/{C0(N' - N) · f4} = -0.00695
y = 0.40 ymax ... ($|x| - |x0|$)/{C0(N' - N) · f4} = -0.02250
y = 0.50 ymax ... ($|x| - |x0|$)/{C0(N' - N) · f4} = -0.05690
y = 0.60 ymax ... ($|x| - |x0|$)/{C0(N' - N) · f4} = -0.12379
y = 0.70 ymax ... ($|x| - |x0|$)/{C0(N' - N) · f4} = -0.24412
y = 0.80 ymax ... ($|x| - |x0|$)/{C0(N' - N) · f4} = -0.20652
y = 0.90 ymax ... ($|x| - |x0|$)/{C0(N' - N) · f4} = -0.03851
y = 1.00 ymax ... ($|x| - |x0|$)/{C0(N' - N) · f4} = 0.32291

[Values of Condition (13) on Eighteenth Surface (r18)]

y = 0.00 ymax ... ($|x| - |x0|$)/{C0(N' - N) · f4} = 0.00000
y = 0.10 ymax ... ($|x| - |x0|$)/{C0(N' - N) · f4} = -0.00001
y = 0.20 ymax ... ($|x| - |x0|$)/{C0(N' - N) · f4} = -0.00015
y = 0.30 ymax ... ($|x| - |x0|$)/{C0(N' - N) · f4} = -0.00076
y = 0.40 ymax ... ($|x| - |x0|$)/{C0(N' - N) · f4} = -0.00247
y = 0.50 ymax ... ($|x| - |x0|$)/{C0(N' - N) · f4} = -0.00621
y = 0.60 ymax ... ($|x| - |x0|$)/{C0(N' - N) · f4} = -0.01337
y = 0.70 ymax ... ($|x| - |x0|$)/{C0(N' - N) · f4} = -0.02585
y = 0.80 ymax ... ($|x| - |x0|$)/{C0(N' - N) · f4} = -0.04632
y = 0.90 ymax ... ($|x| - |x0|$)/{C0(N' - N) · f4} = -0.07838
y = 1.00 ymax ... ($|x| - |x0|$)/{C0(N' - N) · f4} = -0.12686

TABLE 5

Construction Data of Example 5 f = 5.1~16.0~48.8
FNO = 2.4~3.0~4.1

| Radius of Curvature | Axial Distance | Refractive Index | Abbe Number |
|---|---|---|---|
| r1 = 53.056 | d1 = 0.800 | N1 = 1.84666 | ν1 = 23.82 |
| r2 = 27.610 | d2 = 4.290 | N2 = 1.72579 | ν2 = 52.59 |
| r3 = -748.094 | d3 = 0.100 | | |
| r4 = 20.898 | d4 = 2.420 | N3 = 1.49310 | ν3 = 83.58 |
| r5 = 47.005 | d5 = 0.500~11.370~17.892 | | |
| r6 = 21.952 | d6 = 0.650 | N4 = 1.77250 | ν4 = 49.77 |
| r7 = 7.817 | d7 = 5.500 | | |
| r8* = -9.045 | d8 = 0.700 | N5 = 1.77250 | ν5 = 49.77 |
| r9 = 9.919 | d9 = 1.784 | N6 = 1.84666 | ν6 = 23.82 |
| r10* = -53.111 | d10 = 17.892~7.023~0.500 | | |
| r11 = ∞ (Aperture Stop S) | d11 = 0.500 | | |
| r12* = 12.961 | d12 = 1.642 | N7 = 1.75450 | ν7 = 51.57 |
| r13 = -90.941 | d13 = 0.600 | N8 = 1.84666 | ν8 = 23.82 |
| r14* = 30.925 | d14 = 7.976~4.481~0.200 | | |
| r15 = 6.170 | d15 = 4.342 | N9 = 1.54762 | ν9 = 63.26 |
| r16 = -20.156 | d16 = 0.100 | | |
| r17* = 78.855 | d17 = 1.154 | N10 = 1.84879 | ν10 = 32.11 |
| r18* = 8.123 | d18 = 0.231 | | |
| r19 = 5.787 | d19 = 3.589 | N11 = 1.48749 | ν11 = 70.44 |
| r20 = 6.522 | d20 = 1.311~4.806~9.087 | | |
| r21 = ∞ | d21 = 3.400 | N12 = 1.51680 | ν12 = 64.20 |
| r22 = ∞ | | | |

[Aspherical Data of Eighth Surface (r8)]

$\epsilon = 1.0000$
$A4 = 0.54279 \times 10^{-3}$
$A6 = -0.15745 \times 10^{-4}$
$A8 = 0.33159 \times 10^{-6}$

[Aspherical Data of Tenth Surface (r10)]

$\epsilon = 1.0000$
$A4 = 0.30792 \times 10^{-3}$
$A6 = -0.76564 \times 10^{-5}$
$A8 = -0.42745 \times 10^{-7}$
$A10 = 0.76414 \times 10^{-8}$

[Aspherical Data of Twelfth Surface (r12)]

$\epsilon = 1.0000$
$A4 = -0.96656 \times 10^{-4}$
$A6 = 0.19736 \times 10^{-4}$
$A8 = -0.19467 \times 10^{-5}$
$A10 = 0.74168 \times 10^{-7}$

[Aspherical Data of Fourteenth Surface (r14)]

$\epsilon = 1.0000$
$A4 = -0.15998 \times 10^{-4}$
$A6 = 0.14448 \times 10^{-4}$
$A8 = -0.12448 \times 10^{-5}$
$A10 = 0.45183 \times 10^{-7}$

[Aspherical Data of Seventeenth Surface (r17)]

$\epsilon = 1.0000$
$A4 = 0.16025 \times 10^{-3}$
$A6 = -0.26009 \times 10^{-4}$
$A8 = -0.35539 \times 10^{-6}$

[Aspherical Data of Eighteenth Surface (r18)]

$\epsilon = 1.0000$
$A4 = 0.15014 \times 10^{-2}$
$A6 = 0.57682 \times 10^{-5}$
$A8 = 0.15747 \times 10^{-5}$

[Values of Condition (12) on Eighth Surface (r8)]

y = 0.00 ymax ... ($|x| - |x0|$)/{C0(N' - N) · f2} = 0.00000
y = 0.10 ymax ... ($|x| - |x0|$)/{C0(N' - N) · f2} = -0.00003
y = 0.20 ymax ... ($|x| - |x0|$)/{C0(N' - N) · f2} = -0.00050
y = 0.30 ymax ... ($|x| - |x0|$)/{C0(N' - N) · f2} = -0.00247
y = 0.40 ymax ... ($|x| - |x0|$)/{C0(N' - N) · f2} = -0.00752
y = 0.50 ymax ... ($|x| - |x0|$)/{C0(N' - N) · f2} = -0.01753
y = 0.60 ymax ... ($|x| - |x0|$)/{C0(N' - N) · f2} = -0.03446
y = 0.70 ymax ... ($|x| - |x0|$)/{C0(N' - N) · f2} = -0.06021
y = 0.80 ymax ... ($|x| - |x0|$)/{C0(N' - N) · f2} = -0.09678
y = 0.90 ymax ... ($|x| - |x0|$)/{C0(N' - N) · f2} = -0.14675
y = 1.00 ymax ... ($|x| - |x0|$)/{C0(N' - N) · f2} = -0.21437

[Values of Condition (12) on Tenth Surface (r10)]

y = 0.00 ymax ... ($|x| - |x0|$)/{C0(N' - N) · f2} = -0.00000
y = 0.10 ymax ... ($|x| - |x0|$)/{C0(N' - N) · f2} = 0.00007
y = 0.20 ymax ... ($|x| - |x0|$)/{C0(N' - N) · f2} = 0.00115
y = 0.30 ymax ... ($|x| - |x0|$)/{C0(N' - N) · f2} = 0.00570
y = 0.40 ymax ... ($|x| - |x0|$)/{C0(N' - N) · f2} = 0.01748
y = 0.50 ymax ... ($|x| - |x0|$)/{C0(N' - N) · f2} = 0.04099
y = 0.60 ymax ... ($|x| - |x0|$)/{C0(N' - N) · f2} = 0.08084
y = 0.70 ymax ... ($|x| - |x0|$)/{C0(N' - N) · f2} = 0.14110
y = 0.80 ymax ... ($|x| - |x0|$)/{C0(N' - N) · f2} = 0.22524
y = 0.90 ymax ... ($|x| - |x0|$)/{C0(N' - N) · f2} = 0.33726
y = 1.00 ymax ... ($|x| - |x0|$)/{C0(N' - N) · f2} = 0.48552

[Values of Condition (13) on Seventeenth Surface (r17)]

y = 0.00 ymax ... ($|x| - |x0|$)/{C0(N' - N) · f4} = 0.00000

TABLE 5-continued

Construction Data of Example 5 f = 5.1~16.0~48.8
FNO = 2.4~3.0~4.1 y = 0.10 ymax . . . $(|x| - |x0|)/\{C0(N' - N) \cdot f4\}$ = 0.00002
y = 0.20 ymax . . . $(|x| - |x0|)/\{C0(N' - N) \cdot f4\}$ = 0.00032
y = 0.30 ymax . . . $(|x| - |x0|)/\{C0(N' - N) \cdot f4\}$ = 0.00139
y = 0.40 ymax . . . $(|x| - |x0|)/\{C0(N' - N) \cdot f4\}$ = 0.00346
y = 0.50 ymax . . . $(|x| - |x0|)/\{C0(N' - N) \cdot f4\}$ = 0.00537
y = 0.60 ymax . . . $(|x| - |x0|)/\{C0(N' - N) \cdot f4\}$ = 0.00308
y = 0.70 ymax . . . $(|x| - |x0|)/\{C0(N' - N) \cdot f4\}$ = −0.01269
y = 0.80 ymax . . . $(|x| - |x0|)/\{C0(N' - N) \cdot f4\}$ = −0.05952
y = 0.90 ymax . . . $(|x| - |x0|)/\{C0(N' - N) \cdot f4\}$ = −0.16762
y = 1.00 ymax . . . $(|x| - |x0|)/\{C0(N' - N) \cdot f4\}$ = −0.38533
[Values of Condition (13) on Eighteenth Surface (r18)]

y = 0.00 ymax . . . $(|x| - |x0|)/\{C0(N' - N) \cdot f4\}$ = −0.00000
y = 0.10 ymax . . . $(|x| - |x0|)/\{C0(N' - N) \cdot f4\}$ = −0.00001
y = 0.20 ymax . . . $(|x| - |x0|)/\{C0(N' - N) \cdot f4\}$ = −0.00020
y = 0.30 ymax . . . $(|x| - |x0|)/\{C0(N' - N) \cdot f4\}$ = −0.00099
y = 0.40 ymax . . . $(|x| - |x0|)/\{C0(N' - N) \cdot f4\}$ = −0.00315
y = 0.50 ymax . . . $(|x| - |x0|)/\{C0(N' - N) \cdot f4\}$ = −0.00775
y = 0.60 ymax . . . $(|x| - |x0|)/\{C0(N' - N) \cdot f4\}$ = −0.01628
y = 0.70 ymax . . . $(|x| - |x0|)/\{C0(N' - N) \cdot f4\}$ = −0.03072
y = 0.80 ymax . . . $(|x| - |x0|)/\{C0(N' - N) \cdot f4\}$ = −0.05375
y = 0.90 ymax . . . $(|x| - |x0|)/\{C0(N' - N) \cdot f4\}$ = −0.08910
y = 1.00 ymax . . . $(|x| - |x0|)/\{C0(N' - N) \cdot f4\}$ = −0.14192

TABLE 6

Construction Data of Example 6 f = 5.3~9.2~15.3
FNO = 3.75~3.9~4.1

| Radius of Curvature | Axial Distance | Refractive Index | Abbe Number |
|---|---|---|---|
| r1 = 13.020 | d1 = 0.750 | N1 = 1.84666 | ν1 = 23.82 |
| r2 = 7.963 | d2 = 0.269 | | |
| r3 = 8.178 | d3 = 3.014 | N2 = 1.77250 | ν2 = 49.77 |
| r4 = 155.044 | d4 = 0.600~3.950~6.618 | | |
| r5 = 806.822 | d5 = 0.550 | N3 = 1.77250 | ν3 = 49.77 |
| r6 = 5.025 | d6 = 1.349 | | |
| r7* = −20.229 | d7 = 0.600 | N4 = 1.77250 | ν4 = 49.77 |
| r8* = 6.666 | d8 = 0.105 | | |
| r9 = 7.156 | d9 = 1.260 | N5 = 1.84666 | ν5 = 23.82 |
| r10 = ∞ | d10 = 6.518~3.168~0.500 | | |
| r11 = ∞ (Aperture Stop S) | d11 = 0.500 | | |
| r12* = 3.179 | d12 = 1.428 | N6 = 1.77250 | ν6 = 49.77 |
| r13 = 10.090 | d13 = 0.519 | N7 = 1.84666 | ν7 = 23.82 |
| r14* = 3.914 | d14 = 3.328~2.360~1.783 | | |
| r15* = 6.243 | d15 = 3.000 | N8 = 1.51728 | ν= 69.43 |
| r16* = −5.478 | d16 = 0.100 | | |
| r17 = −12.214 | d17 = 0.600 | N9 = 1.70146 | ν9 = 27.28 |
| r18 = 715.610 | d18 = 0.600~1.568~2.145 | | |
| r19 = ∞ | d19 = 3.400 | N10 = 1.51680 | ν10 = 64.20 |
| r20 = ∞ | | | |

[Aspherical Data of Seventh Surface (r7)]

ε = 1.0000
A4 = −0.93462 × $10^{-3}$
A6 = 0.16333 × $10^{-3}$
A8 = −0.62263 × $10^{-5}$
[Aspherical Data of Eighth Surface (r8)]

ε = 1.0000
A4 = −0.15378 × $10^{-2}$
A6 = 0.15463 × $10^{-3}$
A8 = −0.57430 × $10^{-5}$

TABLE 6-continued

Construction Data of Example 6 f = 5.3~9.2~15.3
FNO = 3.75~3.9~4.1

[Aspherical Data of Twelfth Surface (r12)]

ε = 1.0000
A4 = −0.36978 × $10^{-3}$
A6 = −0.50889 × $10^{-3}$
A8 = 0.31290 × $10^{-3}$
A10 = −0.55754 × $10^{-4}$
[Aspherical Data of Fourteenth Surface (r14)]

ε = 1.0000
A4 = 0.37389 × $10^{-2}$
A6 = −0.10426 × $10^{-3}$
A8 = 0.55997 × $10^{-3}$
A10 = −0.81568 × $10^{-4}$
[Aspherical Data of Fifteenth Surface (r15)]

ε = 1.0000
A4 = −0.27883 × $10^{-2}$
A6 = −0.13786 × $10^{-3}$
A8 = −0.30248 × $10^{-4}$
A10 = 0.54205 × $10^{-5}$
A12 = −0.57990 × $10^{-6}$
[Aspherical Data of Sixteenth Surface (r16)]

ε = 1.0000
A4 = 0.81443 × $10^{-3}$
A6 = −0.14194 × $10^{-3}$
A8 = −0.80358 × $10^{-5}$
[Values of Condition (12) on Seventh Surface (r7)]

y = 0.00 ymax . . . $(|x| - |x0|)/\{C0(N' - N) \cdot f2\}$ = 0.00000
y = 0.10 ymax . . . $(|x| - |x0|)/\{C0(N' - N) \cdot f2\}$ = 0.00003
y = 0.20 ymax . . . $(|x| - |x0|)/\{C0(N' - N) \cdot f2\}$ = 0.00050
y = 0.30 ymax . . . $(|x| - |x0|)/\{C0(N' - N) \cdot f2\}$ = 0.00234
y = 0.40 ymax . . . $(|x| - |x0|)/\{C0(N' - N) \cdot f2\}$ = 0.00659
y = 0.50 ymax . . . $(|x| - |x0|)/\{C0(N' - N) \cdot f2\}$ = 0.01371
y = 0.60 ymax . . . $(|x| - |x0|)/\{C0(N' - N) \cdot f2\}$ = 0.02284
y = 0.70 ymax . . . $(|x| - |x0|)/\{C0(N' - N) \cdot f2\}$ = 0.03126
y = 0.80 ymax . . . $(|x| - |x0|)/\{C0(N' - N) \cdot f2\}$ = 0.03425
y = 0.90 ymax . . . $(|x| - |x0|)/\{C0(N' - N) \cdot f2\}$ = 0.02580
y = 1.00 ymax . . . $(|x| - |x0|)/\{C0(N' - N) \cdot f2\}$ = 0.00051
[Values of Condition (12) on Eighth Surface (r8)]

y = 0.00 ymax . . . $(|x| - |x0|)/\{C0(N' - N) \cdot f2\}$ = 0.00000
y = 0.10 ymax . . . $(|x| - |x0|)/\{C0(N' - N) \cdot f2\}$ = −0.00001
y = 0.20 ymax . . . $(|x| - |x0|)/\{C0(N' - N) \cdot f2\}$ = −0.00021
y = 0.30 ymax . . . $(|x| - |x0|)/\{C0(N' - N) \cdot f2\}$ = −0.00102
y = 0.40 ymax . . . $(|x| - |x0|)/\{C0(N' - N) \cdot f2\}$ = −0.00307
y = 0.50 ymax . . . $(|x| - |x0|)/\{C0(N' - N) \cdot f2\}$ = −0.00699
y = 0.60 ymax . . . $(|x| - |x0|)/\{C0(N' - N) \cdot f2\}$ = −0.01333
y = 0.70 ymax . . . $(|x| - |x0|)/\{C0(N' - N) \cdot f2\}$ = −0.02231
y = 0.80 ymax . . . $(|x| - |x0|)/\{C0(N' - N) \cdot f2\}$ = −0.03384
y = 0.90 ymax . . . $(|x| - |x0|)/\{C0(N' - N) \cdot f2\}$ = −0.04750
y = 1.00 ymax . . . $(|x| - |x0|)/\{C0(N' - N) \cdot f2\}$ = −0.06281
[Values of Condition (13) on Fifteenth Surface (r15)]

y = 0.00 ymax . . . $(|x| - |x0|)/\{C0(N' - N) \cdot f4\}$ = 0.00000
y = 0.10 ymax . . . $(|x| - |x0|)/\{C0(N' - N) \cdot f4\}$ = −0.00001
y = 0.20 ymax . . . $(|x| - |x0|)/\{C0(N' - N) \cdot f4\}$ = −0.00019
y = 0.30 ymax . . . $(|x| - |x0|)/\{C0(N' - N) \cdot f4\}$ = −0.00097
y = 0.40 ymax . . . $(|x| - |x0|)/\{C0(N' - N) \cdot f4\}$ = −0.00315
y = 0.50 ymax . . . $(|x| - |x0|)/\{C0(N' - N) \cdot f4\}$ = −0.00793
y = 0.60 ymax . . . $(|x| - |x0|)/\{C0(N' - N) \cdot f4\}$ = −0.01712
y = 0.70 ymax . . . $(|x| - |x0|)/\{C0(N' - N) \cdot f4\}$ = −0.03330
y = 0.80 ymax . . . $(|x| - |x0|)/\{C0(N' - N) \cdot f4\}$ = −0.06021
y = 0.90 ymax . . . $(|x| - |x0|)/\{C0(N' - N) \cdot f4\}$ = −0.10340
y = 1.00 ymax . . . $(|x| - |x0|)/\{C0(N' - N) \cdot f4\}$ = −0.17192
[Values of Condition (13) on Sixteenth Surface (r16)]

y = 0.00 ymax . . . $(|x| - |x0|)/\{C0(N' - N) \cdot f4\}$ = 0.00000
y = 0.10 ymax . . . $(|x| - |x0|)/\{C0(N' - N) \cdot f4\}$ = −0.00001
y = 0.20 ymax . . . $(|x| - |x0|)/\{C0(N' - N) \cdot f4\}$ = −0.00009
y = 0.30 ymax . . . $(|x| - |x0|)/\{C0(N' - N) \cdot f4\}$ = −0.00043
y = 0.40 ymax . . . $(|x| - |x0|)/\{C0(N' - N) \cdot f4\}$ = −0.00118

TABLE 6-continued

Construction Data of Example 6

$$f = 5.3 \sim 9.2 \sim 15.3$$
$$FNO = 3.75 \sim 3.9 \sim 4.1$$

y = 0.50 ymax . . . (|x| − |x0|)/{C0(N' − N) · f4} = −0.00234
y = 0.60 ymax . . . (|x| − |x0|)/{C0(N' − N) · f4} = −0.00336
Y = 0.70 ymax . . . (|x| − |x0|)/{C0(N' − N) · f4} = −0.00268
y = 0.80 ymax . . . (|x| − |x0|)/{C0(N' − N) · f4} = 0.00304
y = 0.90 ymax . . . (|x| − |x0|)/{C0(N' − N) · f4} = 0.02000
y = 1.00 ymax . . . (|x| − |x0|)/{C0(N' − N) · f4} = 0.05877

TABLE 7

Construction Data of Example 7

$$f = 5.1 \sim 12.0 \sim 29.5$$
$$FNO = 2.1 \sim 2.44 \sim 2.88$$

| Radius of Curvature | Axial Distance | Refractive Index | Abbe Number |
|---|---|---|---|
| r1 = 58.305 | d1 = 0.800 | N1 = 1.84666 | ν1 = 23.82 |
| r2 = 23.626 | d2 = 3.907 | N2 = 1.70986 | ν2 = 53.21 |
| r3 = −111.097 | d3 = 0.100 | | |
| r4 = 16.699 | d4 = 1.803 | N3 = 1.71897 | ν3 = 52.85 |
| r5 = 26.234 | d5 = 0.500~7.841~13.405 | | |
| r6 = 23.840 | d6 = 0.650 | N4 = 1.77250 | ν4 = 49.77 |
| r7 = 6.746 | d7 = 4.365 | | |
| r8* = −7.561 | d8 = 0.700 | N5 = 1.77250 | ν5 = 49.77 |
| r9 = 13.086 | d9 = 1.508 | N6 = 1.84666 | ν6 = 23.82 |
| r10* = −23.505 | d10 = 13.405~6.064~0.500 | | |
| r11 = ∞ (Aperture Stop S) | d11 = 0.500 | | |
| r12* = 14.624 | d12 = 1.699 | N7 = 1.75450 | ν7 = 51.57 |
| r13 = −33.093 | d13 = 0.600 | N8 = 1.84666 | ν8 = 23.82 |
| r14* = 63.509 | d14 = 4.485~2.327~0.200 | | |
| r15 = 6.186 | d15 = 4.237 | N9 = 1.67350 | ν9 = 48.38 |
| r16 = −20.662 | d16 = 0.116 | | |
| r17* = −55.968 | d17 = 1.000 | N10 = 1.84666 | ν10 = 23.82 |
| r18* = 8.991 | d18 = 1.261 | | |
| r19 = 11.736 | d19 = 1.326 | N11 = 1.48749 | ν11 = 70.44 |
| r20 = 46.541 | d20 = 1.669~3.827~5.954 | | |
| r21 = ∞ | d21 = 3.400 | N12 = 1.51680 | ν12 = 64.20 |
| r22 = ∞ | | | |

[Aspherical Data of Eighth Surface (r8)]

ε = 1.0000
A4 = 0.66406 × 10⁻³
A6 = −0.22116 × 10⁻⁴
A8 = 0.63051 × 10⁻⁶

[Aspherical Data of Tenth Surface (r10)]

ε = 1.0000
A4 = 0.30803 × 10⁻³
A6 = −0.87997 × 10⁻⁵
A8 = −0.19583 × 10⁻⁶
A10 = 0.19600 × 10⁻⁷

[Aspherical Data of Twelfth Surface (r12)]

ε = 1.0000
A4 = −0.16926 × 10⁻³
A6 = 0.12252 × 10⁻⁴
A8 = −0.13532 × 10⁻⁵
A10 = 0.46314 × 10⁻⁷

[Aspherical Data of Fourteenth Surface (r14)]

ε = 1.0000
A4 = −0.11449 × 10⁻³
A6 = 0.11354 × 10⁻⁴
A8 = −0.11571 × 10⁻⁵
A10 = 0.37393 × 10⁻⁷

TABLE 7-continued

Construction Data of Example 7

$$f = 5.1 \sim 12.0 \sim 29.5$$
$$FNO = 2.1 \sim 2.44 \sim 2.88$$

[Aspherical Data of Seventeenth Surface (r17)]

ε = 1.0000
A4 = 0.43509 × 10⁻³
A6 = −0.43010 × 10⁻⁴
A8 = 0.22007 × 10⁻⁶

[Aspherical Data of Eighteenth Surface (r18)]

ε = 1.0000
A4 = 0.21202 × 10⁻²
A6 = −0.64354 × 10⁻⁶
A8 = 0.31309 × 10⁻⁵

[Values of Condition (12) on Eighth Surface (r8)]

y = 0.00 ymax . . . (|x| − |x0|)/{C0(N' − N) · f2} = 0.00000
y = 0.10 ymax . . . (|x| − |x0|)/{C0(N' − N) · f2} = −0.00002
y = 0.20 ymax . . . (|x| − |x0|)/{C0(N' − N) · f2} = −0.00029
y = 0.30 ymax . . . (|x| − |x0|)/{C0(N' − N) · f2} = −0.00144
y = 0.40 ymax . . . (|x| − |x0|)/{C0(N' − N) · f2} = −0.00442
y = 0.50 ymax . . . (|x| − |x0|)/{C0(N' − N) · f2} = −0.01039
y = 0.60 ymax . . . (|x| − |x0|)/{C0(N' − N) · f2} = −0.02062
y = 0.70 ymax . . . (|x| − |x0|)/{C0(N' − N) · f2} = −0.03644
y = 0.80 ymax . . . (|x| − |x0|)/{C0(N' − N) · f2} = −0.05926
y = 0.90 ymax . . . (|x| − |x0|)/{C0(N' − N) · f2} = −0.09084
y = 1.00 ymax . . . (|x| − |x0|)/{C0(N' − N) · f2} = −0.13375

[Values of Condition (12) on Tenth Surface (r10)]

y = 0.00 ymax . . . (|x| − |x0|)/{C0(N' − N) · f2} = −0.00000
y = 0.10 ymax . . . (|x| − |x0|)/{C0(N' − N) · f2} = 0.00002
y = 0.20 ymax . . . (|x| − |x0|)/{C0(N' − N) · f2} = 0.00031
y = 0.30 ymax . . . (|x| − |x0|)/{C0(N' − N) · f2} = 0.00153
y = 0.40 ymax . . . (|x| − |x0|)/{C0(N' − N) · f2} = 0.00471
y = 0.50 ymax . . . (|x| − |x0|)/{C0(N' − N) · f2} = 0.01108
y = 0.60 ymax . . . (|x| − |x0|)/{C0(N' − N) · f2} = 0.02193
y = 0.70 ymax . . . (|x| − |x0|)/{C0(N' − N) · f2} = 0.03839
y = 0.80 ymax . . . (|x| − |x0|)/{C0(N' − N) · f2} = 0.06136
y = 0.90 ymax . . . (|x| − |x0|)/{C0(N' − N) · f2} = 0.09168
y = 1.00 ymax . . . (|x| − |x0|)/{C0(N' − N) · f2} = 0.13106

[Values of Condition (13) on Seventeenth Surface (r17)]

y = 0.00 ymax . . . (|x| − |x0|)/{C0(N' − N) · f4} = −0.00000
y = 0.10 ymax . . . (|x| − |x0|)/{C0(N' − N) · f4} = 0.00003
y = 0.20 ymax . . . (|x| − |x0|)/{C0(N' − N) · f4} = 0.00047
y = 0.30 ymax . . . (|x| − |x0|)/{C0(N' − N) · f4} = 0.00226
y = 0.40 ymax . . . (|x| − |x0|)/{C0(N' − N) · f4} = 0.00650
y = 0.50 ymax . . . (|x| − |x0|)/{C0(N' − N) · f4} = 0.01390
y = 0.60 ymax . . . (|x| − |x0|)/{C0(N' − N) · f4} = 0.02392
y = 0.70 ymax . . . (|x| − |x0|)/{C0(N' − N) · f4} = 0.03372
y = 0.80 ymax . . . (|x| − |x0|)/{C0(N' − N) · f4} = 0.03703
y = 0.90 ymax . . . (|x| − |x0|)/{C0(N' − N) · f4} = 0.02289
y = 1.00 ymax . . . (|x| − |x0|)/{C0(N' − N) · f4} = −0.02571

[Values of Condition (13) on Eighteenth Surface (r18)]

y = 0.00 ymax . . . (|x| − |x0|)/{C0(N' − N) · f4} = −0.00000
y = 0.10 ymax . . . (|x| − |x0|)/{C0(N' − N) · f4} = −0.00002
y = 0.20 ymax . . . (|x| − |x0|)/{C0(N' − N) · f4} = −0.00024
y = 0.30 ymax . . . (|x| − |x0|)/{C0(N' − N) · f4} = −0.00123
y = 0.40 ymax . . . (|x| − |x0|)/{C0(N' − N) · f4} = −0.00391
y = 0.50 ymax . . . (|x| − |x0|)/{C0(N' − N) · f4} = −0.00959
y = 0.60 ymax . . . (|x| − |x0|)/{C0(N' − N) · f4} = −0.02004
y = 0.70 ymax . . . (|x| − |x0|)/{C0(N' − N) · f4} = −0.03762
y = 0.80 ymax . . . (|x| − |x0|)/{C0(N' − N) · f4} = −0.06549
y = 0.90 ymax . . . (|x| − |x0|)/{C0(N' − N) · f4} = −0.10794
y = 1.00 ymax . . . (|x| − |x0|)/{C0(N' − N) · f4} = −0.17102

TABLE 8

Construction Data of Example 8 f = 5.1~16.0~48.7
FNO = 2.8~3.60~4.10

| Radius of Curvature | Axial Distance | Refractive Index | Abbe Number |
|---|---|---|---|
| r1 = 33.531 | d1 = 0.800 | N1 = 1.84666 | ν1 = 23.82 |
| r2 = 24.327 | d2 = 2.746 | N2 = 1.49310 | ν2 = 83.58 |
| r3 = −368.533 | d3 = 0.100 | | |
| r4 = 22.561 | d4 = 1.895 | N3 = 1.48749 | ν3 = 70.44 |
| r5 = 55.959 | d5 = 0.500~13.189~22.883 | | |
| r6* = 58.967 | d6 = 0.700 | N4 = 1.77250 | ν4 = 49.77 |
| r7* = 7.392 | d7 = 4.083 | | |
| r8 = −8.182 | d8 = 0.600 | N5 = 1.77250 | ν5 = 49.77 |
| r9 = 10.789 | d9 = 1.180 | N6 = 1.84666 | ν6 = 23.82 |
| r10 = −29.369 | d10 = 12.294~5.109~0.500 | | |
| r11 = ∞ (Aperture Stop S) | d11 = 0.500 | | |
| r12* = 5.894 | d12 = 1.873 | N7 = 1.60647 | ν7 = 58.56 |
| r13* = −291.584 | d13 = 0.100 | | |
| r14 = 9.110 | d14 = 0.500 | N8 = 1.84666 | ν8 = 23.82 |
| r15 = 5.333 | d15 = 5.668~1.785~0.200 | | |
| r16 = 5.057 | d16 = 2.915 | N9 = 1.48749 | ν9 = 70.44 |
| r17 = −20.386 | d17 = 0.100 | | |
| r18* = 7.187 | d18 = 0.720 | N10 = 1.84722 | ν10 = 40.27 |
| r19* = 3.624 | d19 = 0.500 | | |
| r20 = 4.906 | d20 = 2.360 | N11 = 1.48749 | ν11 = 70.44 |
| r21 = 6.236 | d21 = 1.164~5.047~6.632 | | |
| r22 = ∞ | d22 = 3.400 | N12 = 1.51680 | ν12 = 64.20 |
| r23 = ∞ | | | |

[Aspherical Data of Sixth Surface (r6)]

ε = 1.0000
A4 = 0.24880 × 10$^{-3}$
A6 = 0.69912 × 10$^{-5}$
A8 = −0.12045 × 10$^{-6}$

[Aspherical Data of Seventh Surface (r7)]

ε = 1.0000
A4 = 0.19486 × 10$^{-3}$
A6 = 0.16546 × 10$^{-4}$
A8 = 0.68213 × 10$^{-6}$

[Aspherical Data of Twelfth Surface (r12)]

ε = 1.0000
A4 = −0.63905 × 10$^{-3}$
A6 = −0.20691 × 10$^{-4}$
A8 = 0.38158 × 10$^{-7}$
A10 = −0.16639 × 10$^{-6}$

[Aspherical Data of Thirteenth Surface (r13)]

ε = 1.0000
A4 = −0.28812 × 10$^{-3}$
A6 = −0.69833 × 10$^{-5}$
A8 = −0.13085 × 10$^{-5}$
A10 = −0.95789 × 10$^{-7}$

[Aspherical Data of Eighteenth Surface (r18)]

ε = 1.0000
A4 = −0.47322 × 10$^{-2}$
A6 = 0.17987 × 10$^{-3}$
A8 = −0.10821 × 10$^{-4}$
A10 = 0.28645 × 10$^{-6}$

[Aspherical Data of Nineteenth Surface (r19)]

ε = 1.0000
A4 = −0.53795 × 10$^{-2}$
A6 = 0.20587 × 10$^{-3}$
A8 = −0.14591 × 10$^{-4}$

[Values of Condition (17) on Sixth Surface (r6)]

y = 0.00 ymax . . . (x − x0)/(N' − N) = 0.00000
y = 0.25 ymax . . . (x − x0)/(N' − N) = 0.00106

TABLE 8-continued

Construction Data of Example 8 f = 5.1~16.0~48.7
FNO = 2.8~3.60~4.10 y = 0.50 ymax . . . (x − x0)/(N' − N) = 0.01900
y = 0.75 ymax . . . (x − x0)/(N' − N) = 0.10847
y = 1.00 ymax . . . (x − x0)/(N' − N) = 0.36418

[Values of Condition (17) on Seventh Surface (r7)]

y = 0.00 ymax . . . (x − x0)/(N' − N) = −0.00000
y = 0.25 ymax . . . (x − x0)/(N' − N) = −0.00032
y = 0.50 ymax . . . (x − x0)/(N' − N) = −0.00661
y = 0.75 ymax . . . (x − x0)/(N' − N) = −0.05024
y = 1.00 ymax . . . (x − x0)/(N' − N) = −0.25799

[Values of Condition (18) on Twelfth Surface (r12)]

y = 0.00 ymax . . . (x − x0)/(N' − N) = 0.00000
y = 0.25 ymax . . . (x − x0)/(N' − N) = −0.00025
y = 0.50 ymax . . . (x − x0)/(N' − N) = −0.00414
y = 0.75 ymax . . . (x − x0)/(N' − N) = −0.02287
y = 1.00 ymax . . . (x − x0)/(N' − N) = −0.08500

[Values of Condition (18) on Thirteenth Surface (r13)]

y = 0.00 ymax . . . (x − x0)/(N' − N) = −0.00000
y = 0.25 ymax . . . (x − x0)/(N' − N) = 0.00011
y = 0.50 ymax . . . (x − x0)/(N' − N) = 0.00179
y = 0.75 ymax . . . (x − x0)/(N' − N) = 0.01032
y = 1.00 ymax . . . (x − x0)/(N' − N) = 0.04267

[Values of Condition (19) on Eighteenth Surface (r18)]

y = 0.00 ymax . . . (x − x0)/(N' − N) = 0.00000
y = 0.25 ymax . . . (x − x0)/(N' − N) = −0.00222
y = 0.50 ymax . . . (x − x0)/(N' − N) = −0.03335
y = 0.75 ymax . . . (x − x0)/(N' − N) = −0.15571
y = 1.00 ymax . . . (x − x0)/(N' − N) = −0.45732

[Values of Condition (19) on Nineteenth Surface (r19)]

y = 0.00 ymax . . . (x − x0)/(N' − N) = −0.00000
y = 0.25 ymax . . . (x − x0)/(N' − N) = 0.00157
y = 0.50 ymax . . . (x − x0)/(N' − N) = 0.02395
y = 0.75 ymax . . . (x − x0)/(N' − N) = 0.11457
y = 1.00 ymax . . . (x − x0)/(N' − N) = 0.35603

TABLE 9

Construction Data of Example 9 f = 5.1~16.0~48.7
FNO = 2.82~3.63~4.10

| Radius of Curvature | Axial Distance | Refractive Index | Abbe Number |
|---|---|---|---|
| r1 = 33.825 | d1 = 0.800 | N1 = 1.84666 | ν1 = 23.82 |
| r2 = 24.649 | d2 = 2.772 | N2 = 1.49310 | ν2 = 83.58 |
| r3 = −463.265 | d3 = 0.100 | | |
| r4 = 22.909 | d4 = 1.910 | N3 = 1.48749 | ν3 = 70.44 |
| r5 = 55.909 | d5 = 0.500~13.310~23.516 | | |
| r6* = 69.207 | d6 = 0.700 | N4 = 1.77250 | ν4 = 49.77 |
| r7* = 8.157 | d7 = 3.891 | | |
| r8 = −7.863 | d8 = 0.600 | N5 = 1.77250 | ν5 = 49.77 |
| r9 = 11.112 | d9 = 0.137 | | |
| r10 = 12.158 | d10 = 1.142 | N6 = 1.84666 | ν6 = 23.82 |
| r11 = −26.794 | d11 = 12.670~5.178~0.500 | | |
| r12 = ∞ (Aperture Stop S) | d12 = 0.500 | | |
| r13* = 5.800 | d13 = 1.862 | N7 = 1.59148 | ν7 = 59.60 |
| r14* = 796.451 | d14 = 0.100 | | |
| r15 = 8.439 | d15 = 0.500 | N8 = 1.84666 | ν8 = 23.82 |
| r16 = 5.171 | d16 = 5.590~1.650~0.200 | | |
| r17 = 5.002 | d17 = 2.912 | N9 = 1.48749 | ν9 = 70.44 |
| r18 = −19.633 | d18 = 0.100 | | |

TABLE 9-continued

Construction Data of Example 9 f = 5.1~16.0~48.7
FNO = 2.82~3.63~4.10

| | | | |
|---|---|---|---|
| r19* = 7.476 | d19 = 0.720 | N10 = 1.84963 | ν10 = 40.07 |
| r20* = 3.658 | d20 = 0.500 | | |
| r21 = 4.899 | d21 = 2.295 | N11 = 1.49659 | ν11 = 68.88 |
| r22 = 6.256 | d22 = 1.180~5.120~6.570 | | |
| r23 = ∞ | d23 = 3.400 | N12 = 1.51680 | ν12 = 64.20 |
| r24 = ∞ | | | |

[Aspherical Data of Sixth Surface (r6)]

$\epsilon$ = 1.0000
A4 = 0.34989 × $10^{-3}$
A6 = 0.29550 × $10^{-5}$
A8 = −0.39655 × $10^{-7}$

[Aspherical Data of Seventh Surface (r7)]

$\epsilon$ = 1.0000
A4 = 0.26226 × $10^{-3}$
A6 = 0.12936 × $10^{-4}$
A8 = 0.40863 × $10^{-6}$

[Aspherical Data of Thirteenth Surface (r13)]

$\epsilon$ = 1.0000
A4 = −0.64004 × $10^{-3}$
A6 = −0.20905 × $10^{-4}$
A8 = 0.14240 × $10^{-6}$
A10 = −0.17189 × $10^{-6}$

[Aspherical Data of Fourteenth Surface (r14)]

$\epsilon$ = 1.0000
A4 = −0.30103 × $10^{-3}$
A6 = −0.74213 × $10^{-5}$
A8 = −0.10894 × $10^{-5}$
A10 = −0.10624 × $10^{-6}$

[Aspherical Data of Nineteenth Surface (r19)]

$\epsilon$ = 1.0000
A4 = −0.47646 × $10^{-2}$
A6 = 0.18766 × $10^{-3}$
A8 = −0.10271 × $10^{-4}$
A10 = 0.22819 × $10^{-6}$

[Aspherical Data of Twentieth Surface (r20)]

$\epsilon$ = 1.0000
A4 = −0.53163 × $10^{-2}$
A6 = 0.22027 × $10^{-3}$
A8 = −0.13269 × $10^{-4}$

[Values of Condition (17) on Sixth Surface (r6)]

y = 0.00 ymax . . . (x − x0)/(N' − N) = 0.00000
y = 0.25 ymax . . . (x − x0)/(N' − N) = 0.00153
y = 0.50 ymax . . . (x − x0)/(N' − N) = 0.02548
y = 0.75 ymax . . . (x − x0)/(N' − N) = 0.13541
y = 1.00 ymax . . . (x − x0)/(N' − N) = 0.44412

[Values of Condition (17) on Seventh Surface (r7)]

y = 0.00 ymax . . . (x − x0)/(N' − N) = −0.00000
y = 0.25 ymax . . . (x − x0)/(N' − N) = −0.00047
y = 0.50 ymax . . . (x − x0)/(N' − N) = −0.00894
y = 0.75 ymax . . . (x − x0)/(N' − N) = −0.06020
y = 1.00 ymax . . . (x − x0)/(N' − N) = −0.27574

[Values of Condition (18) on Thirteenth Surface (r13)]

y = 0.00 ymax . . . (x − x0)/(N' − N) = 0.00000
y = 0.25 ymax . . . (x − x0)/(N' − N) = −0.00026
y = 0.50 ymax . . . (x − x0)/(N' − N) = −0.00432
y = 0.75 ymax . . . (x − x0)/(N' − N) = −0.02382
y = 1.00 ymax . . . (x − x0)/(N' − N) = −0.08851

[Values of Condition (18) on Fourteenth Surface (r14)]

y = 0.00 ymax . . . (x − x0)/(N' − N) = −0.00000
y = 0.25 ymax . . . (x − x0)/(N' − N) = 0.00011
y = 0.50 ymax . . . (x − x0)/(N' − N) = 0.00192
y = 0.75 ymax . . . (x − x0)/(N' − N) = 0.01094
y = 1.00 ymax . . . (x − x0)/(N' − N) = 0.04456

TABLE 9-continued

Construction Data of Example 9 f = 5.1~16.0~48.7
FNO = 2.82~3.63~4.10

[Values of Condition (19) on Nineteenth Surface (r19)]

y = 0.00 ymax . . . (x − x0)/(N' − N) = 0.00000
y = 0.25 ymax . . . (x − x0)/(N' − N) = −0.00224
y = 0.50 ymax . . . (x − x0)/(N' − N) = −0.03347
y = 0.75 ymax . . . (x − x0)/(N' − N) = −0.15514
y = 1.00 ymax . . . (x − x0)/(N' − N) = −0.45265

[Values of Condition (19) on Twentieth Surface (r20)]

y = 0.00 ymax . . . (x − x0)/(N' − N) = −0.00000
y = 0.25 ymax . . . (x − x0)/(N' − N) = 0.00156
y = 0.50 ymax . . . (x − x0)/(N' − N) = 0.02354
y = 0.75 ymax . . . (x − x0)/(N' − N) = 0.11104
y = 1.00 ymax . . . (x − x0)/(N' − N) = 0.33662

TABLE 10

Construction Data of Example 10 f = 5.1~16.0~48.9
FNO = 2.5~3.10~4.10

| Radius of Curvature | Axial Distance | Refractive Index | Abbe Number |
|---|---|---|---|
| r1 = 42.418 | d1 = 0.800 | N1 = 1.84823 | ν1 = 29.42 |
| r2 = 23.948 | d2 = 3.442 | N2 = 1.48749 | ν2 = 70.44 |
| r3 = −157.257 | d3 = 0.100 | | |
| r4 = 19.745 | d4 = 2.460 | N3 = 1.49310 | ν3 = 83.58 |
| r5 = 71.793 | d5 = 0.500~13.232~20.307 | | |
| r6 = 25.259 | d6 = 0.650 | N4 = 1.77250 | ν4 = 49.77 |
| r7 = 6.903 | d7 = 3.256 | | |
| r8* = −8.565 | d8 = 0.700 | N5 = 1.77250 | ν5 = 49.77 |
| r9 = 7.817 | d9 = 1.712 | N6 = 1.84666 | ν6 = 23.82 |
| r10* = −51.478 | d10 = 12.722~5.490~0.500 | | |
| r11 = ∞ (Aperture Stop S) | d11 = 0.500 | | |
| r12* = 8.881 | d12 = 1.710 | N7 = 1.75106 | ν7 = 51.69 |
| r13 = −447.355 | d13 = 0.600 | N8 = 1.84666 | ν8 = 23.82 |
| r14* = 15.336 | d14 = 6.807~3.687~0.200 | | |
| r15 = 6.974 | d15 = 2.615 | N9 = 1.48749 | ν9 = 70.44 |
| r16 = 74.803 | d16 = 0.100 | | |
| r17 = 7.833 | d17 = 3.107 | N10 = 1.48749 | ν10 = 70.44 |
| r18 = −16.439 | d18 = 0.125 | | |
| r19* = −89.359 | d19 = 2.269 | N11 = 1.84951 | ν11 = 38.38 |
| r20* = 8.210 | d20 = 1.000~4.120~7.607 | | |
| r21 = ∞ | d21 = 3.400 | N12 = 1.51680 | ν12 = 64.20 |
| r22 = ∞ | | | |

[Aspherical Data of Eighth Surface (r8)]

$\epsilon$ = 1.0000
A4 = 0.70923 × $10^{-3}$
A6 = −0.16701 × $10^{-4}$
A8 = 0.44246 × $10^{-6}$

[Aspherical Data of Tenth Surface (r10)]

$\epsilon$ = 1.0000
A4 = 0.42937 × $10^{-3}$
A6 = −0.62961 × $10^{-5}$
A8 = −0.22968 × $10^{-6}$
A10 = 0.19206 × $10^{-7}$

[Aspherical Data of Twelfth Surface (r12)]

$\epsilon$ = 1.0000
A4 = −0.22084 × $10^{-3}$
A6 = 0.24082 × $10^{-4}$
A8 = −0.30206 × $10^{-5}$

TABLE 10-continued

Construction Data of Example 10 f = 5.1~16.0~48.9
FNO = 2.5~3.10~4.10

A10 = 0.14784 × 10$^{-6}$
[Aspherical Data of Fourteenth Surface (r14)]

ε = 1.0000
A4 = −0.67988 × 10$^{-4}$
A6 = 0.23632 × 10$^{-4}$
A8 = −0.28969 × 10$^{-5}$
A10 = 0.14902 × 10$^{-6}$
[Aspherical Data of Nineteenth Surface (r19)]

ε = 1.0000
A4 = −0.13544 × 10$^{-2}$
A6 = 0.13398 × 10$^{-4}$
A8 = −0.21612 × 10$^{-6}$
[Aspherical Data of Twentieth Surface (r20)]

ε = 1.0000
A4 = −0.58348 × 10$^{-4}$
A6 = 0.59161 × 10$^{-4}$
A8 = −0.48072 × 10$^{-6}$
[Values of Condition (17) on Eighth Surface (r8)]

y = 0.00 ymax . . . (x − x0)/(N' − N) = 0.00000
y = 0.25 ymax . . . (x − x0)/(N' − N) = 0.00077
y = 0.50 ymax . . . (x − x0)/(N' − N) = 0.01161
y = 0.75 ymax . . . (x − x0)/(N' − N) = 0.05406
y = 1.00 ymax . . . (x − x0)/(N' − N) = 0.15895
[Values of Condition (17) on Tenth Surface (r10)]

y = 0.00 ymax . . . (x − x0)/(N' − N) = −0.00000
y = 0.25 ymax . . . (x − x0)/(N' − N) = −0.00028
y = 0.50 ymax . . . (x − x0)/(N' − N) = −0.00428
y = 0.75 ymax . . . (x − x0)/(N' − N) = −0.02026
y = 1.00 ymax . . . (x − x0)/(N' − N) = −0.05928
[Values of Condition (18) on Twelfth Surface (r12)]

y = 0.00 ymax . . . (x − x0)/(N' − N) = 0.00000
y = 0.25 ymax . . . (x − x0)/(N' − N) = −0.00009
y = 0.50 ymax . . . (x − x0)/(N' − N) = −0.00120
y = 0.75 ymax . . . (x − x0)/(N' − N) = −0.00531
y = 1.00 ymax . . . (x − x0)/(N' − N) = −0.01508
[Values of Condition (18) on Fourteenth Surface (r14)]

y = 0.00 ymax . . . (x − x0)/(N' − N) = −0.00000
y = 0.25 ymax . . . (x − x0)/(N' − N) = 0.00002
y = 0.50 ymax . . . (x − x0)/(N' − N) = 0.00017
y = 0.75 ymax . . . (x − x0)/(N' − N) = 0.00010
y = 1.00 ymax . . . (x − x0)/(N' − N) = −0.00179
[Values of Condition (19) on Nineteenth Surface (r19)]

y = 0.00 ymax . . . (x − x0)/(N' − N) = 0.00000
y = 0.25 ymax . . . (x − x0)/(N' − N) = −0.00101
y = 0.50 ymax . . . (x − x0)/(N' − N) = −0.01579
y = 0.75 ymax . . . (x − x0)/(N' − N) = −0.07723
y = 1.00 ymax . . . (x − x0)/(N' − N) = −0.23431
[Values of Condition (19) on Twentieth Surface (r20)]

y = 0.00 ymax . . . (x − x0)/(N' − N) = −0.00000
y = 0.25 ymax . . . (x − x0)/(N' − N) = 0.00001
y = 0.50 ymax . . . (x − x0)/(N' − N) = −0.00042
y = 0.75 ymax . . . (x − x0)/(N' − N) = −0.00673
y = 1.00 ymax . . . (x − x0)/(N' − N) = −0.04052

TABLE 11

Construction Data of Example 11 f = 5.1~16.0~48.7
FNO = 2.9~3.74~4.10

| Radius of Curvature | Axial Distance | Refractive Index | Abbe Number |
|---|---|---|---|
| r1 = 34.217 | d1 = 0.800 | N1 = 1.84666 | ν1 = 23.82 |
| r2 = 24.902 | d2 = 2.968 | N2 = 1.49310 | ν2 = 83.58 |
| r3 = −395.465 | d3 = 0.100 | | |
| r4 = 23.286 | d4 = 2.048 | N3 = 1.48749 | ν3 = 70.44 |
| r5 = 58.161 | d5 = 0.500~12.971~23.475 | | |
| r6* = 83.573 | d6 = 0.700 | N4 = 1.77250 | ν4 = 49.77 |
| r7* = 9.371 | d7 = 3.909 | | |
| r8 = −7.275 | d8 = 0.600 | N5 = 1.77250 | ν5 = 49.77 |
| r9 = 9.509 | d9 = 0.165 | | |
| r10 = 10.889 | d10 = 1.166 | N6 = 1.84666 | ν6 = 23.82 |
| r11 = −29.625 | d11 = 12.284~4.883~0.500 | | |
| r12 = ∞ (Aperture Stop S) | d12 = 0.500 | | |
| r13* = 5.757 | d13 = 1.862 | N7 = 1.59897 | ν7 = 59.07 |
| r14* = 997.208 | d14 = 0.100 | | |
| r15 = 8.468 | d15 = 0.500 | N8 = 1.84666 | ν8 = 23.82 |
| r16 = 5.153 | d16 = 5.529~1.347~0.200 | | |
| r17 = 5.837 | d17 = 1.923 | N9 = 1.48749 | ν9 = 70.44 |
| r18 = 36.246 | d18 = 0.100 | | |
| r19 = 5.995 | d19 = 0.720 | N10 = 1.84778 | ν10 = 27.58 |
| r20 = 4.073 | d20 = 0.500 | | |
| r21* = 4.261 | d21 = 2.463 | N11 = 1.49926 | ν11 = 62.44 |
| r22* = 6.138 | d22 = 1.832~6.013~7.161 | | |
| r23 = ∞ | d23 = 3.400 | N12 = 1.51680 | ν12 = 64.20 |
| r24 = ∞ | | | |

[Aspherical Data of Sixth Surface (r6)]

ε = 1.0000
A4 = 0.41216 × 10$^{-3}$
A6 = −0.32215 × 10$^{-5}$
A8 = 0.90023 × 10$^{-7}$
[Aspherical Data of Seventh Surface (r7)]

ε = 1.0000
A4 = 0.27744 × 10$^{-3}$
A6 = 0.24211 × 10$^{-5}$
A8 = 0.16608 × 10$^{-6}$
[Aspherical Data of Thirteenth Surface (r13)]

ε = 1.0000
A4 = −0.66034 × 10$^{-3}$
A6 = −0.21659 × 10$^{-4}$
A8 = 0.53081 × 10$^{-6}$
A10 = −0.18714 × 10$^{-6}$
[Aspherical Data of Fourteenth Surface (r14)]

ε = 1.0000
A4 = −0.29541 × 10$^{-3}$
A6 = −0.59954 × 10$^{-5}$
A8 = −0.12127 × 10$^{-5}$
A10 = −0.77251 × 10$^{-7}$
[Aspherical Data of Twenty-first Surface (r21)]

ε = 1.0000
A4 = −0.32651 × 10$^{-3}$
A6 = −0.22504 × 10$^{-4}$
A8 = −0.20624 × 10$^{-5}$
A10 = −0.44963 × 10$^{-6}$
[Aspherical Data of Twenty-second Surface (r22)]

ε = 1.0000
A4 = 0.18461 × 10$^{-2}$
A6 = 0.55914 × 10$^{-4}$
A8 = −0.13108 × 10$^{-4}$
A10 = −0.89500 × 10$^{-7}$
[Values of Condition (23) on Sixth Surface (r6)]

y = 0.00 ymax . . . (x − x0)/(N' − N) = 0.00000

TABLE 11-continued

Construction Data of Example 11 f = 5.1~16.0~48.7
FNO = 2.9~3.74~4.10 y = 0.25 ymax ... (x − x0)/(N' − N) = 0.00234
y = 0.50 ymax ... (x − x0)/(N' − N) = 0.03604
y = 0.75 ymax ... (x − x0)/(N' − N) = 0.17875
y = 1.00 ymax ... (x − x0)/(N' − N) = 0.59806
[Values of Condition (23) on Seventh Surface (r7)]

y = 0.00 ymax ... (x − x0)/(N' − N) = −0.00000
y = 0.25 ymax ... (x − x0)/(N' − N) = −0.00066
y = 0.50 ymax ... (x − x0)/(N' − N) = −0.01114
y = 0.75 ymax ... (x − x0)/(N' − N) = −0.06327
y = 1.00 ymax ... (x − x0)/(N' − N) = −0.24571
[Values of Condition (24) on Thirteenth Surface (r13)]

y = 0.00 ymax ... (x − x0)/(N' − N) = 0.00000
y = 0.25 ymax ... (x − x0)/(N' − N) = −0.00024
y = 0.50 ymax ... (x − x0)/(N' − N) = −0.00405
y = 0.75 ymax ... (x − x0)/(N' − N) = −0.02215
y = 1.00 ymax ... (x − x0)/(N' − N) = −0.08057
[Values of Condition (24) on Fourteenth Surface (r14)]

y = 0.00 ymax ... (x − x0)/(N' − N) = −0.00000
y = 0.25 ymax ... (x − x0)/(N' − N) = 0.00011
Y = 0.50 ymax ... (x − x0)/(N' − N) = 0.00178
y = 0.75 ymax ... (x − x0)/(N' − N) = 0.01005
y = 1.00 ymax ... (x − x0)/(N' − N) = 0.04005
[Values of Condition (25) on Twenty-first Surface (r21)]

y = 0.00 ymax ... (x − x0)/(N' − N) = 0.00000
y = 0.25 ymax ... (x − x0)/(N' − N) = −0.00024
y = 0.50 ymax ... (x − x0)/(N' − N) = −0.00447
y = 0.75 ymax ... (x − x0)/(N' − N) = −0.03262
y = 1.00 ymax ... (x − x0)/(N' − N) = −0.19925
[Values of Condition (25) on Twenty-second Surface (r22)]

y = 0.00 ymax ... (x − x0)/(N' − N) = −0.00000
y = 0.25 ymax ... (x − x0)/(N' − N) = −0.00084
y = 0.50 ymax ... (x − x0)/(N' − N) = −0.01370
y = 0.75 ymax ... (x − x0)/(N' − N) = −0.06700
y = 1.00 ymax ... (x − x0)/(N' − N) = −0.17012

TABLE 12

Construction Data of Example 12 f = 5.1~16.0~48.7
FNO = 2.81~3.62~4.10

| Radius of Curvature | Axial Distance | Refractive Index | Abbe Number |
|---|---|---|---|
| r1 = 33.573 | d1 = 0.800 | N1 = 1.84666 | ν1 = 23.82 |
| r2 = 24.414 | d2 = 2.746 | N2 = 1.49310 | ν2 = 83.58 |
| r3 = −381.263 | d3 = 0.100 | | |
| r4 = 22.675 | d4 = 1.904 | N3 = 1.48749 | ν3 = 70.44 |
| r5 = 55.836 | d5 = 0.500~13.356~23.059 | | |
| r6* = 75.409 | d6 = 0.700 | N4 = 1.77250 | ν4 = 49.77 |
| r7* = 7.577 | d7 = 4.153 | | |
| r8 = −8.104 | d8 = 0.600 | N5 = 1.77250 | ν5 = 49.77 |
| r9 = 11.284 | d9 = 1.170 | N6 = 1.84666 | ν6 = 23.82 |
| r10 = −27.352 | d10 = 12.417~5.161~0.500 | | |
| r11 = ∞ (Aperture Stop S) | d11 = 0.500 | | |
| r12* = 5.838 | d12 = 1.882 | N7 = 1.60021 | ν7 = 58.99 |
| r13* = −368.366 | d13 = 0.100 | | |
| r14 = 8.835 | d14 = 0.500 | N8 = 1.84666 | ν8 = 23.82 |
| r15 = 5.247 | d15 = 5.685~1.809~0.200 | | |
| r16 = 5.021 | d16 = 2.899 | N9 = 1.48749 | ν9 = 70.44 |
| r17 = −19.996 | d17 = 0.100 | | |

TABLE 12-continued

Construction Data of Example 12 f = 5.1~16.0~48.7
FNO = 2.81~3.62~4.10

| | | | |
|---|---|---|---|
| r18* = 7.465 | d18 = 0.720 | N10 = 1.84530 | ν10 = 40.44 |
| r19* = 3.677 | d19 = 0.500 | | |
| r20 = 4.985 | d20 = 2.292 | N11 = 1.48749 | ν11 = 70.44 |
| r21 = 6.356 | d21 = 1.150~5.026~6.635 | | |
| r22 = ∞ | d22 = 3.400 | N12 = 1.51680 | ν12 = 64.20 |
| r23 = ∞ | | | |

[Aspherical Data of Sixth Surface (r6)]

$\epsilon$ = 1.0000
A4 = 0.33469 × 10$^{-3}$
A6 = 0.39659 × 10$^{-5}$
A8 = −0.85661 × 10$^{-7}$

[Aspherical Data of Seventh Surface (r7)]

$\epsilon$ = 1.0000
A4 = 0.28413 × 10$^{-3}$
A6 = 0.15690 × 10$^{-4}$
A8 = 0.56334 × 10$^{-6}$

[Aspherical Data of Twelfth Surface (r12)]

$\epsilon$ = 1.0000
A4 = −0.64367 × 10$^{-3}$
A6 = −0.20690 × 10$^{-4}$
A8 = 0.96767 × 10$^{-7}$
A10 = −0.17214 × 10$^{-6}$

[Aspherical Data of Thirteenth Surface (r13)]

$\epsilon$ = 1.0000
A4 = −0.28758 × 10$^{-3}$
A6 = −0.72834 × 10$^{-5}$
A8 = −0.11256 × 10$^{-5}$
A10 = −0.10975 × 10$^{-6}$

[Aspherical Data of Eighteenth Surface (r18)]

$\epsilon$ = 1.0000
A4 = −0.47552 × 10$^{-2}$
A6 = 0.18708 × 10$^{-3}$
A8 = −0.10431 × 10$^{-4}$
A10 = 0.24544 × 10$^{-6}$

[Aspherical Data of Nineteenth Surface (r19)]

$\epsilon$ = 1.0000
A4 = −0.53185 × 10$^{-2}$
A6 = 0.21778 × 10$^{-3}$
A8 = −0.13316 × 10$^{-4}$

[Values of Condition (23) on Sixth Surface (r6)]

y = 0.00 ymax ... (x − x0)/(N' − N) = 0.00000
y = 0.25 ymax ... (x − x0)/(N' − N) = 0.00146
y = 0.50 ymax ... (x − x0)/(N' − N) = 0.02452
y = 0.75 ymax ... (x − x0)/(N' − N) = 0.13023
y = 1.00 ymax ... (x − x0)/(N' − N) = 0.41267
[Values of Condition (23) on Seventh Surface (r7)]

y = 0.00 ymax ... (x − x0)/(N' − N) = −0.00000
y = 0.25 ymax ... (x − x0)/(N' − N) = −0.00048
y = 0.50 ymax ... (x − x0)/(N' − N) = −0.00929
y = 0.75 ymax ... (x − x0)/(N' − N) = −0.06401
y = 1.00 ymax ... (x − x0)/(N' − N) = −0.30124
[Values of Condition (24) on Twelfth Surface (r12)]

y = 0.00 ymax ... (x − x0)/(N' − N) = 0.00000
y = 0.25 ymax ... (x − x0)/(N' − N) = −0.00026
y = 0.50 ymax ... (x − x0)/(N' − N) = −0.00429
y = 0.75 ymax ... (x − x0)/(N' − N) = −0.02365
y = 1.00 ymax ... (x − x0)/(N' − N) = −0.08799
[Values of Condition (24) on Thirteenth Surface (r13)]

y = 0.00 ymax ... (x − x0)/(N' − N) = −0.00000
y = 0.25 ymax ... (x − x0)/(N' − N) = 0.00011
y = 0.50 ymax ... (x − x0)/(N' − N) = 0.00182
y = 0.75 ymax ... (x − x0)/(N' − N) = 0.01043
y = 1.00 ymax ... (x − x0)/(N' − N) = 0.04310

TABLE 12-continued

Construction Data of Example 12 f = 5.1~16.0~48.7
FNO = 2.81~3.62~4.10

[Values of Condition (25) on Eighteenth Surface (r18)]

y = 0.00 ymax . . . (x − x0)/(N' − N) = 0.00000
y = 0.25 ymax . . . (x − x0)/(N' − N) = −0.00226
y = 0.50 ymax . . . (x − x0)/(N' − N) = −0.03388
y = 0.75 ymax . . . (x − x0)/(N' − N) = −0.15712
y = 1.00 ymax . . . (x − x0)/(N' − N) = −0.45821
[Values of Condition (25) on Nineteenth Surface (r19)]

y = 0.00 ymax . . . (x − x0)/(N' − N) = −0.00000
y = 0.25 ymax . . . (x − x0)/(N' − N) = 0.00159
y = 0.50 ymax . . . (x − x0)/(N' − N) = 0.02405
y = 0.75 ymax . . . (x − x0)/(N' − N) = 0.11362
y = 1.00 ymax . . . (x − x0)/(N' − N) = 0.34557

TABLE 13

Construction Data of Example 13 f = 5.1~16.0~48.8
FNO = 2.88~3.74~4.10

| Radius of Curvature | Axial Distance | Refractive Index | Abbe Number |
|---|---|---|---|
| r1 = 44.089 | d1 = 0.800 | N1 = 1.84947 | ν1 = 36.15 |
| r2 = 22.689 | d2 = 3.368 | N2 = 1.48749 | ν2 = 70.44 |
| r3 = −268.849 | d3 = 0.100 | | |
| r4 = 20.608 | d4 = 2.606 | N3 = 1.49310 | ν3 = 83.58 |
| r5 = 103.926 | d5 = 0.500~13.388~23.790 | | |
| r6 = 18.124 | d6 = 0.650 | N4 = 1.77250 | ν4 = 49.77 |
| r7 = 6.084 | d7 = 4.870 | | |
| r8* = −6.916 | d8 = 0.700 | N5 = 1.77250 | ν5 = 49.77 |
| r9 = 13.205 | d9 = 1.411 | N6 = 1.84666 | ν6 = 23.82 |
| r10* = −21.602 | d10 = 12.440~4.980~0.500 | | |
| r11 = ∞ (Aperture Stop S) | d11 = 0.500 | | |
| r12* = 15.792 | d12 = 1.575 | N7 = 1.75450 | ν7 = 51.57 |
| r13 = −23.111 | d13 = 0.600 | N8 = 1.84666 | ν8 = 23.82 |
| r14* = 213.351 | d14 = 5.822~1.575~0.200 | | |
| r15 = 5.730 | d15 = 2.725 | N9 = 1.48749 | ν9 = 70.44 |
| r16 = 141.739 | d16 = 0.100 | | |
| r17 = 14.740 | d17 = 1.783 | N10 = 1.48749 | ν10 = 70.44 |
| r18 = −16.220 | d18 = 0.100 | | |
| r19* = 318.459 | d19 = 1.000 | N11 = 1.84889 | ν11 = 32.66 |
| r20* = 8.319 | d20 = 1.000~5.247~6.622 | | |
| r21 = ∞ | d21 = 3.400 | N12 = 1.51680 | ν12 = 64.20 |
| r22 = ∞ | | | |

[Aspherical Data of Eighth Surface (r8)]

ε = 1.0000
A4 = 0.91360 × 10$^{-3}$
A6 = −0.38654 × 10$^{-4}$
A8 = 0.13085 × 10$^{-5}$
[Aspherical Data of Tenth Surface (r10)]

ε = 1.0000
A4 = 0.40438 × 10$^{-3}$
A6 = −0.16170 × 10$^{-4}$
A8 = −0.20488 × 10$^{-6}$
A10 = 0.36662 × 10$^{-7}$
[Aspherical Data of Twelfth Surface (r12)]

ε = 1.0000
A4 = −0.14855 × 10$^{-3}$
A6 = 0.27632 × 10$^{-4}$
A8 = −0.38928 × 10$^{-5}$

TABLE 13-continued

Construction Data of Example 13 f = 5.1~16.0~48.8
FNO = 2.88~3.74~4.10

A10 = 0.19997 × 10$^{-6}$
[Aspherical Data of Fourteenth Surface (r14)]

ε = 1.0000
A4 = −0.53448 × 10$^{-4}$
A6 = 0.15480 × 10$^{-4}$
A8 = −0.18236 × 10$^{-5}$
A10 = 0.80884 × 10$^{-7}$
[Aspherical Data of Nineteenth Surface (r19)]

ε = 1.0000
A4 = −0.11631 × 10$^{-2}$
A6 = 0.32367 × 10$^{-5}$
A8 = −0.10732 × 10$^{-5}$
[Aspherical Data of Twentieth Surface (r20)]

ε = 1.0000
A4 = 0.26988 × 10$^{-3}$
A6 = 0.37732 × 10$^{-4}$
A8 = 0.13560 × 10$^{-5}$
[Values of Condition (23) on Eighth Surface (r8)]

y = 0.00 ymax . . . (x − x0)/(N' − N) = 0.00000
y = 0.25 ymax . . . (x − x0)/(N' − N) = 0.00075
y = 0.50 ymax . . . (x − x0)/(N' − N) = 0.01090
y = 0.75 ymax . . . (x − x0)/(N' − N) = 0.04825
y = 1.00 ymax . . . (x − x0)/(N' − N) = 0.13750
[Values of Condition (23) on Tenth Surface (r10)]

y = 0.00 ymax . . . (x − x0)/(N' − N) = −0.00000
y = 0.25 ymax . . . (x − x0)/(N' − N) = −0.00019
y = 0.50 ymax . . . (x − x0)/(N' − N) = −0.00280
y = 0.75 ymax . . . (x − x0)/(N' − N) = −0.01220
y = 1.00 ymax . . . (x − x0)/(N' − N) = −0.03179
[Values of Condition (24) on Twelfth Surface (r12)]

y = 0.00 ymax . . . (x − x0)/(N' − N) = 0.00000
y = 0.25 ymax . . . (x − x0)/(N' − N) = −0.00003
y = 0.50 ymax . . . (x − x0)/(N' − N) = −0.00045
y = 0.75 ymax . . . (x − x0)/(N' − N) = −0.00180
y = 1.00 ymax . . . (x − x0)/(N' − N) = −0.00499
[Values of Condition (24) on Fourteenth Surface (r14)]

y = 0.00 ymax . . . (x − x0)/(N' − N) = −0.00000
y = 0.25 ymax . . . (x − x0)/(N' − N) = 0.00001
y = 0.50 ymax . . . (x − x0)/(N' − N) = 0.00012
y = 0.75 ymax . . . (x − x0)/(N' − N) = 0.00030
y = 1.00 ymax . . . (x − x0)/(N' − N) = 0.00039
[Values of Condition (25) on Nineteenth Surface (r19)]

y = 0.00 ymax . . . (x − x0)/(N' − N) = 0.00000
y = 0.25 ymax . . . (x − x0)/(N' − N) = −0.00063
y = 0.50 ymax . . . (x − x0)/(N' − N) = −0.01011
y = 0.75 ymax . . . (x − x0)/(N' − N) = −0.05213
y = 1.00 ymax . . . (x − x0)/(N' − N) = −0.17470
[Values of Condition (25) on Twentieth Surface (r20)]

y = 0.00 ymax . . . (x − x0)/(N' − N) = −0.00000
y = 0.25 ymax . . . (x − x0)/(N' − N) = −0.00010
y = 0.50 ymax . . . (x − x0)/(N' − N) = −0.00201
y = 0.75 ymax . . . (x − x0)/(N' − N) = −0.01383
y = 1.00 ymax . . . (x − x0)/(N' − N) = −0.06294

TABLE 14

<<Values Corresponding to Conditions (1) to (5)>>

| Examples | Cond. (1)<br>f1/fW | Cond. (2)<br>β2T/β2W | Cond. (2)<br>β34T/β34W | Cond. (3)<br>M2/Z | Cond. (4)<br>f4/f3 | Cond. (5)<br>log(β2T/β2W)/log(Z) |
|---|---|---|---|---|---|---|
| 1 | 5.01 | 2.735 | 2.108 | 1.75 | 0.51 | 0.574 |
| 2 | 4.22 | 2.087 | 1.374 | 2.39 | 0.69 | 0.698 |
| 3 | 5.92 | 2.978 | 3.207 | 1.36 | 0.37 | 0.483 |

TABLE 15

<<Distances Varying with Focusing in Close-Distance Condition (D = 1 m)>>

| focal-length | Ex. 4 | | Ex. 5 | | Ex. 6 | | Ex. 7 | |
|---|---|---|---|---|---|---|---|---|
| conditions | d5 | d10 | d5 | d10 | d4 | d10 | d5 | d11 |
| [W] | 0.419 | 10.063 | 0.362 | 17.892 | 0.497 | 6.621 | 0.376 | 13.529 |
| [M] | 5.666 | 4.817 | 10.889 | 7.503 | 3.694 | 3.424 | 7.484 | 6.421 |
| [T] | 8.719 | 1.764 | 15.527 | 2.865 | 5.573 | 1.545 | 11.538 | 2.367 |

TABLE 16

<<Values Corresponding to Conditions (8) to (11)>>

| Examples | Cond. (8)<br>|β2T| | Cond. (9)<br>f1/fW | Cond. (10)<br>M4/M2 | Cond. (11)<br>log(β2T/β2W)/log(Z) |
|---|---|---|---|---|
| 4 | 0.949 | 4.752 | 0.522 | 0.577 |
| 5 | 0.949 | 7.610 | 0.448 | 0.531 |
| 6 | 0.950 | 3.751 | 0.272 | 0.701 |
| 7 | 0.951 | 6.159 | 0.334 | 0.601 |

TABLE 17

<<Values Corresponding to Conditions (14) to (16)>>

| | Cond. (14)<br>M1/Ymax | Cond. (15)<br>M4/M2 | Cond. (16)<br>log(β2T/β2W)/log(Z) |
|---|---|---|---|
| Ex. 8 | −3.42 | −0.46 | 0.67 |
| Ex. 9 | −3.50 | −0.44 | 0.67 |
| Ex. 10 | −2.45 | −0.54 | 0.59 |

TABLE 18

<<Distances Varying with Focusing in Close-Distance Condition (D = 1 m)>>

| focal-length | Ex. 11 | | Ex. 12 | | Ex. 13 | |
|---|---|---|---|---|---|---|
| conditions | d5 | d11 | d5 | d10 | d5 | d10 |
| [W] | 0.424 | 12.360 | 0.423 | 12.494 | 0.423 | 12.517 |
| [M] | 12.733 | 5.121 | 13.097 | 5.420 | 13.141 | 5.227 |
| [T] | 21.220 | 21.220 | 20.826 | 2.733 | 21.517 | 2.774 |

TABLE 19

<<Values Corresponding to Conditions (20) to (22), and (26)>>

| | Cond. (20)<br>|β2T| | Cond. (21)<br>|fW/f2| | Cond. (22)<br>M1/Ymax | Cond. (26)<br>M4/M1 |
|---|---|---|---|---|
| Ex. 11 | 0.95 | 0.84 | −3.61 | 0.48 |
| Ex. 12 | 0.95 | 0.83 | −3.43 | 0.52 |
| Ex. 13 | 0.95 | 0.84 | −3.66 | 0.50 |

What is claimed is:

1. A zoom lens system, in order from an object side, comprising:

a first lens unit having a positive optical power, the first lens unit being moved during zooming;

a second lens unit having a negative optical power, the second lens unit being moved during zooming;

a third lens unit having a positive optical power, the third lens unit being fixed during zooming; and a fourth lens unit having a positive optical power, the fourth lens unit being moved during zooming, wherein the zoom lens system fulfills the following conditions:

$$-5.0 < M1/Y\max < -1.0$$

$$1.0 < M4/M2 < -0.1$$

where

M1 represents a displacement amount of the first lens unit from a shortest focal length condition to a longest focal length condition (a direction pointing to the object side is negative);

M2 represents a displacement amount of the second lens unit from the shortest focal length condition to the longest focal length condition (the direction pointing to the object side is negative);

M4 represents a displacement amount of the fourth lens unit from the shortest focal length condition to the longest focal length condition (the direction pointing to the object side is negative); and Ymax represents a maximum image height (a radius of an effective image on an image plane).

2. A zoom lens system as claimed in claim 1, wherein the second lens unit has an aspherical surface satisfying the following condition:

$$0<(x-x0)/(N'-N)<0.9$$

where x represents a deviation of the aspherical surface, in a direction perpendicular to an optical axis direction, of the aspherical surface (in millimeters, the direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

3. A zoom lens system as claimed in claim 1, wherein the third lens unit has an aspherical surface satisfying the following condition:

$$-0.35<(x-x0)/(N'-N)<0$$

where x represents a deviation of the aspherical surface, in a direction perpendicular to an optical axis direction, of the aspherical surface (in millimeters, the direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

4. A zoom lens system as claimed in claim 1, wherein the fourth lens unit has an aspherical surface satisfying the following condition:

$$-0.85<(x-x0)/(N'-N)<0$$

where x represents a deviation of the aspherical surface, in a direction perpendicular to an optical axis direction, of the aspherical surface (in millimeters, the direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

5. A zoom lens system, in order from an object side, comprising:

a first lens unit having a positive optical power, the first lens unit being moved during zooming;

a second lens unit having a negative optical power, the second lens unit being moved during zooming;

a third lens unit having a positive optical power, the third lens unit being fixed during zooming; and a fourth lens unit having a positive optical power, the fourth lens unit being moved during zooming, wherein the zoom lens system fulfills the following conditions:

$$-5.0<M1/Ymax<-1.0$$

$$0.2<\log(\beta 2T/\beta 2W)/\log(Z)<0.9$$

where

M1 represents a displacement amount of the first lens unit from a shortest focal length condition to a longest focal length condition (a direction pointing to the object side is negative);

Ymax represents a maximum image height (a radius of an effective image on an image plane);

β2W represents a lateral magnification of the second lens unit in the shortest focal length condition;

β2T represents a lateral magnification of the second lens unit in the longest focal length condition; and Z represents a zoom ratio (which equals fT/fW, where fT represents a focal length of the entire zoom lens system in the longest focal length condition; and fW represents a focal length of the entire zoom lens system in the shortest focal length condition).

6. A zoom lens system as claimed in claim 5, wherein the second lens unit has an aspherical surface satisfying the following condition:

$$0<(x-x0)/(N'-N)<0.9$$

where x represents a deviation of the aspherical surface, in a direction perpendicular to an optical axis direction, of the aspherical surface (in millimeters, the direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

7. A zoom lens system as claimed in claim 5, wherein the third lens unit has an aspherical surface satisfying the following condition:

$$-0.35<(x-x0)/(N'-N)<0$$

where x represents a deviation of the aspherical surface, in a direction perpendicular to an optical axis direction, of the aspherical surface (in millimeters, the direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

8. A zoom lens system as claimed in claim 5, wherein the fourth lens unit has an aspherical surface satisfying the following condition:

$$-0.85<(x-x0)/(N'-N)<0$$

where x represents a deviation of the aspherical surface, in a direction perpendicular to an optical axis direction, of the aspherical surface (in millimeters, the direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

9. A zoom lens system, in order from an object side, comprising:

a first lens unit having a positive optical power, the first lens unit being moved monotonically forward to the object side during zooming from a shortest focal length condition to a longest focal length condition;

a second lens unit having a negative optical power, the second lens unit being moved monotonically backward to an image side during zooming from the shortest focal length condition to the longest focal length condition;

a third lens unit having a positive optical power, the third lens unit being fixed during zooming; and a fourth lens unit having a positive optical power, the fourth lens unit being moved monotonically forward to the object side during zooming from the shortest focal length condition to the longest focal length condition, wherein the second lens unit has an aspherical surface satisfying the following condition:

$$0<(x-x0)/(N'-N)<0.9$$

where x represents a deviation of the aspherical surface, in a direction perpendicular to an optical axis direction, of the aspherical surface (in millimeters, a direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

10. A zoom lens system, in order from an object side, comprising:

a first lens unit having a positive optical power, the first lens unit being moved monotonically forward to the object side during zooming from a shortest focal length condition to a longest focal length condition;

a second lens unit having a negative optical power, the second lens unit being moved monotonically backward to an image side during zooming from the shortest focal length condition to the longest focal length condition;

a third lens unit having a positive optical power, the third lens unit being fixed during zooming; and a fourth lens unit having a positive optical power, the fourth lens unit being moved monotonically forward to the object side during zooming from the shortest focal length condition to the longest focal length condition, wherein the fourth lens unit has an aspherical surface satisfying the following condition:

$$-0.85<(x-x0)/(N'-N)<0$$

where x represents a deviation of the aspherical surface, in a direction perpendicular to an optical axis direction, of the aspherical surface (in millimeters, a direction pointing to the object side is negative);

x0 represents a deviation of a reference spherical surface, in a direction perpendicular to the optical axis direction, of the reference spherical surface (in millimeters, the direction pointing to the object side is negative);

N represents a refractive index of an object-side medium of the aspherical surface for d-line; and N' represents a refractive index of an image-side medium of the aspherical surface for d-line.

11. A zoom lens system, in order from an object side, comprising:

a first lens unit having a positive optical power, the first lens unit being moved during zooming;

a second lens unit having a negative optical power, the second lens unit being moved during zooming, the second lens unit being also moved for focusing;

a third lens unit having a positive optical power, the third lens unit being fixed during zooming; and a fourth lens unit having a positive optical power, the fourth lens unit being moved during zooming, wherein the zoom lens system fulfills the following conditions:

$$0.1<|\beta 2T|<1.0$$

$$0.2<|fW/f2|<1.5$$

$$-5.0<M1/Y\max<-1.0$$

where $\beta 2T$ represents a lateral magnification of the second lens unit in a longest focal length condition;

fW represents a focal length of the entire zoom lens system in a shortest focal length condition;

f2 represents a focal length of the second lens unit;

M1 represents a displacement amount of the first lens unit from the shortest focal length condition to the longest focal length condition (a direction pointing to the object side is negative); and Ymax represents a maximum image height (a radius of an effective image on an image plane).

12. A zoom lens system, in order from an object side, comprising:

a first lens unit having a positive optical power, the first lens unit being moved during zooming;

a second lens unit having a negative optical power, the second lens unit being moved during zooming, the second lens unit being also moved for focusing;

a third lens unit having a positive optical power, the third lens unit being fixed during zooming; and a fourth lens unit having a positive optical power, the fourth lens unit being moved during zooming, wherein the zoom lens system fulfills the following condition:

$$0.1 < M4/M1 < 1.0$$

where

M1 represents a displacement amount of the first lens unit from a shortest focal length condition to a longest focal length condition (a direction pointing to the object side is negative); and M4 represents a displacement amount of the fourth lens unit from the shortest focal length condition to the longest focal length condition (the direction pointing to the object side is negative).

13. A zoom lens system, in order from an object side, comprising:

a first lens unit having a positive optical power, the first lens unit being fixed during zooming;

a second lens unit having a negative optical power, the second lens unit being moved during zooming;

a third lens unit having a positive optical power, the third lens unit being fixed during zooming; and a fourth lens unit having a positive optical power, the fourth lens unit being moved during zooming, wherein the zoom lens system fulfills the following conditions:

$$2.5 < f1/fW < 8.0$$

$$0.7 \times (\beta 34T/\beta 34W) < \beta 2T/\beta 2W < 2.3 \times (\beta 34T/\beta 34W)$$

where f1 represents a focal length of the first lens unit;

fW represents a focal length of the entire zoom lens system in a shortest focal length condition;

$\beta 34W$ represents a composite lateral magnification of the third and fourth lens units in the shortest focal length condition;

$\beta 34T$ represents a composite lateral magnification of the third and fourth lens units in a longest focal length condition;

$\beta 2W$ represents a lateral magnification of the second lens unit in the shortest focal length condition; and $\beta 2T$ represents a lateral magnification of the second lens unit in the longest focal length condition.

14. A zoom lens system as claimed in claim 13, wherein the second lens unit is moved monotonically backward to the image side during zooming from the shortest focal length condition to the longest focal length condition.

15. A zoom lens system as claimed in claim 13, wherein the fourth lens unit is moved monotonically forward to the object side during zooming from the shortest focal length condition to the longest focal length condition.

16. A zoom lens system, in order from an object side, comprising:

a first lens unit having a positive optical power, the first lens unit being fixed during zooming;

a second lens unit having a negative optical power, the second lens unit being moved monotonically backward to an image side during zooming from a shortest focal length condition to a longest focal length condition;

a third lens unit having a positive optical power, the third lens unit being fixed during zooming; and a fourth lens unit having a positive optical power, the fourth lens unit being moved monotonically forward to the object side during zooming from the shortest focal length condition to the longest focal length condition, wherein the zoom lens system fulfills the following condition:

$$2.5 < f1/fW < 8.0$$

where f1 represents a focal length of the first lens unit; and fW represents a focal length of the entire zoom lens system in the shortest focal length condition.

17. A zoom lens system as claimed in claim 16, wherein the following conditions are fulfilled:

$$0.9 < M2/Z < 2.7$$

$$0.2 < f4/f3 < 1.0$$

where

M2 represents a displacement amount of the second lens unit from the shortest focal length condition to the longest focal length condition (a direction pointing to the object side is negative);

Z represents a zoom ratio (which equals fT/fW, where fT represents a focal length of the entire zoom lens system in the longest focal length condition; and fW represents a focal length of the entire zoom lens system in the shortest focal length condition);

f3 represents a focal length of the third lens unit; and f4 represents a focal length of the fourth lens unit.

18. A zoom lens system, in order from an object side, comprising:

a first lens unit having a positive optical power, the first lens unit being fixed during zooming;

a second lens unit having a negative optical power, the second lens unit being moved during zooming;

a third lens unit having a positive optical power, the third lens unit being fixed during zooming; and a fourth lens unit having a positive optical power, the fourth lens unit being moved during zooming, wherein the zoom lens system fulfills the following condition:

$$0.4 < \log(\beta 2T/\beta 2W)/\log(Z) < 0.75$$

where $\beta 2W$ represents a lateral magnification of the second lens unit in a shortest focal length condition;

$\beta 2T$ represents a lateral magnification of the second lens unit in a longest focal length condition; and Z represents a zoom ratio (which equals fT/fW, where fT represents a focal length of the entire zoom lens system in the longest focal length condition; and fW represents a focal length of the entire zoom lens system in the shortest focal length condition).

19. A zoom lens system, in order from an object side, comprising:

a first lens unit having a positive optical power, the first lens unit being fixed during zooming;

a second lens unit having a negative optical power, the second lens unit being moved from the object side to an image side during zooming from a shortest focal length condition to a longest focal length condition, the second lens unit being also moved for focusing;

a third lens unit having a positive optical power, the third lens unit being fixed during zooming; and a fourth lens unit having a positive optical power, the fourth lens unit being moved forward to the object side during zooming from the shortest focal length condition to the longest focal length condition so that the fourth lens unit compensates a movement of an image plane in an optical axis direction caused by moving the second lens unit, wherein the zoom lens system fulfills the following conditions:

$$0.5 < |\beta 2T| < 0.98$$

$$3.0 < f1/fW < 9.0$$

where $\beta 2T$ represents a lateral magnification of the second lens unit in the longest focal length condition;

fW represents a focal length of the entire zoom lens system in the shortest focal length condition; and f1 represents a focal length of the first lens unit.

20. A zoom lens system, in order from an object side, comprising:

a first lens unit having a positive optical power, the first lens unit being fixed during zooming;

a second lens unit having a negative optical power, the second lens unit being moved monotonically from the object side to an image side during zooming from a shortest focal length condition to a longest focal length condition, the second lens unit being also moved for focusing;

a third lens unit having a positive optical power, the third lens unit being fixed during zooming; and a fourth lens unit having a positive optical power, the fourth lens unit being moved monotonically from the image side to the object side during zooming from the shortest focal length condition to the longest focal length condition, wherein the zoom lens system fulfills the following conditions:

$$0.15 < M4/M2 < 0.55$$

$$0.4 < \log(\beta 2T/\beta 2W)/\log(Z) < 0.75$$

where

M2 represents a displacement amount of the second lens unit from the shortest focal length condition to the longest focal length condition (a direction pointing to the object side is negative);

M4 represents a displacement amount of the fourth lens unit from the shortest focal length condition to the longest focal length condition (the direction pointing to the object side is negative)

$\beta 2W$ represents a lateral magnification of the second lens unit in the shortest focal length condition;

$\beta 2T$ represents a lateral magnification of the second lens unit in the longest focal length condition; and Z represents a zoom ratio (which equals fT/fW, where fT represents a focal length of the entire zoom lens system in the longest focal length condition; and fW represents a focal length of the entire zoom lens system in the shortest focal length condition).

* * * * *

UNITED STATES PATENT AND TRADEMARK OFFICE
CERTIFICATE OF CORRECTION

PATENT NO. : 6,101,043
DATED : August 8, 2000
INVENTOR(S) : Tetsuo Kohno et al.

It is certified that error appears in the above-identified patent and that said Letters Patent is hereby corrected as shown below:

Title page,
Item [75] Inventors:,
Line 1, delete "Toyonaka;", and insert -- Toyonaka-Shi; --.
Line 2, delete "Sakai,", and insert -- Sakai-Shi, --.

Column 52,
Line 55 (claim 1, line 14), delete "1.0<M4/M2<-0.1", and insert
--1.0<M4/M2<-0.1 --.

Column 58,
Lines 34 through 36 (claim 17, lines 12 through 14), delete "condition; and fW represents a focal length of the entire zoom lens system in the shortest focal length condition);", and insert -- condition); --.

Signed and Sealed this

Twenty-third Day of October, 2001

Attest:

NICHOLAS P. GODICI
Attesting Officer
Acting Director of the United States Patent and Trademark Office